US012501276B2

(12) United States Patent
Kim

(10) Patent No.: US 12,501,276 B2
(45) Date of Patent: Dec. 16, 2025

(54) METHOD AND APPARATUS FOR PERFORMING FAST CELL ACTIVATION IN WIRELESS COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 409 days.

(21) Appl. No.: 17/938,419

(22) Filed: Oct. 6, 2022

(65) Prior Publication Data
US 2023/0116886 A1 Apr. 13, 2023

(30) Foreign Application Priority Data
Oct. 8, 2021 (KR) .......................... 10-2021-0133736

(51) Int. Cl.
H04W 16/18 (2009.01)
H04W 24/08 (2009.01)
H04W 84/04 (2009.01)
(52) U.S. Cl.
CPC ........... *H04W 16/18* (2013.01); *H04W 24/08* (2013.01); *H04W 84/042* (2013.01)
(58) Field of Classification Search
CPC ... H04W 16/18; H04W 24/08; H04W 84/042; H04W 84/04; H04L 5/001
USPC ........................................................ 370/328
See application file for complete search history.

(56) References Cited

U.S. PATENT DOCUMENTS

| 9,887,828 | B2* | 2/2018 | Pelletier | H04W 52/365 |
| 11,019,674 | B2* | 5/2021 | Hong | H04W 76/27 |
| 11,419,042 | B2* | 8/2022 | Babaei | H04W 76/15 |
| 12,101,179 | B2* | 9/2024 | Miao | H04W 72/23 |

(Continued)

FOREIGN PATENT DOCUMENTS

| EP | 4404488 A1 | 7/2024 |
| KR | 10-2022-0012151 A | 2/2022 |

OTHER PUBLICATIONS

Nokia et al., "On low latency Scell activation", 3GPP TSG RAN WG1 #106bis, Oct. 11-19, 2021, R1-2110295, 9 pages.

(Continued)

*Primary Examiner* — Mong-Thuy T Tran

(57) ABSTRACT

The disclosure relates to a 5G or 6G communication system for supporting a higher data transmission rate. The disclosure provides a method and apparatus for quickly performing cell activation in a wireless communication system. The method of UE comprises receiving, from a base station, first channel measurement configuration information and second channel measurement configuration information that include channel measurement signal information; receiving, from the base station, MAC CE for a cell activation or a cell deactivation; identifying, based on the MAC CE, at least one cell in which the cell activation is indicated for the terminal; determining, based on the first channel measurement configuration information and the second channel measurement configuration information, channel measurement configuration information for the at least one cell in which the cell activation is indicated; and performing the cell activation based on the second channel measurement configuration information and the MAC CE.

20 Claims, 21 Drawing Sheets

(56) References Cited

U.S. PATENT DOCUMENTS

| | | | |
|---|---|---|---|
| 12,192,933 B2* | 1/2025 | Cui | H04L 5/0098 |
| 2018/0034525 A1* | 2/2018 | Park | H04B 7/0456 |
| 2019/0116585 A1 | 4/2019 | Chakraborty et al. | |
| 2019/0261444 A1 | 8/2019 | Axmon et al. | |
| 2021/0076447 A1* | 3/2021 | Yue | H04W 76/27 |
| 2022/0030659 A1 | 1/2022 | Kim | |
| 2022/0039196 A1* | 2/2022 | Yue | H04W 76/27 |
| 2022/0131669 A1* | 4/2022 | Takeda | H04L 5/0048 |
| 2022/0166538 A1* | 5/2022 | Miao | H04L 5/0051 |
| 2024/0188089 A1* | 6/2024 | He | H04L 5/0098 |
| 2024/0188168 A1* | 6/2024 | Takeda | H04L 5/0055 |
| 2024/0214174 A1* | 6/2024 | He | H04W 52/0235 |
| 2024/0235774 A1* | 7/2024 | Nimbalker | H04L 5/0051 |
| 2024/0236736 A1* | 7/2024 | Oh | H04L 1/0067 |
| 2025/0141648 A1* | 5/2025 | Zhao | H04L 5/001 |

OTHER PUBLICATIONS

Vivo, "Discussion on efficient activation/de-activation mechanism for SCells", 3GPP TSG-RAN WG1 Meeting #106bis-e, Oct. 11-19, 2021, R1-2109006, 4 pages.

Apple Inc., "On efficient SCell Activation/Deactivation", 3GPP TSG-RAN WG1 #106 bis-e, Oct. 11-19, 2021, R1-2110060, 5 pages.

International Search Report and Written Opinion of the International Searching Authority dated Jan. 4, 2023 in connection with International Patent Application No. PCT/KR2022/014906, 8 pages.

Supplementary European Search Report dated Nov. 22, 2024, in connection with European Patent Application No. 22878850.1, 11 pages.

LG Electronics, "Discussion on fast and efficient SCell activation in NR CA," R1-2109988, 3GPP TSG RAN WG1 #106bis-e, E-Meeting, Oct. 11-22, 2021, 4 pages.

\* cited by examiner

FIG. 1LA
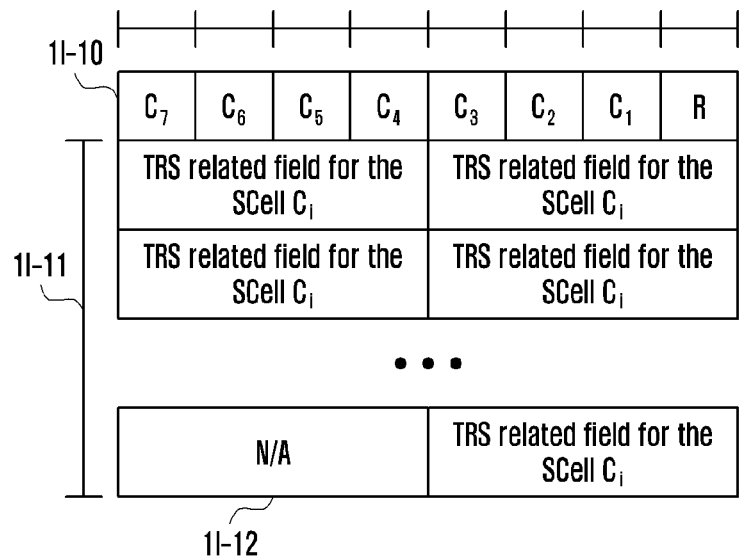
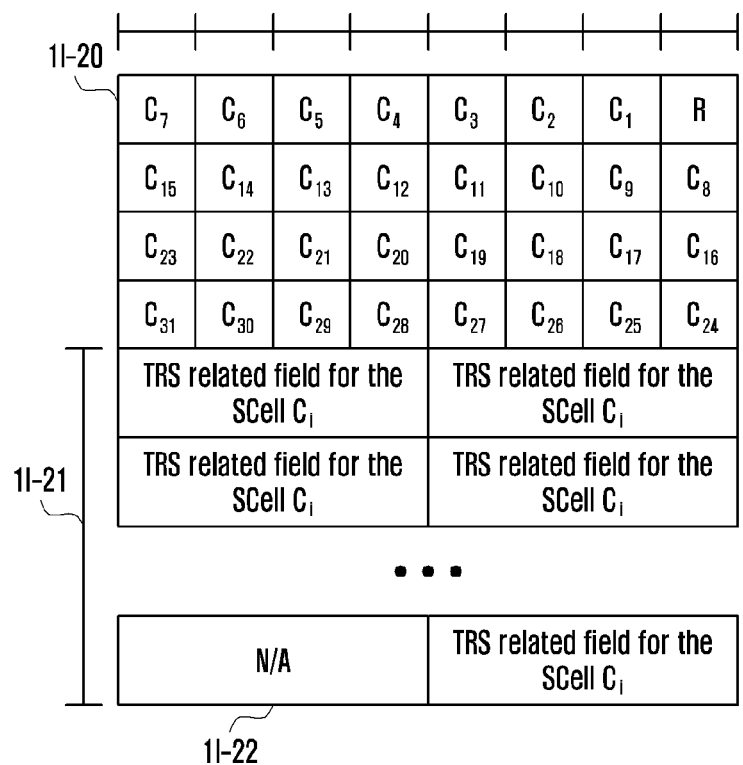

FIG. 1LB
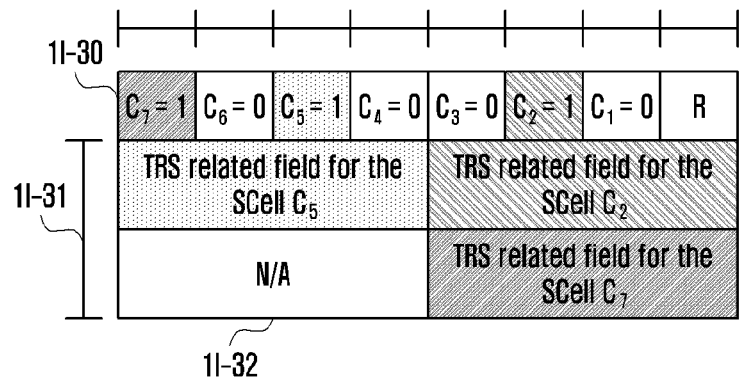
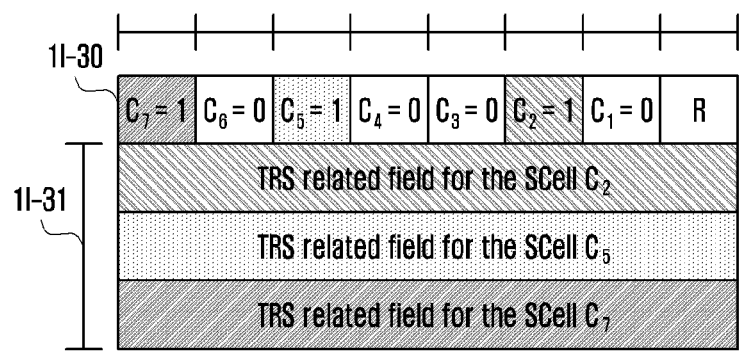
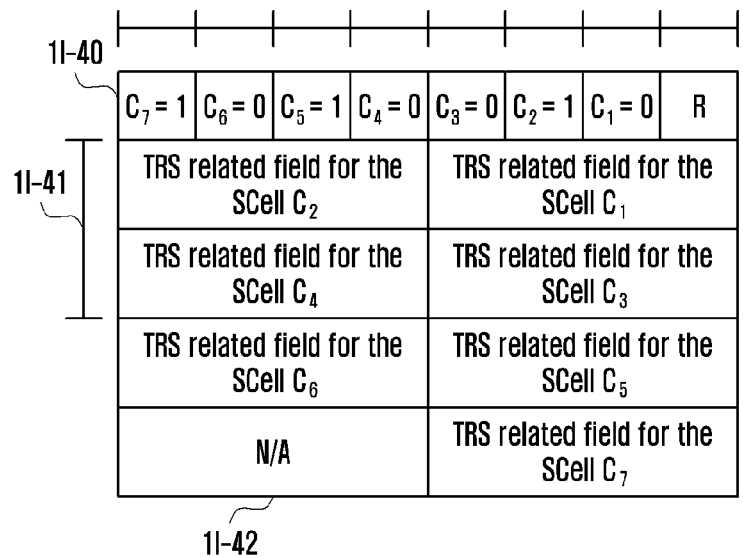

METHOD AND APPARATUS FOR PERFORMING FAST CELL ACTIVATION IN WIRELESS COMMUNICATION SYSTEM

CROSS-REFERENCE TO RELATED APPLICATION

This application is based on and claims priority under 35 U.S.C. § 119(a) of a Korean patent application number 10-2021-0133736, filed on Oct. 8, 2021, in the Korean Intellectual Property Office, the disclosure of which is incorporated by reference herein in its entirety.

BACKGROUND

1. Field

The present disclosure relates to a wireless communication system. Specifically, the present disclosure relates to a method and apparatus for quickly activating a cell in a wireless communication system or a next-generation mobile communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and 2-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

On the other hand, with the development of communication systems, there is an increasing demand for a method for resolving a delay occurring when activating a serving cell of a terminal.

SUMMARY

The present disclosure proposes a method for improving data transmission/reception delay due to a delay that occurs when activating a serving cell in a situation in which a plurality of serving cells is configured in a terminal.

In particular, in next-generation mobile communication systems, a carrier aggregation (CA) technology or a dual connectivity (DC) technology may be used to provide a terminal with a service having a high data rate and low transmission delay. However, there is a need for a method of preventing a processing delay that may occur when the carrier aggregation or the dual connectivity is configured and activated in a terminal configured for connection to the network or when the carrier aggregation or the dual connectivity is used and then deactivated. Particularly, when the terminal maintains a plurality of cells in an active state in order to use the carrier aggregation or the dual connectivity, because the terminal may need to perform the PDCCH monitoring for each cell, battery consumption of the terminal may increase. On the other hand, when the plurality of cells is maintained in an inactive state in order to reduce battery consumption of the terminal, a data transmission/reception delay may occur due to a delay that occurs when activating the plurality of cells when using the carrier aggregation or the dual connectivity. In the present disclosure, a cell may refer to a primary cell (PCell) or a secondary cell (SCell, for example, a SCell configured in a master cell group (MCG)) or a primary secondary cell group (PSCell) cell (that is, PCell of SCG) or SCell (e.g., SCell configured in SCG).

In order to solve the above problem, the present disclosure provides a method for cell activation, which is performed by a terminal in a wireless communication system. The method may include receiving, from a base station, first channel measurement configuration information and second channel measurement configuration information which include channel measurement signal information; receiving, from the base station, media access control (MAC) control information (or control element) for cell activation or cell deactivation, identifying, based on the MAC control information, a cell in which at least one activation for the terminal is indicated, and determine the channel measurement configuration information for the cell in which the activation is indicated, among the first channel measurement configuration information and the second channel measurement configuration information; and performing the cell activation based on the second channel measurement configuration information and the MAC control information.

Here, the MAC control information may include a first field related to whether the respective cell is activated and a second field for each cell to which activation is indicated by the first field, the second field may include all or part of the second channel measurement configuration information.

Here, the cell activation may be performed based on all or part of the channel measurement configuration information included in the second field.

Here, the first channel measurement configuration information may include information on at least one of a cycle of a channel measurement signal, a number of times the channel measurement signal is transmitted, a transmission resource of the channel measurement signal, the second channel measurement configuration information may include information on at least one of a cycle longer than the cycle of the channel measurement signal included in the first channel measurement configuration information, a number of times of transmission greater than the number of times the channel measurement signal is transmitted included in the first channel measurement configuration information, a transmission resource more than the transmission resource included in the first channel measurement configuration information.

Here, the first channel measurement configuration information and the second channel measurement configuration information may include at least one of a cycle for a channel measurement signal including at least one of a temporary reference signal (TRS), a synchronization signal block (SSB), a channel state information reference signal (CSI-RS), and a reference signal (RS), information on frequency or time transmission resource via which the channel measurement signal is transmitted, information on a number of times the channel measurement signal is transmitted, a timer value for time at which the channel measurement signal is transmitted, an interval in which the channel measurement signal is transmitted, or a cycle, transmission interval, transmission timing, or offset of a transmission resource to which the terminal reports a measurement result.

In order to solve the above problem, the present disclosure provides a method for cell activation, which is performed by a base station in a wireless communication system. The method may include transmitting, to a terminal, first channel measurement configuration information and second channel measurement configuration information which include channel measurement signal information, and transmitting, to the terminal, media access control (MAC) control information (or control element) for cell activation or cell deactivation, wherein the MAC control information may include information on a cell in which at least one activation for the terminal is indicated and information on which of the first channel measurement configuration information and the second channel measurement configuration information is the channel measurement configuration information for the cell to which the activation is indicated.

In order to solve the problem, the present disclosure provides a terminal in a wireless communication system. The terminal may include a transceiver and a controller, wherein the controller may receive from a base station, first channel measurement configuration information and second channel measurement configuration information which include channel measurement signal information; may receive, from the base station, media access control (MAC) control information (or control element) for cell activation or cell deactivation; may identify, based on the MAC control information, a cell in which at least one activation for the terminal is indicated, and may determine the channel measurement configuration information for the cell in which the activation is indicated, among the first channel measurement configuration information and the second channel measurement configuration information, and wherein the terminal may be configured to perform the cell activation based on the second channel measurement configuration information and the MAC control information.

In order to solve the problem, the present disclosure provides a base station in a wireless communication system. The base station may include a transceiver and a controller, wherein the controller may transmit, to a terminal, first channel measurement configuration information and second channel measurement configuration information which include channel measurement signal information; and may transmit, to the terminal, media access control (MAC) control information (or control element) for cell activation or cell deactivation, wherein the MAC control information may be configured to include information on a cell in which at least one activation for the terminal is indicated and information on which of the first channel measurement configuration information and the second channel measurement configuration information is the channel measurement configuration information for the cell to which the activation is indicated.

According to various embodiments of the disclosure, a delay required for activation of a serving cell is reduced, so that a data transmission delay or a data reception delay can be reduced.

In particular, embodiments of the disclosure propose a new hibernation mode or dormancy mode (or dormant mode or suspension mode) or deactivation mode in which an RRC connected mode terminal that has established a connection with a network in a next-generation mobile communication system can quickly activate and deactivate carrier aggregation or a dual access. The disclosure proposes a method for operating a new hibernation mode (or dormancy mode or suspension mode) in a level of bandwidth part (BWP level) or in a cell level or a cell group level (e.g., for a secondary cell group). Through this, it is possible to quickly activate the carrier aggregation or the dual access, and to reduce the consumption of the battery of the terminal. In addition, when the base station indicates the terminal to activate a cell (PCell or PSCell or SCell), the base station temporarily configures or allocates or transmits many transmission resources on which the terminal can perform channel measurement, and the terminal may quickly activate the cell based on the channel measurement or may quickly activate the cell by reporting the channel measurement result to the base station.

Before undertaking the DETAILED DESCRIPTION below, it may be advantageous to set forth definitions of certain words and phrases used throughout this patent document; the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 1lA and 1lB illustrate MAC control information according to various embodiments of the present disclosure.

FIG. 1O illustrates a signaling procedure of configuring or releasing dual connectivity, or activating or resuming or suspending or deactivating a secondary cell group configured with dual connectivity according to various embodiments of the present disclosure;

DETAILED DESCRIPTION

Figure 1A:
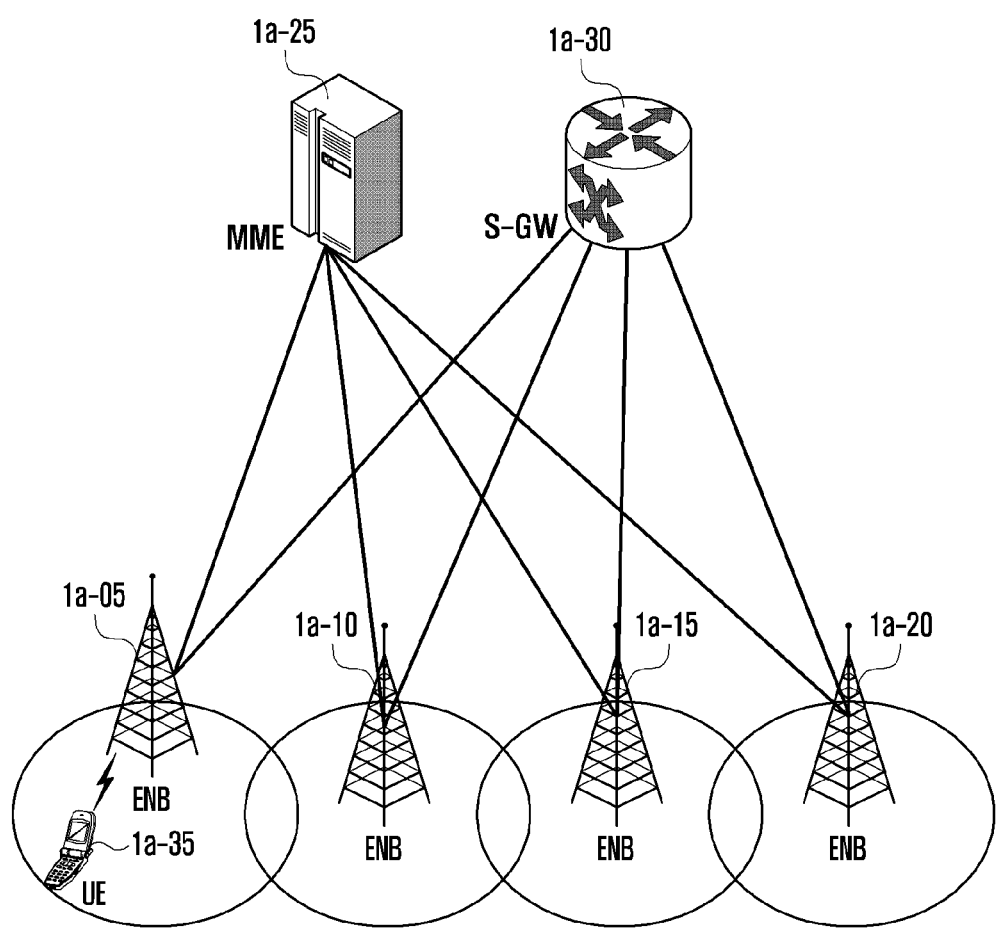
FIG. 1A illustrates a structure of an LTE system according to various embodiments of the present disclosure.
Figure 1B:
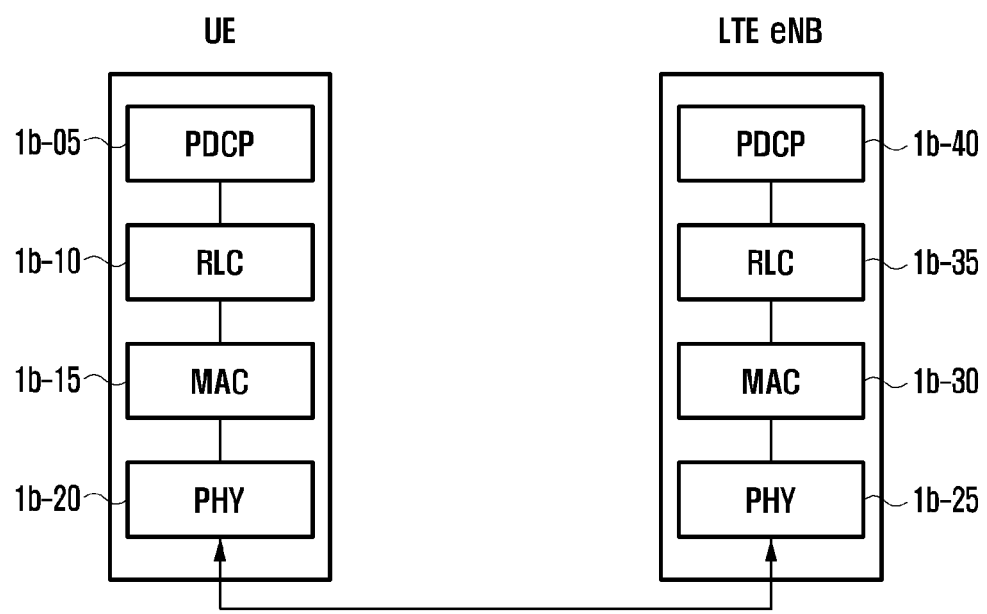
FIG. 1B illustrates a radio protocol structure in an LT E system according to various embodiments of the present disclosure.
Figure 1C:
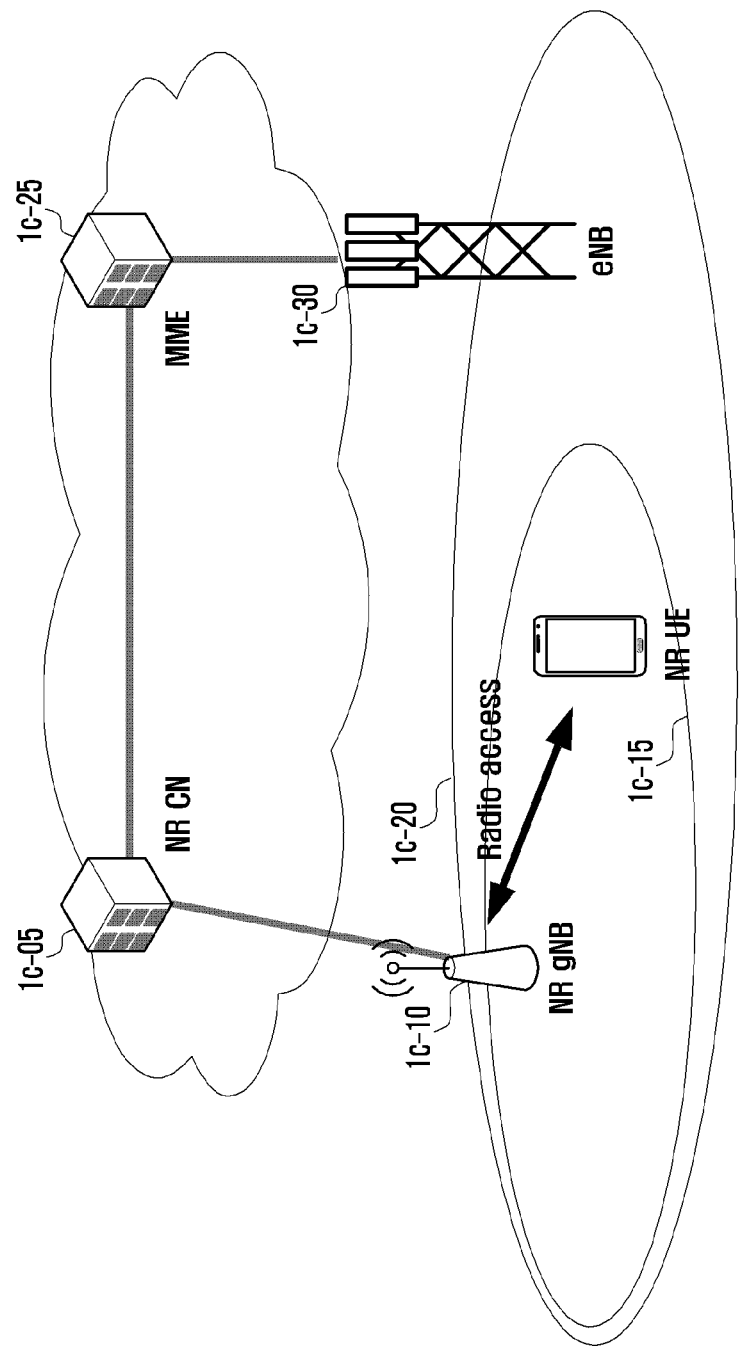
FIG. 1C illustrates a structure of a next-generation mobile communication system according to various embodiments of the present disclosure.
Figure 1D:
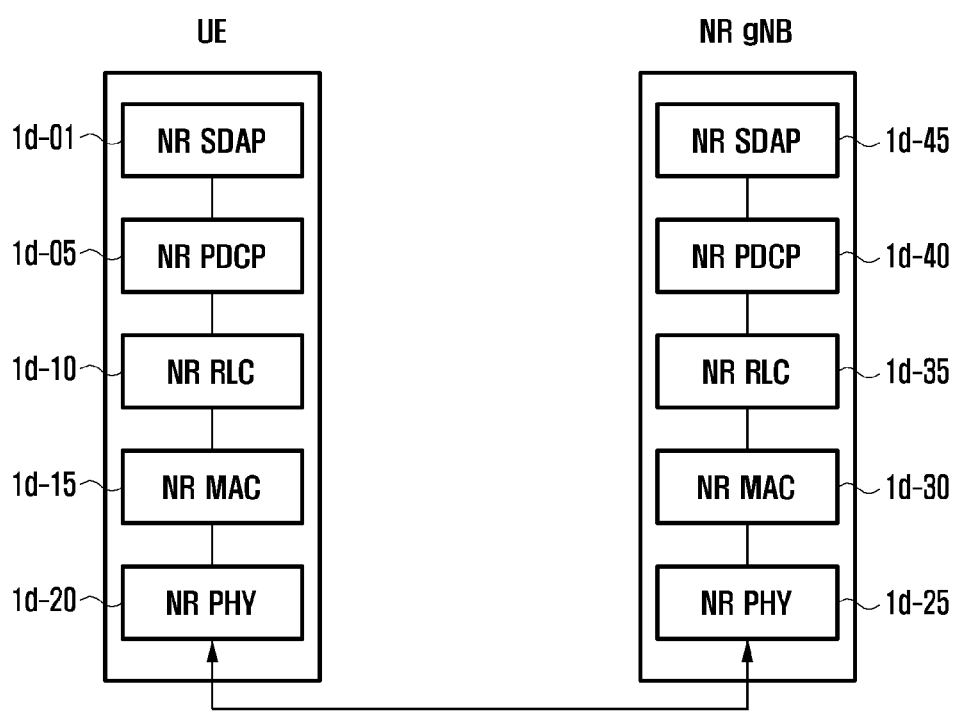
FIG. 1D illustrates a radio protocol structure of a next-generation mobile communication system according to various embodiments of the present disclosure.
Figure 1E:
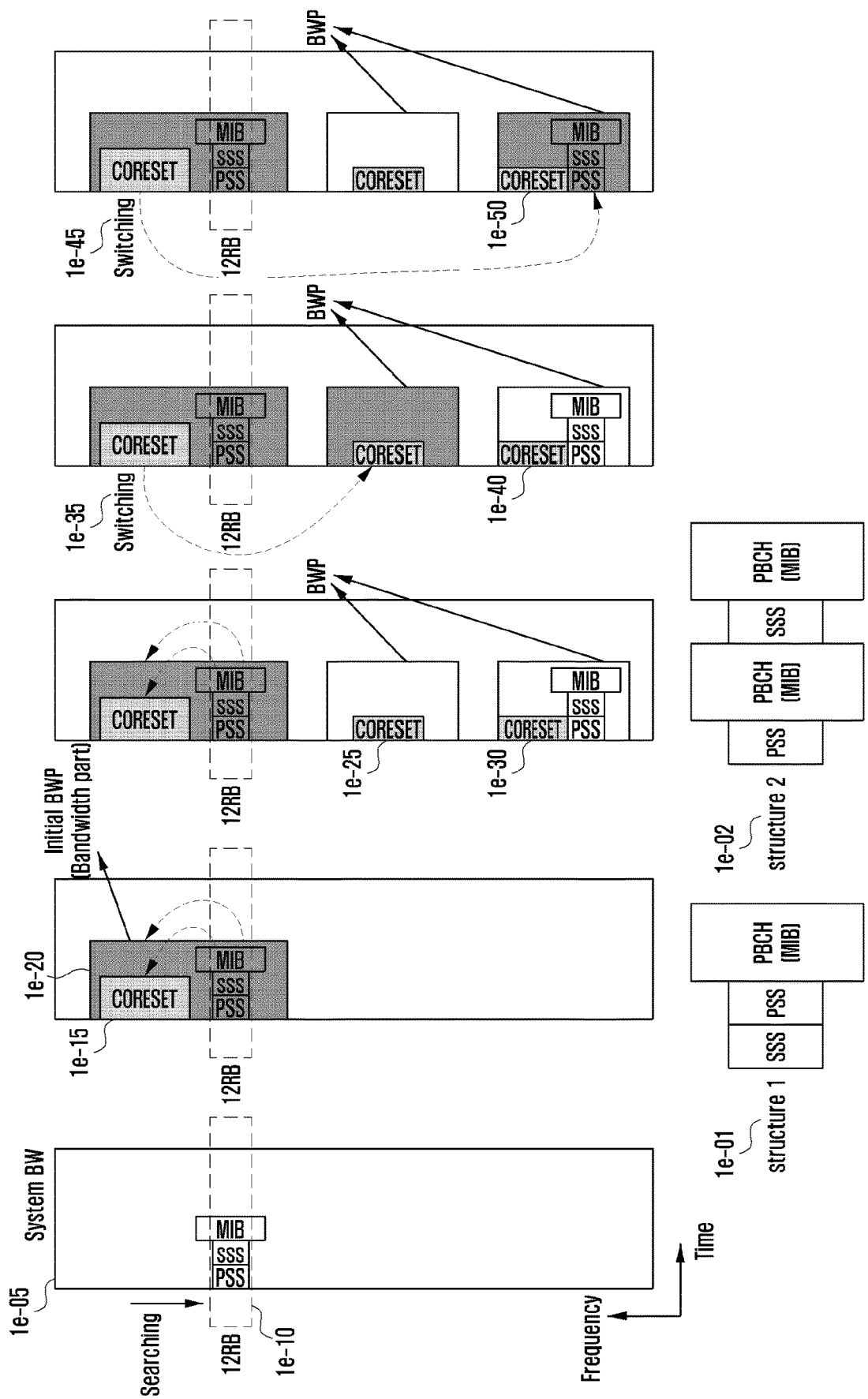
FIG. 1E illustrates a procedure of providing a service to a terminal through the efficient use of a relatively wide frequency bandwidth in a next-generation mobile communication system according to various embodiments of the present disclosure.
Figure 1F:
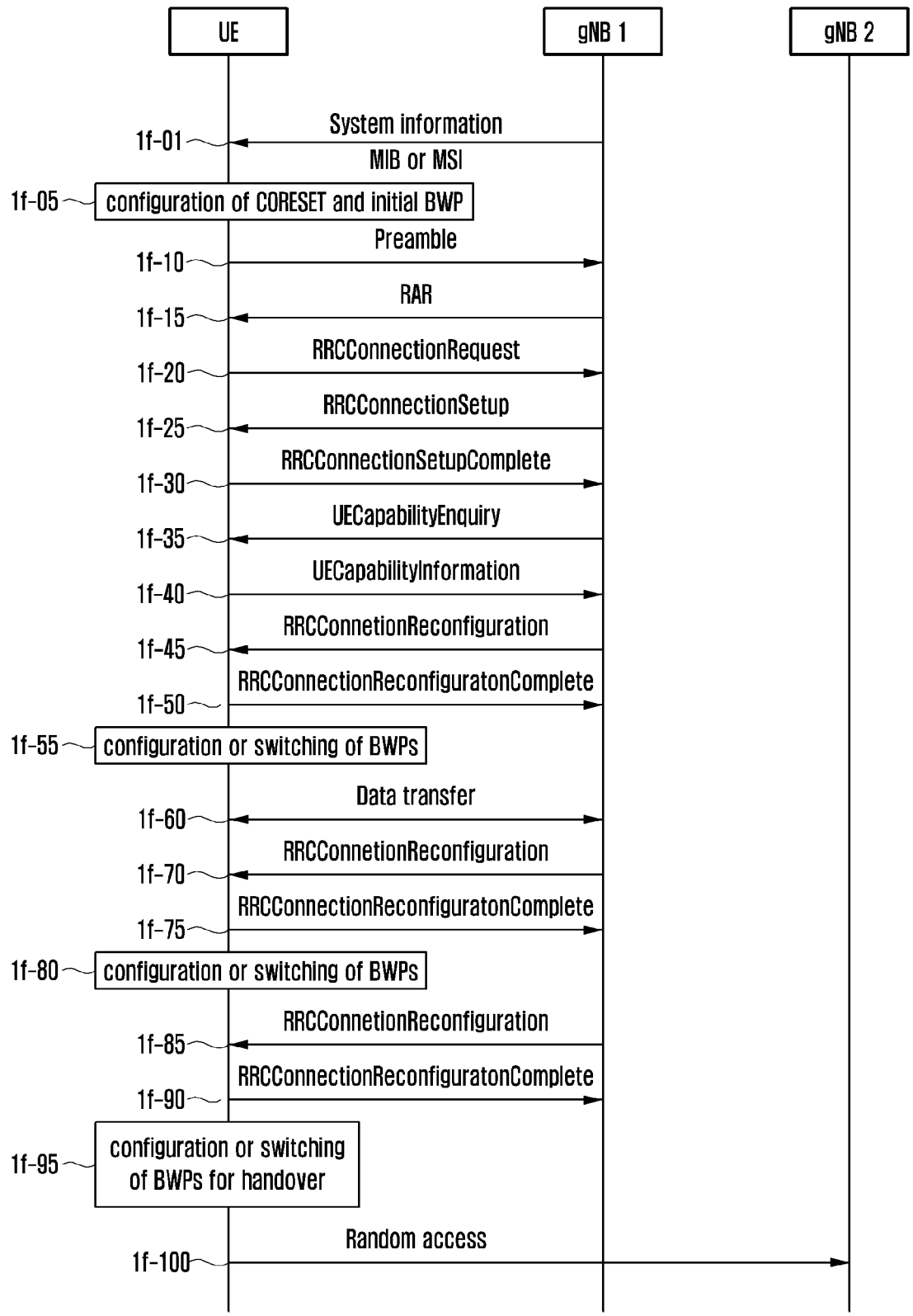
FIG. 1F illustrates a procedure for a terminal transitions to switch from a radio resource control (RRC) idle mode to an RRC connected mode and a procedure of configuring bearer configuration information, or cell group or cell configuration information, or channel measurement configuration information for connection to a terminal, in a next-generation mobile communication system according to various embodiments of the present disclosure.
Figure 1G:
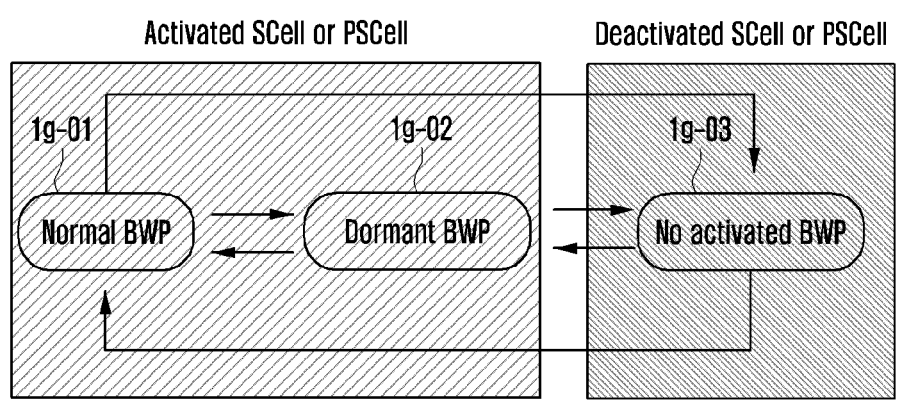
FIG. 1G illustrates a procedure of transitioning a state for each bandwidth part or switching the bandwidth part according to various embodiments of the present disclosure.
Figure 1H:
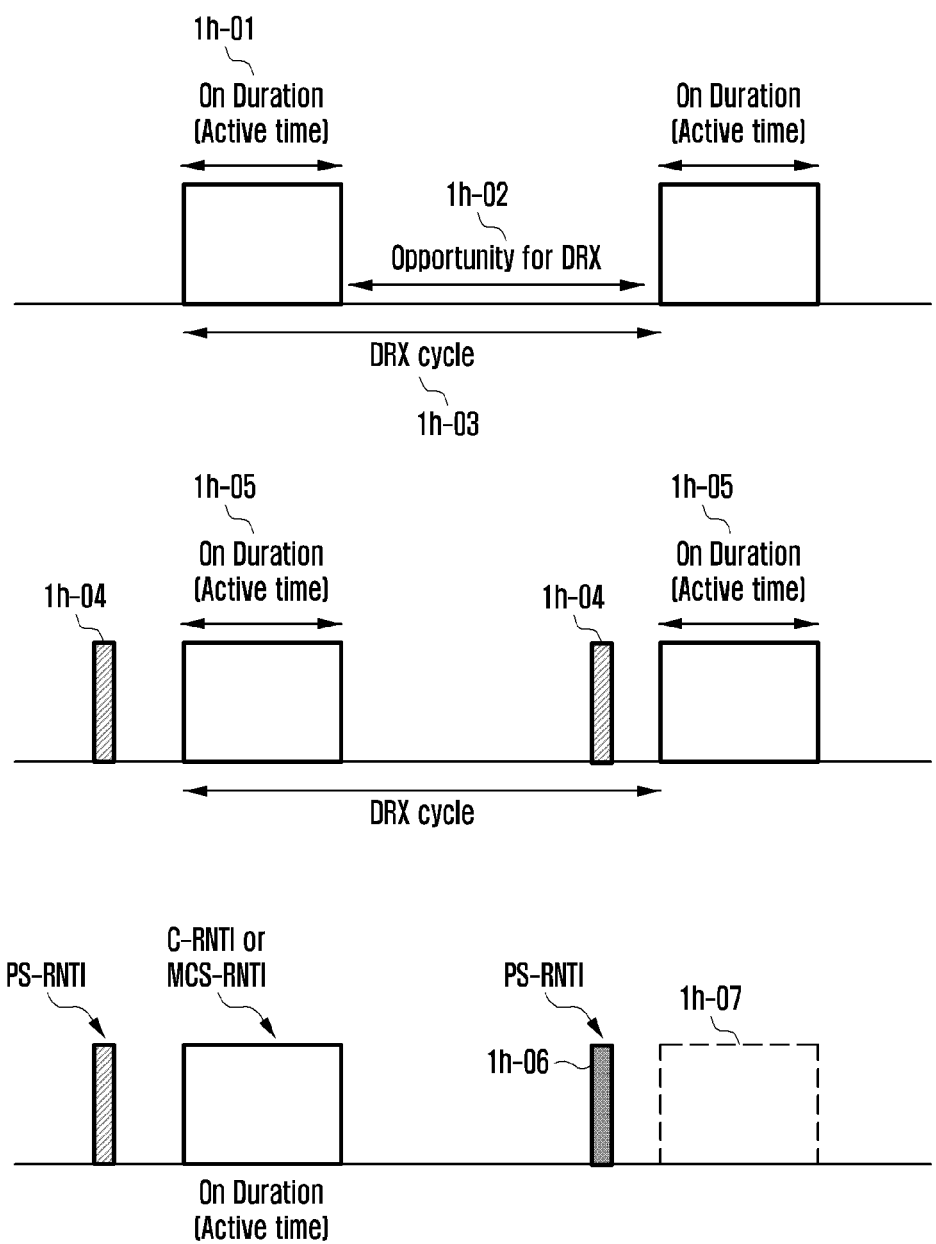
FIG. 1H illustrates a discontinuous reception (DRX) configuration or DRX operation method by which a battery consumption of a terminal can be reduced according to various embodiments of the present disclosure.
Figure 1I:
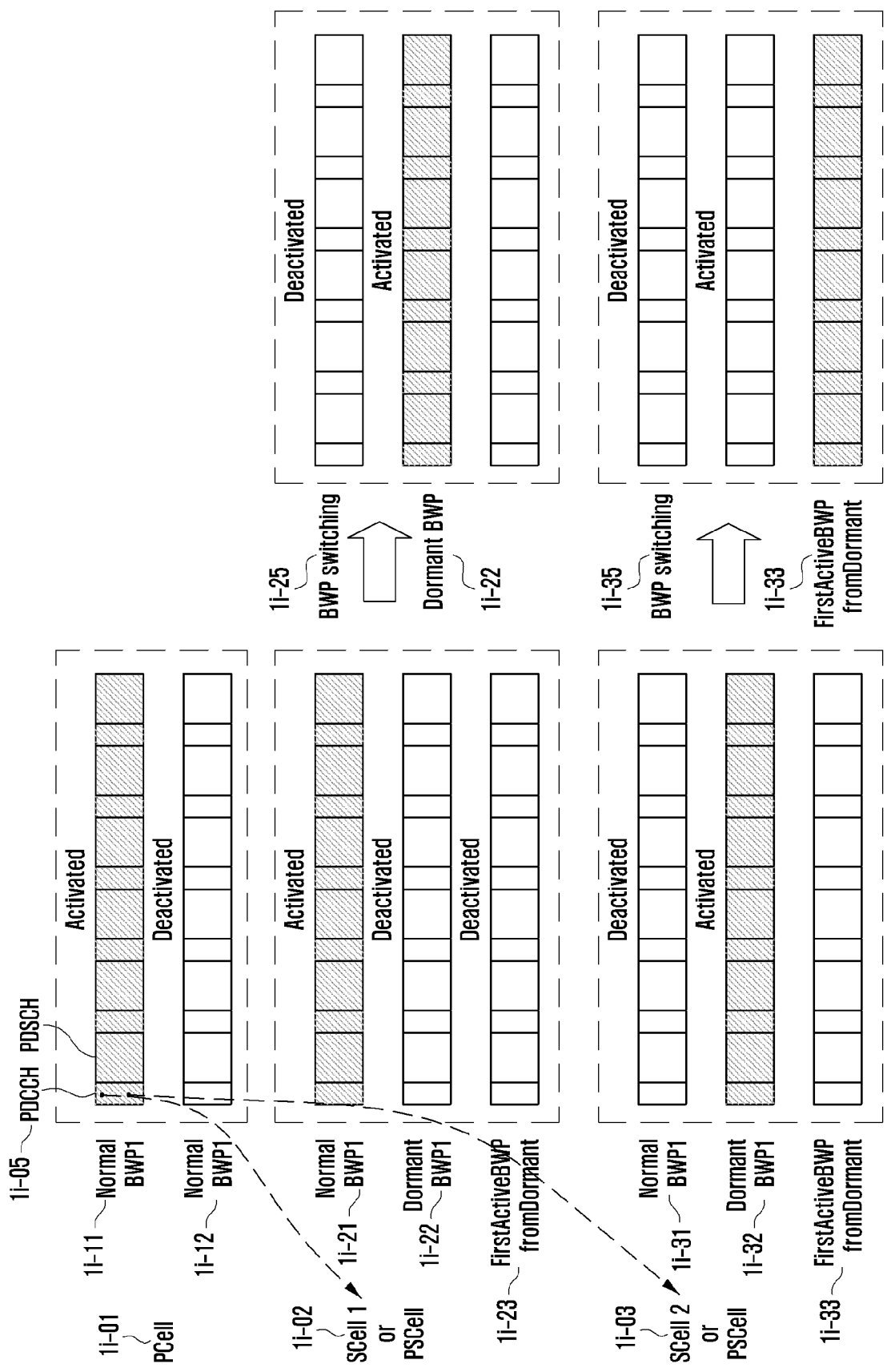
FIG. 1I illustrates a concept of a method of operating a dormant bandwidth part in an activated SCell or PSCell according to various embodiments of the present disclosure.
Figure 1J:
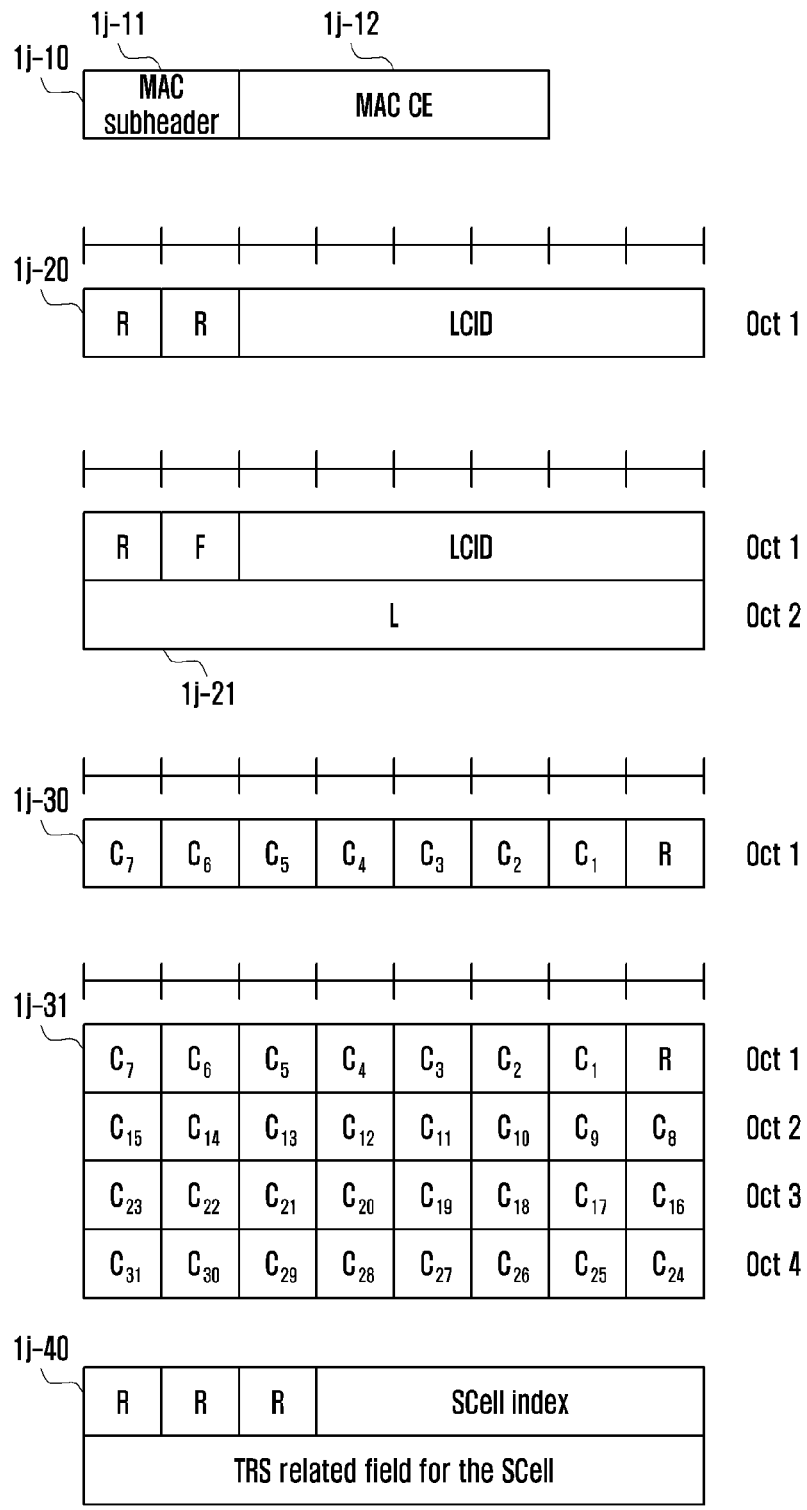
FIG. 1J illustrates medium access control (MAC) control information according to various embodiments of the present disclosure.
Figure 1K:
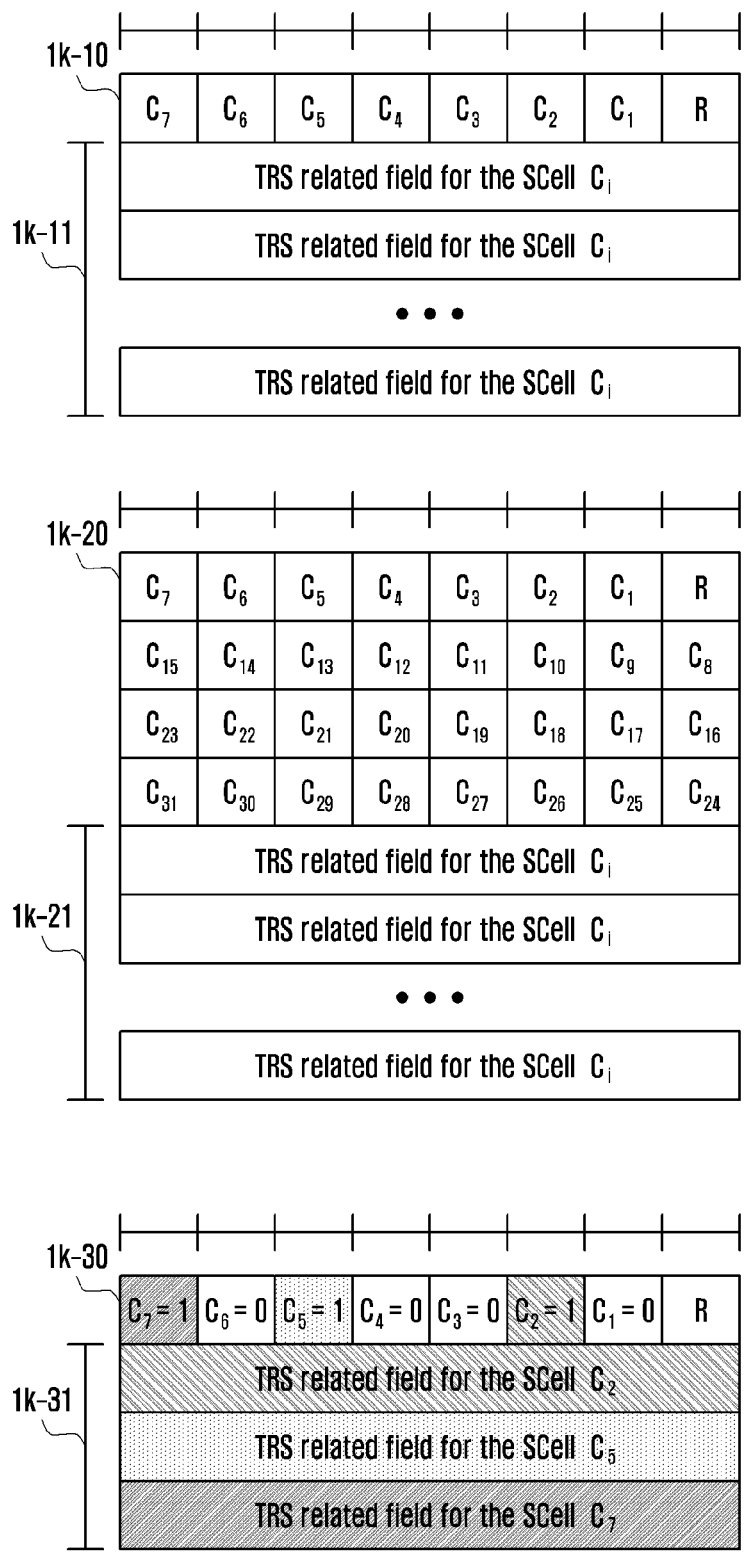
FIG. 1K illustrates MAC control information according to various embodiments of the present disclosure.
Figure 1M:
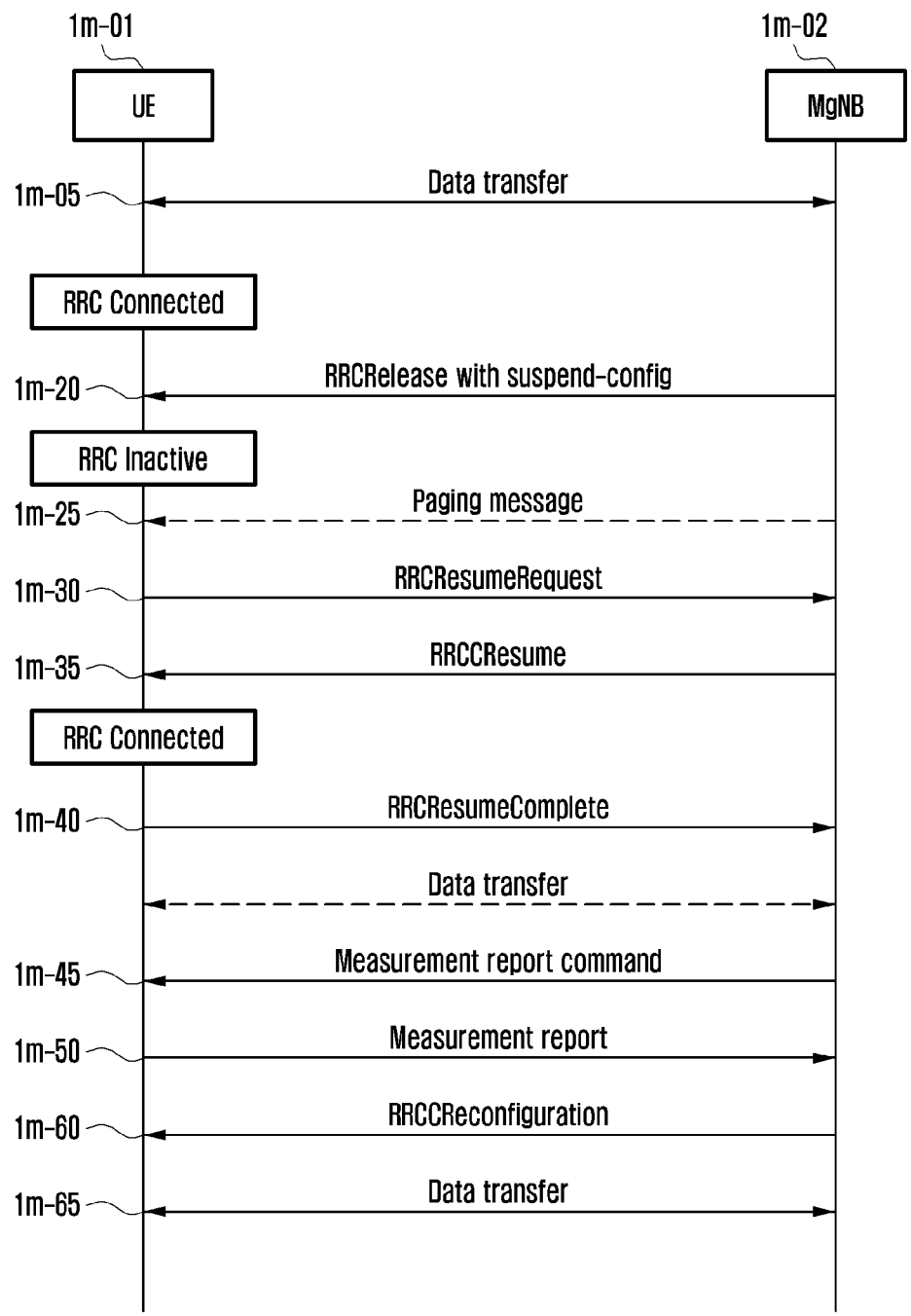
FIG. 1M illustrates a signaling flow in an RRC inactive mode according to various embodiments of the present disclosure.
Figure 1N:
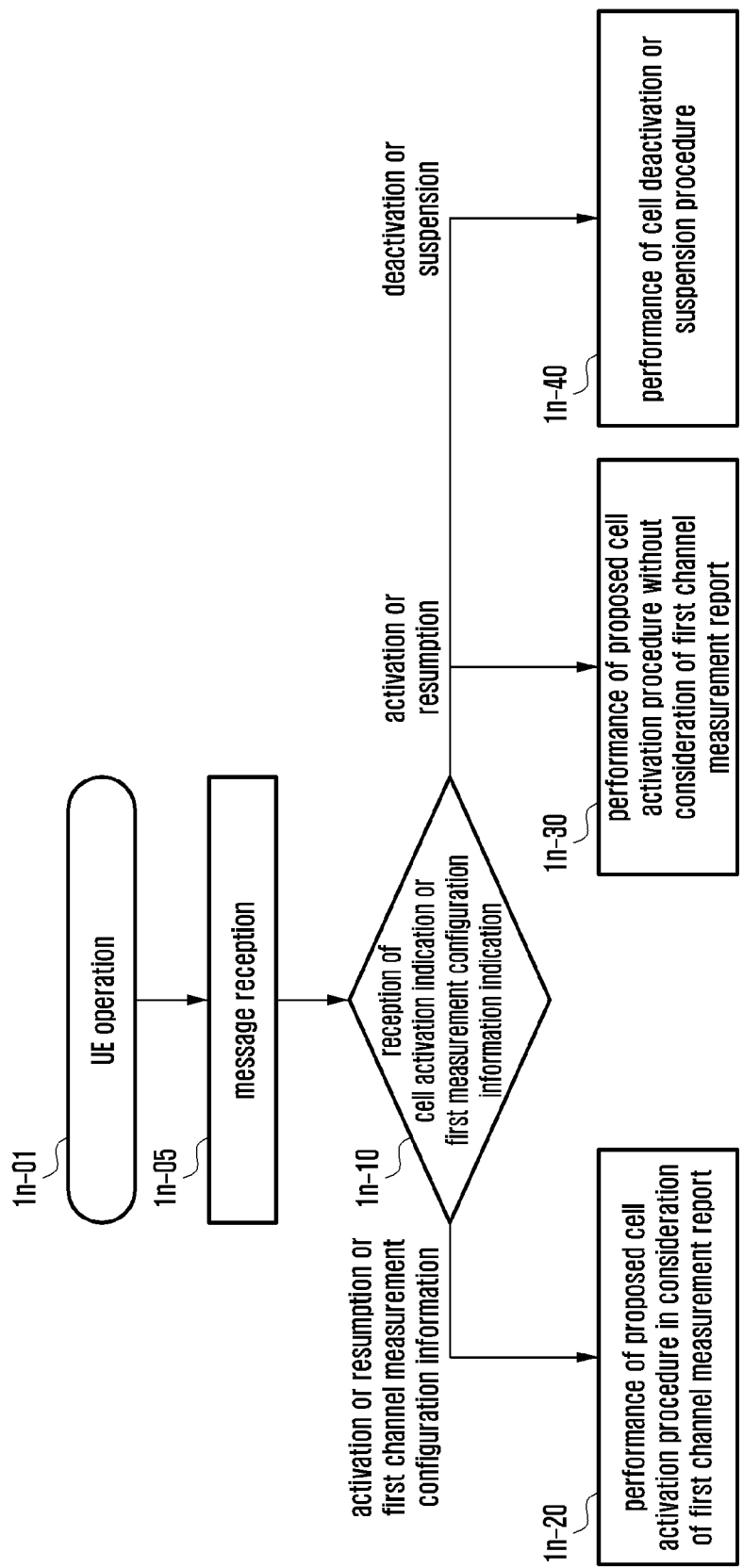
FIG. 1N illustrates an operation of a terminal according to various embodiments of the present disclosure.
Figure 10:
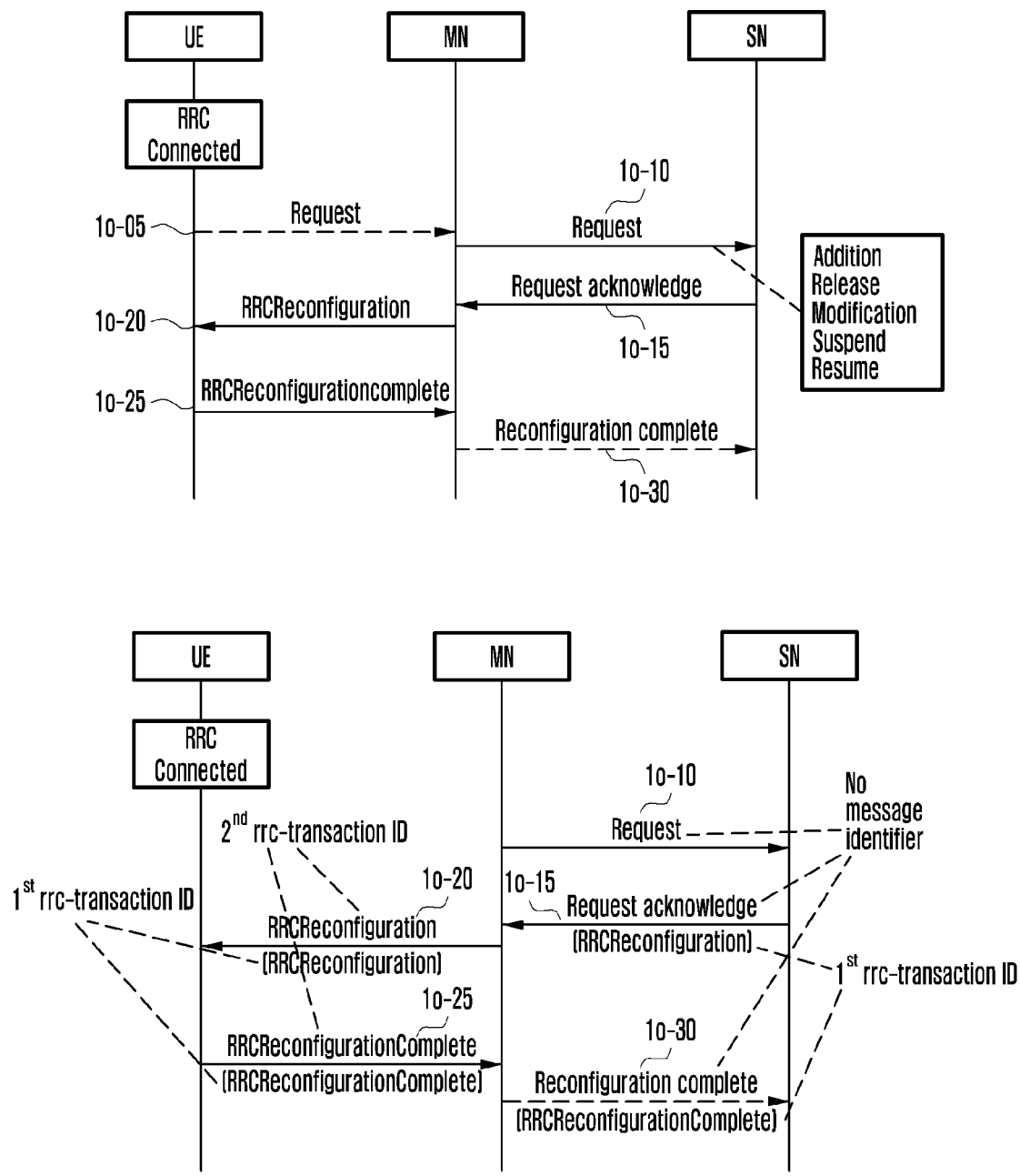
Figure 1P:
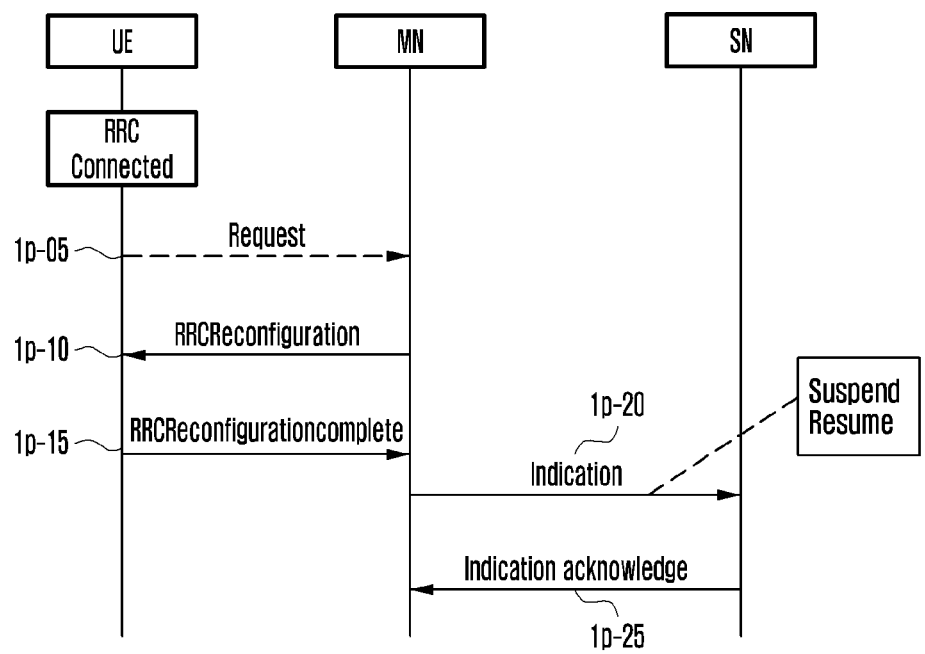
FIG. 1P illustrates another signaling procedure of configuring or releasing dual connectivity, or configuring or releasing or activating or resuming or suspending or deactivating a secondary cell group configured with dual connectivity according to various embodiments of the present disclosure.
Figure 1Q:
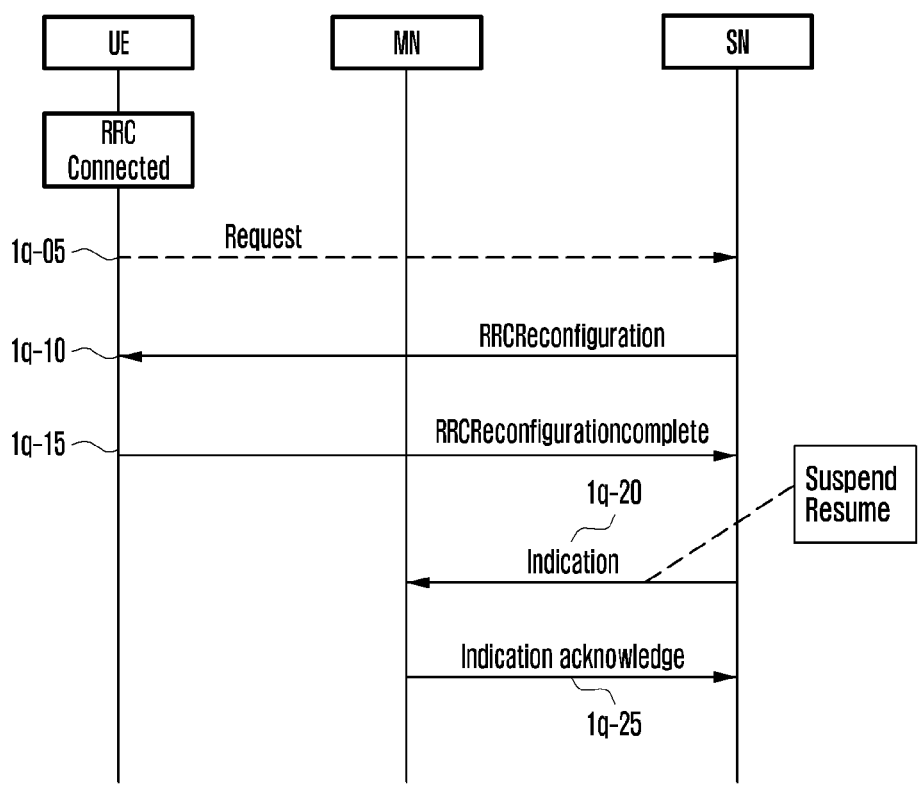
FIG. 1Q illustrates another signaling procedure of configuring or releasing dual connectivity, or configuring or releasing or activating or resuming or suspending or deactivating a secondary cell group configured with dual connectivity according to various embodiments of the present disclosure.
Figure 1R:
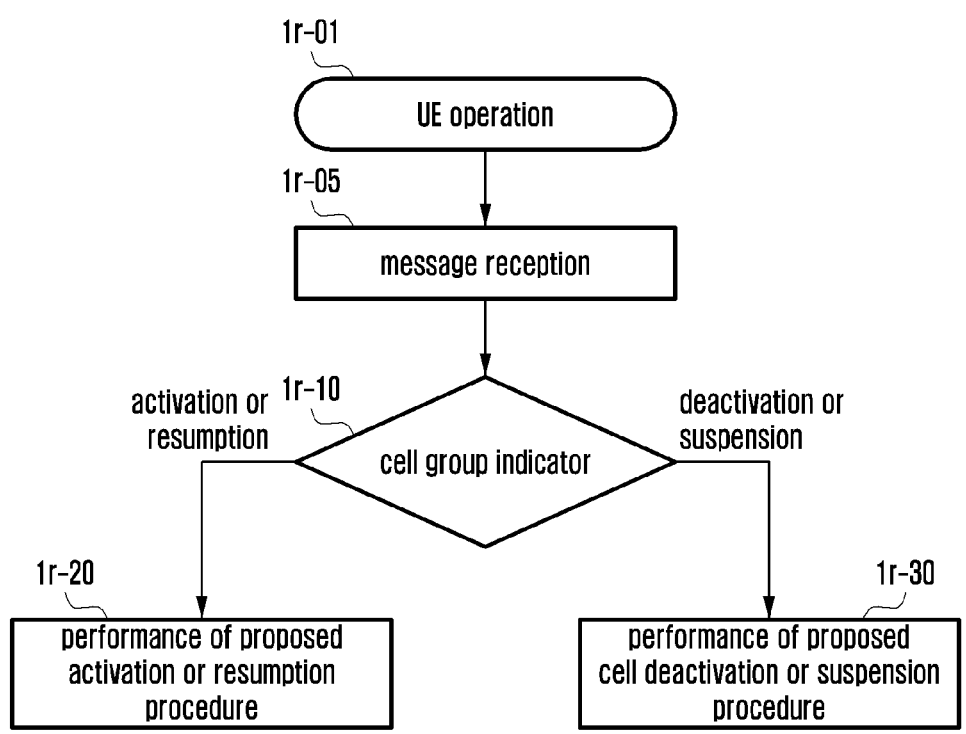
FIG. 1R illustrates an operation of a terminal according to various embodiments of the present disclosure.
Figure 1S:
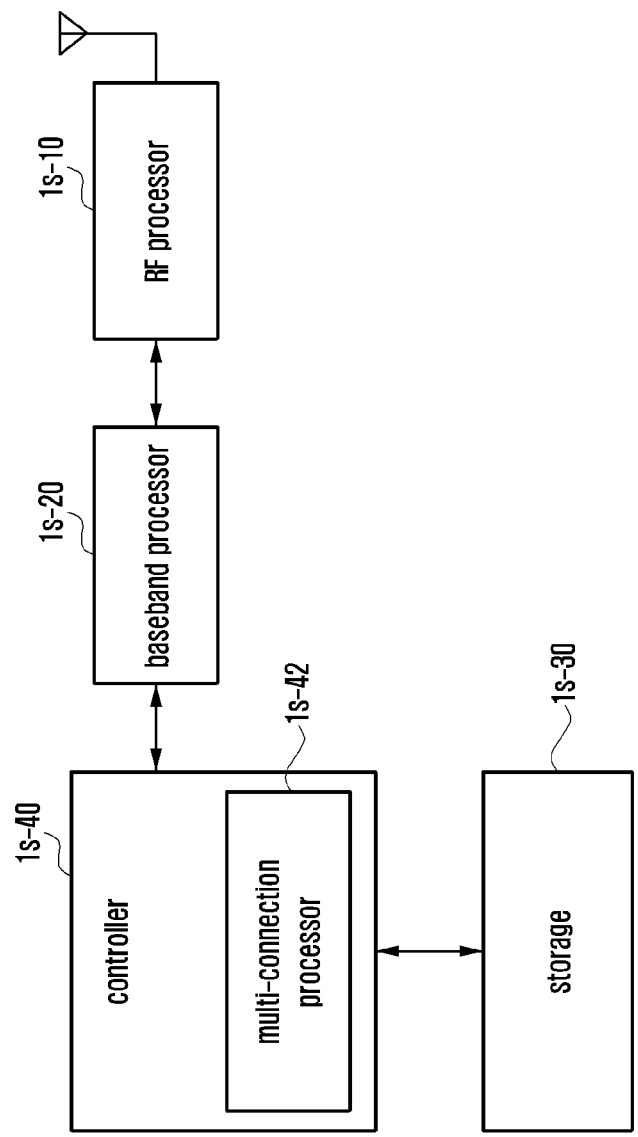
FIG. 1S illustrates a structure of a terminal according to various embodiments of the present disclosure.
Figure 1T:
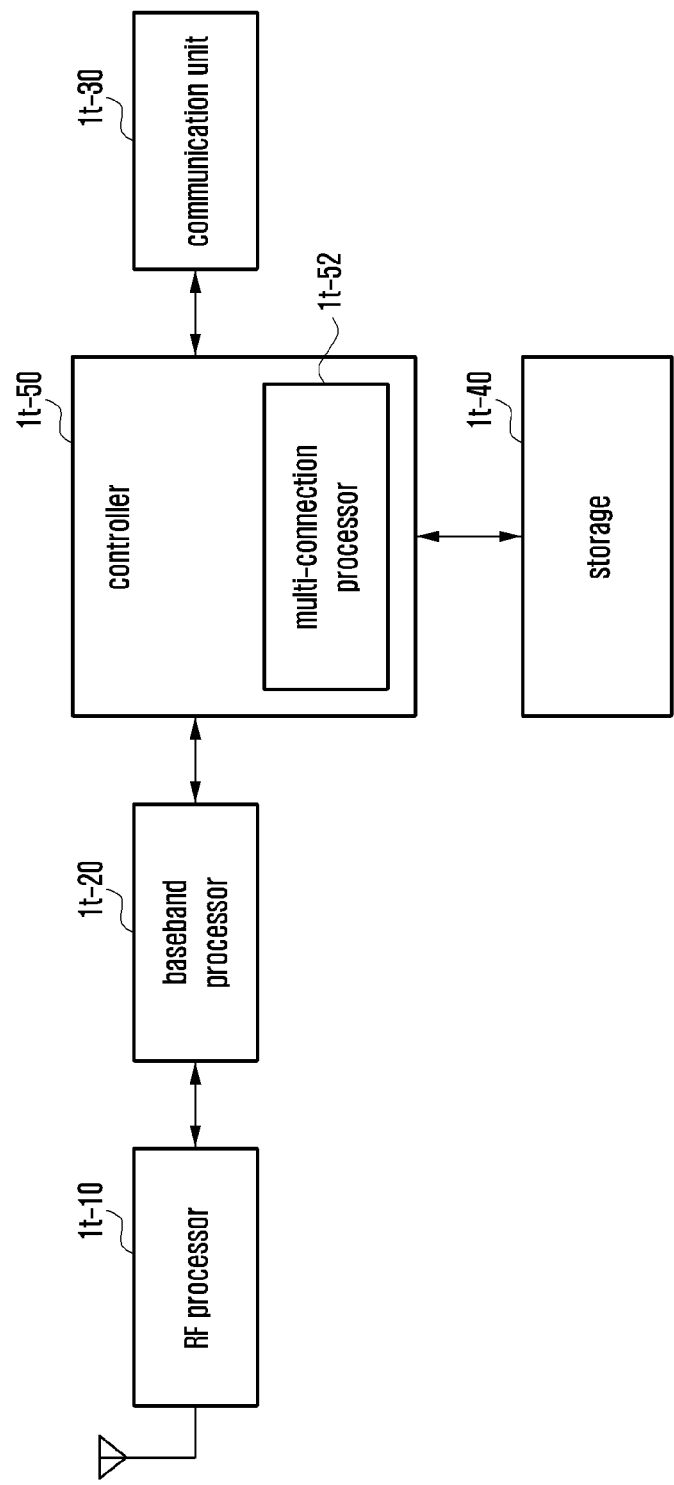
FIG. 1T illustrates a structure of a base station or transmission and reception point (TRP) according to various embodiments of the present disclosure.

FIGS. 1A through 1T, discussed below, and the various embodiments used to describe the principles of the present disclosure in this patent document are by way of illustration only and should not be construed in any way to limit the scope of the disclosure Those skilled in the art will understand that the principles of the present disclosure may be implemented in any suitably arranged system or device.

Hereinafter, preferred embodiments of the present disclosure will be described with reference to the accompanying drawings. It should be noted that in the accompanying drawings, the same components are denoted by the same reference numerals whenever possible. Additionally, detailed descriptions of well-known functions and structures that may obscure the gist of the present disclosure will be omitted.

In describing embodiments in the disclosure, descriptions of technical contents that are well known in the technical field to which the present disclosure pertains and are not directly related to the present disclosure will be omitted. This is to more clearly convey the gist of the present disclosure by omitting unnecessary description.

For the same reason, in the accompanying drawings, some components are enlarged, omitted, or depicted schematically. Furthermore, the size of each component does not accurately reflect its real size. In the drawings, the same or similar components are assigned the same reference numerals.

The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments of the present disclosure are provided to only complete the present disclosure and to allow those skilled in the art to understand the category of the present disclosure. The present disclosure is defined by the category of the claims. The same reference numerals will be used to refer to the same or similar components throughout the drawings.

In this case, it will be understood that each block of the flowchart illustrations and combinations of the flowchart illustrations can be executed by computer program indications. These computer program indications may be mounted on the processor of a general purpose computer, a special purpose computer, or other programmable data processing apparatus, so that the indications executed by the processor of the computer or other programmable data processing apparatus create means for executing the functions specified in the flowchart block(s). These computer program indications may also be stored in computer-usable or computer-readable memory that can direct a computer or other programmable data processing equipment to function in a particular manner, so that the indications stored in the computer-usable or computer-readable memory produce an article of manufacture including indication means that implement the function specified in the flowchart block(s). The computer program indications may also be loaded into a computer or other programmable data processing apparatus to cause a series of operational steps performed on the computer or other programmable data processing apparatus to produce a computer-executed process, so that the indications performing the computer or other programmable data processing apparatus provide the steps for executing the functions described in the flowchart block(s).

Furthermore, each block may represent a portion of a module, a segment, or code, which includes one or more executable indications for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit," as used in the present embodiment means software or a hardware component, such as a field programmable gate array (FPGA) or an application-specific integrated circuit (ASIC), and the "unit" performs specific tasks. However, the "unit" is not limited to software or hardware. The "unit" may be constituted to reside on an addressable storage medium and constituted to operate on one or more processors. Accordingly, according to some embodiments, the "unit" may include components such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units" Furthermore, the components and "units" may be implemented to operate one or more CPUs within a device or a security multimedia card.

In the following description, the terms for identifying access nodes, and the terms indicating network entities, messages, interfaces between network entities, various identification information, and the like exemplified for convenience of explanation of the disclosure. Accordingly, the terms used in the following description are not limited to specific meanings and they may be replaced by other terms that are equivalent in technical meaning.

For convenience of description, some of terms and names defined in the 3rd generation partnership project long term evolution (3GPP LTE) standard may be used. However, the present disclosure is not limited by the above-mentioned terms and names, and can be equally applied to systems conforming to other standards. In the disclosure, an eNB may be used interchangeably with a gNB for convenience of description. In other words, a base station described as an eNB may also indicate a gNB.

FIG. 1A is a diagram illustrating a structure of an LTE system according to various embodiments of the present disclosure.

With reference to FIG. 1A, a radio access network of an LTE system includes Evolved Node Bs (hereinafter ENBs or Node Bs or base stations) 1a-05, 1a-10, 1a-15, and 1a-20, a mobility management entity (MME) 1a-25, and a serving-gateway (S-GW) 1a-30, as illustrated. A user equipment (hereinafter UE or a terminal) 1a-35 accesses an external network via the ENB 1a-05 through 1a-20 and the S-GW 1a-30.

In FIG. 1A, the ENBs 1a-05 through 1a-20 correspond to an existing node B of an UMTS. The ENBs are connected to the UE 1a-35 through a radio channel and perform complex functions compared to the existing node B Because all user traffic including real-time services such as voice over IP (VoIP) is serviced through shared channels in the LTE system, a device for collating buffer status information of UEs, available transmission power status information, channel status information, etc. and performing scheduling is required and the ENBs 1a-05 through 1a-20 serve as such the device. A single ENB generally controls multiple cells. For example, the LTE system uses radio access technology such as orthogonal frequency division multiplexing (OFDM) at a bandwidth of 20 MHz to achieve a transmission rate of 100 Mbps. The LTE system also uses adaptive modulation and coding (hereinafter AMC) to determine a modulation scheme and a channel coding rate in accordance with a channel status of the UE. The S-GW 1a-30 is a device for providing data bearers and generates or releases the data bearers under the control of the MME 1a-25. The MME is a device for performing a mobility management function and various control functions for the UE and is connected to multiple ENBs.

FIG. 1B is a diagram illustrating a radio protocol structure in an LTE system according to various embodiments of the present disclosure.

With reference to FIG. 1b, the radio protocol of the LTE system includes packet data convergence protocols (PDCPs) 1b-05, 1b-40, radio link controls (RLCs) 1b-10, 1b-35, and media access controls (MACs) 1b-15, 1b-30 respectively for the JE and the ENB. The PDCPs 1b-05, 1b-40 are in charge of IP header compression/decompression, etc. Main functions of the PDCPs are summarized below:
  Header compression and decompression function (Header compression and decompression: ROHC only);
  User data transmission function (Transfer of user data);
  Sequential delivery function (In-sequence delivery of upper layer PDUs at PDCP re-establishment procedure for RLC AM);
  Sequence re-arrangement function (For split bearers in DC (only support for RLC AM): PDCP PDU routing for transmission and PDCP PDU reordering for reception);
  Duplicate detection function (Duplicate detection of lower layer SDUs at PDCP re-establishment procedure for RLC AM);
  Retransmission function (Retransmission of PDCP SDUs at handover and, for split bearers in DC, of PDCP PDUs at PDCP data-recovery procedure, for RLC AM);
  Ciphering and deciphering function (Ciphering and deciphering); and
  Timer-based SDU removal function (Timer-based SDU discard in uplink).

The radio link controls (hereinafter RLCs) 1b-10, 1b-35 perform an ARQ operation and the like by reconfiguring PDCP protocol data unit (PDU) or RLC service data unit (SDU) to appropriate sizes. Main functions of the RLCs are summarized below:
  Data transmission function (Transfer of upper layer PDUs);
  ARQ function (Error Correction through ARQ (only for AM data transfer));
  Concatenation, segmentation, and reassembly function (Concatenation, segmentation and reassembly of RLC SDUs (only for UM and AM data transfer)),
  Re-segmentation function (Re-segmentation of RLC data PDUs (only for AM data transfer));
  Reordering function (Reordering of RLC data PDUs (only for UM and AM data transfer);
  Duplication detection function (Duplicate detection (only for UM and AM data transfer));
  Error detection function (Protocol error detection (only for AM data transfer));
  RLC SDU deletion function (RLC SDU discard (only for UM and AM data transfer)); and
  RLC reestablishment function (RLC re-establishment).

The MACs 1b-15, 1b-30 are connected to multiple RLC layer devices constituted for a single UE and may multiplex RLC PDUs into a MAC PDU and demultiplex the RLC PDUs from the MAC PDU. Main functions of the MACs are summarized below:
  Mapping function (Mapping between logical channels and transport channels);
  Multiplexing and demultiplexing function (Multiplexing/demultiplexing of MAC SDUs belonging to one or different logical channels into/from transport blocks (TB) delivered to/from the physical layer on transport channels);
  Scheduling information report function (Scheduling information reporting);
  HARQ function (Error correction through HARQ),
  Logical channel priority control function (Priority handling between logical channels of one UE),
  UE priority control function (Priority handling between UEs by means of dynamic scheduling);
  MBMS service identification function (MBMS service identification);
  Transport format selection function (Transport format selection); and
  Padding function (Padding).

A physical layer 1b-20, 1b-25 performs channel-code and modulates upper layer data into OFDM symbols and transmits the OFDM symbols through a radio channel, or demodulates OFDM symbols received through a radio channel and performs channel-decode and delivers the OFDM symbols to an upper layer.

FIG. 1C illustrates a structure of a next-generation mobile communication system according to various embodiments of the present disclosure.

With reference to FIG. 1C, a radio access network of the next-generation mobile communication system (hereinafter NR or 5G) includes a new radio node B (hereinafter NR gNB or NR base station) 1c-10 and a new radio core network (NR CN) 1c-05. A new radio user equipment (hereinafter NR UE or terminal) 1c-15 accesses an external network via the NR gNB 1c-10 and the NR CN 1c-05.

In FIG. 1C, the NR gNB 1c-10 corresponds to an evolved node B (eNB) of an existing LTE system. The NR gNB is connected to the NR UE 1c-15 through a radio channel and may provide superior services compared to an existing NB. Because all user traffic data is serviced through a shared channel in the next-generation mobile communication system, a device for collating status information such as buffer status of UEs, available transmission power status, channel status, etc. and performing scheduling is required and such operations is performed by the NR NB 1c-10. A single NR gNB generally controls multiple cells. A bandwidth greater than the existing maximum bandwidth of LTE may be given to achieve a current ultrahigh data rate, and beamforming technology may be added to radio access technology such as orthogonal frequency division multiplexing (hereinafter OFDM). Also, an adaptive modulation & coding (hereinafter AMC) method that determines a modulation scheme and a channel coding rate according to the channel state of the terminal is applied. The NR CN 1c-05 performs functions such as mobility support, bearer configuration, and QoS configuration. The NR CN is a device for performing a mobility management function and various control functions for the UE and is connected to multiple base stations. The next generation mobile communication system may cooperate with the existing LTE system, and the NR CN is connected to an MME 1c-25 through a network interface. The MME is connected to an existing eNB 1c-30.

FIG. 1D illustrates a radio protocol structure of a next-generation mobile communication system according to various embodiments of the present disclosure.

With reference to FIG. 1D, the radio protocol of the next-generation mobile communication system includes NR SDAPs 1d-0l, 1d-45, NR PDCPs 1d-05, 1d-40, NR RLCs 1d-10, 1d-35, NR MACs 1d-15, 1d-30 respectively for a UE and an N R gNB.

Main functions of the NR SDAPs 1d-01, 1d-45 may include some of the following functions:
  User data transmission function (transfer of user plane data);
  Function of mapping QoS flow and a data bearer for uplink and downlink (mapping between a QoS flow and a DRB for both DL and UL);
  Function of marking a QoS flow ID for uplink and downlink (marking QoS flow ID in both DL and UL packets); and
  Function of mapping reflective QoS flow to a data bearer for uplink SDAP PDUs (reflective QoS flow to DRB mapping for the UL SDAP PDUs).

With respect to the SDAP layer device, the UE may receive, via an RRC message, configuring on whether to use a header of the SDAP layer device or use a function of the SDAP layer device for each PDCP layer device, bearer, or logical channel. In case that an SDAP header is configured, the UE may indicate the NAS reflective QoS 1-bit indicator and AS reflective QoS 1-bit indicator of the SDAP header to update or reconfigure mapping information regarding the data bearer and QoS flow of UL and DL. The SDAP header may include QoS flow ID information indicating QoS. Also, the QoS information may be used as data processing priority information, scheduling information, etc. for supporting a smooth service.

Main functions of the NR PDCPs 1D-05, 1D-40 may include some of the following functions:
  Header compression and decompression function (Header compression and decompression: ROHC only);
  User data transmission function (Transfer of user data);
  Sequential delivery function (In-order delivery of upper layer PDUs);
  Non-sequential delivery function (Out-of-order delivery of upper layer PDUs);
  Reordering function (PDCP PDU reordering for reception);
  Duplicate detection function (Duplicate detection of lower layer SDUs),
  Retransmission function (Retransmission of PDCP SDUs);
  Ciphering and deciphering function (Ciphering and deciphering);
  Integrity protection and verification function (integrity protection and verification); and
  Timer-based SDU discard function (Timer-based SDU discard in uplink).

The reordering function of the NR PDCP device may include a function of reordering PDCP PDUs received from a lower layer, on a PDCP sequence number (SN) basis, a function of delivering the reordered data to an upper layer in order or a function of immediately delivering the reordered data without considering an order, a function of recording missing PDCP PDUs by reordering, a function of reporting status information of the missing PDCP PDUs to a transmitter, or a function of requesting to retransmit the missing PDCP PDUs.

The main functions of the NR RLCs 1d-10, 1d-35 may include at least some of the following functions:
  Data transmission function (Transfer of upper layer PDUs);
  Sequential delivery function (In-order delivery of upper layer PUs);
  Non-sequential delivery function (Out-of-order delivery of upper layer PDUs);
  ARQ function (Error Correction through ARQ);
  Concatenation, segmentation, and reassembly function (Concatenation, segmentation and reassembly of RLC SDUs);
  Re-segmentation function (Re-segmentation of RLC data PDUs);
  Reordering function (Reordering of RLC data PDUs);
  Duplicate detection function (Duplicate detection);
  Error detection function (Protocol error detection);
  RLC SDU deletion function (RLC SDU discard); and
  RLC reestablishment function (RLC re-establishment).

The in-order delivery function of the NR RLC device refers to a function of delivering RLC SDUs received from a lower layer, to an upper layer in order, a function of reassembling multiple RLC SDUs segmented from an RLC SDU and delivering the RLC SDU in case that the segmented RLC SDUs are received, a function of reordering received RLC PDUs on an RLC sequence number (SN) or PDCP SN basis and a function of recording missing RLC PDUs by reordering, a function of reporting status of the missing RLC PDUs to a transmitter, a function of requesting to retransmit the missing RLC PD Us, a function of delivering only RLC SDUs previous to a missing RLC SDU, to the upper layer in order, in case that the missing RLC SDU exists, a function of delivering all RLC SDUs received before a timer is started, to the upper layer in order, although a missing RLC SDU exists, when a certain timer is expired, or a function of delivering all RLC SDUs received up to a current time, to the upper layer in order, although a missing RLC SDU exists, when a certain timer is expired.

Further, the NR RLC device may process the RLC PDUs in order of reception (in order of arrival regardless of sequence numbers) and deliver the RLC PDUs to a PDCP device out-of-order (out-of-sequence delivery), and in case of segment, reassemble segments received or stored in a buffer, into a whole RLC PDU and process and deliver the RLC PDU to the PDCP device. The NR RLC layer may not have a concatenation function, and the concatenation function may be performed by the NR MAC layer or be replaced with a multiplexing function of the NR MAC layer. In the above, whether to perform in-order delivery or out-of-order delivery may be configured with the RRC message.

The out-of-sequence delivery function of the NR RLC device may refer to a function of delivering the RLC SDUs received from the lower layer to the upper layer out-of-order, and may include a function of reassembling multiple RLC SDUs segmented from an RLC SDU and delivering the RLC SDU in case that the segmented RLC SDUs are received, or a function of storing RLC SNs or PDCP SNs of received RLC PDUs and recording missing RLC PDUs by ordering the RLC PDUs.

The NR MAC 1d-15, 1d-30 may be connected to multiple NR RLC layer devices configured for a single UE, and main functions of the NR MAC may include at least some of the following functions:

Mapping function (Mapping between logical channels and transport channels);
Multiplexing and demultiplexing function (Multiplexing/demultiplexing of MAC SDUs);
Scheduling information report function (Scheduling information reporting);
HARQ function (Error correction through HARQ),
Logical channel priority control function (Priority handling between logical channels of one UE);
UE priority control function (Priority handling between UEs by means of dynamic scheduling);
MBMS service identification function (MBMS service identification);
Transport format selection function (Transport format selection); and
Padding function (Padding)

The NR PHY layer 1d-20, 1d-25 may channel-code and modulate upper layer data into OFDM symbols and transmit the OFDM symbols through a radio channel, or demodulate OFDM symbols received through a radio channel and channel-decode and deliver the OFDM symbols to an upper layer.

In a next generation mobile communication system, a very high frequency band may be used, and thus a frequency bandwidth may also be very wide. However, supporting all of very wide bandwidths in terminal implementation requires high implementation complexity and high costs. Accordingly, in a next generation mobile communication system, a concept of a bandwidth part (BWP) may be introduced, and a plurality of bandwidth parts (BWP) may be configured for one cell (an SPCell or an SCell), and data may be transmitted or received to or from one or a plurality of bandwidth parts according to indication of a base station.

The disclosure proposes a state transition method or bandwidth part switching method or a detailed operation considering a state of an Scell and a plurality of bandwidth parts configured in the Scell when a dormant bandwidth part provided in the disclosure is introduced. Further, the disclosure manages a dormancy mode in units of bandwidth parts (BWP-levels) and proposes a state transition method or a bandwidth part switching method, and also proposes a detailed operation in a bandwidth part according to a state of each Scell or a state or a mode (active, inactive, or dormant) of each bandwidth part.

In addition, in order to quickly activate a cell (Scell) or a bandwidth part, first channel measurement configuration information for the cell or bandwidth part is configured as an RRC message or MAC CE, and the UE is indicated by the RRC message or MAC CE to apply and use (activate) the first channel measurement configuration information, so that the UE may quickly measure the channel signal (e.g., reference signal) for the cell or bandwidth part and quickly reports the measurement result to the base station, thereby quickly activating the cell or the bandwidth part. Activating the cell or the bandwidth part means a procedure in which the UE monitors the PDCCH in the cell or bandwidth part, or the base station transmits the PDCCH to the UE, or the base station transmits downlink data (PDSCH) to the UE, or the UE transmits the uplink data (PUSCH), or the UE transmits a measurement result or HARQ ACK or NACK to the PUCCH, or the UE transmits a sounding reference signal (SRS), or the UE measures the channel measurement signal (synchronization signal block (SSB)) or channel state information reference signal (CSI-SS) or reference signal (RS) transmitted by the base station, or the UE measures the channel measurement signal transmitted by the base station and reports the result.

In the above, the first channel measurement configuration information may include configuration information for a channel measurement signal for a specific UE (or specific UEs) by the base station in the cell or bandwidth part. For example, the first channel measurement configuration information may include a cycle of the channel measurement signal, or a number of times a signal is transmitted, or an offset with respect to a period during which the signal is transmitted or a time at which the signal is transmitted, or the length of time between transmitted signals, or a list of a plurality of channel measurement signals that can be transmitted, or a time transmission resource (or frequency transmission resource) indicating the location of the transmitted signal, or a report period of the measurement result.

In addition, the first channel measurement configuration information configured as an RRC message may include a plurality of channel measurement signal information, and the UE is indicated by any one channel measurement signal information of the plurality of channel measurement signal information configured or beam configuration information as an RRC message or MAC CE or DCI so as to apply or use the indicated channel measurement signal information or beam configuration information to perform channel measurement or perform channel measurement report. In another method, by configuring or indicating the channel measurement signal information as the RRC message or MAC CE, the UE may perform channel measurement or channel measurement reporting by applying or using the configured (or indicated) channel measurement signal information. In addition, the first channel measurement configuration information may be configured differently for each cell or for each bandwidth part for a plurality of cells or bandwidth parts configured in the RRC message, and in order to support the UE to easily measure the transmission resource for measuring the channel, beam-related configuration information (transmission configuration indication (TCI) state or quasi co-location (QCL)) such as a beam direction or a beam number or a beam location may be configured together.

In addition, the first channel measurement configuration information may be configured with a timing advance (TA) value (or offset value) for synchronizing a downlink signal of a base station or an uplink signal of a base station, or a time alignment timer (TAT) indicating validity of the TA value, or a timer value (TAT value) to correctly perform channel measurement or channel measurement report.

The first channel measurement configuration information provided in the disclosure may be configured only for downlink bandwidth part configuration information for each cell. That is, the first channel measurement configuration information provided in the disclosure may not be configured for uplink bandwidth part configuration information for each cell. This is because the UE can correctly receive the PDCCH and follow the indications by the base station only after first measuring the channel for the downlink and then reporting the measurement result for the channel or cell.

The first channel measurement configuration information provided in the disclosure is initially deactivated when the first channel measurement configuration information is configured as an RRC message or after handover, and may be activated later by the MAC control information provided in the disclosure or the DCI of PDCCH or the RRC message. In case that the first channel measurement configuration information is configured as an RRC message as described above, the base station can easily manage the cell state or channel measurement procedure of the terminal only when the initial state is configured to be in an inactive state, and without a problem of processing delay of the RRC message, the timing of when and how the UE performs channel measurement can also be accurately performed.

In addition, the disclosure may configure a plurality of bandwidth parts for each downlink or uplink in one cell (Spcell, Pcell, Pscell, or Scell) and may configure and operate active bandwidth part (active DL or UL BWP), or a dormant BWP (or dormant DL BWP), or an inactive bandwidth part (inactive or deactivated DL/UL BWP) through bandwidth part switching. That is, it is possible to increase a data transmission rate through a method similar to the carrier aggregation by transitioning a downlink or uplink BWP to an activated state for one cell. Further, the UE does not monitor a PDCCH to reduce the consumption of a battery by transitioning or switching the downlink BWP to a dormant BWP Further, the UE may measure a channel for the downlink BWP and report a channel measurement result, thereby supporting rapid activation of a cell or a BWP in the future. Further, it is possible to reduce the consumption of the battery of the UE by transitioning the downlink (or uplink) BWP to a deactivated state in one cell. An indication of the state transition between BWPs for each cell or BWP switching may be configured through an RRC message, a MAC CE, or downlink control information (DCI) of a PDCCH. The dormant bandwidth part may be extended and applied to a dual connectivity, for example, the dormant bandwidth part may be applied to the PSCell of a secondary cell group. As another method, the dormant bandwidth part is extended to The concept of cell group suspension or cell group deactivation, and cell group suspension or cell group deactivation is indicated to one cell group (e.g., secondary cell group) of a UE for which dual connectivity has been configured, so that the UE may reduce power consumption thereof by suspending data transmission or reception, suspending PDCCH monitoring, or intermittently performing PDCCH monitoring on the basis of a very long cycle in the indicated cell group.

In addition, when the cell group suspension or deactivation is indicated to the UE, the UE may perform channel measurement in a cell group for which cell group suspension or deactivation has been indicated, and may report a channel measurement result to a network (e.g., to a master cell group or a secondary cell group), so as to support quick activation of dual connectivity. With respect to the cell group for which cell group suspension or deactivation has been indicated, the UE performs procedures as described above, and in this case, the UE may maintain and store cell group configuration information without discarding or clearing the same, and also, according to a cell group activation or resumption indication from the network, the UE may use, apply or restore the cell group configuration information.

For example, the cell group configuration information (e.g., configuration information, bearer configuration information, or cell-specific configuration information of each of PDCP, RLC, or MAC layer device) configured for the UE may be stored or maintained as it is. If the UE receives a cell group resumption or activation indication for the cell group for which cell group suspension or deactivation has been indicated, the UE may resume, restore, or reapply configuration information of the cell group, or resume a bearer, or resume data transmission or reception, or resume PDCCH monitoring, or perform channel measurement report, or reactive a periodically configured transmission resource.

The cell group configuration information or cell (SpCell (Pcell or PSCell) or SCell) configuration information, or the previously configured cell group configuration information or cell (SpCell (Pcell or PSCell) or SCell) configuration information, or the message (e.g., RRC message or RRCReconfiguration or MAC control information or downlink control information (DCI) of PDCCH) indicating the activation or resumption of a cell group or a cell (SpCell (Pcell or PSCell) or SCell) may be configured by including the first cell measurement configuration information for quick activation of a cell group or a cell (SpCell (Pcell or PSCell) or SCell).

In order for the base station to temporary, many, or frequently transmit a channel measurement signal to allow the cell to quickly perform channel measurement to quickly activate the cell group, the first channel measurement configuration information may include, in the configuration information of the cell (e.g., PCell or PSCell or Scell) of the cell group, configuration information such as a cycle of a frequent channel measurement signal (e.g., radio resources, a temporary reference signal (TRS), a synchronization signal block (SSB), a channel state information reference signal (CSI-RS), or a reference signal (RS)), or transmission resource information for transmission (frequency or time transmission resource via which the frequent channel measurement signal is transmitted), an interval or number (the number of times the frequent channel measurement signal is transmitted), a timer value (time at which the frequent channel measurement signal is transmitted), or a time interval (interval in which the frequent channel measurement signal is transmitted (e.g., an offset of time unit (slot, subframe, symbol, or the like)), or a transmission resource, a cycle, an interval, a timing, or an offset for reporting the measurement result of the UE.

In the above, the first channel measurement configuration information may configure the transmission resource for channel measurement such that a reporting cycle (or transmission resource) via which the UE may report a channel measurement result can be configured short, or the base station can transmit many or frequently channel measurement signal (or transmission resources or for example, a radio resource or a temporary reference signal (TRS)) so as to support the UE to perform fast channel measurement or many signal measurements. In the above, the first channel measurement configuration information may include configuration information for a channel measurement signal for a specific UE (or specific UEs) by the base station in the cell or bandwidth part.

For example, the first channel measurement configuration information may include a cycle of the channel measurement signal, or a number of times a signal is transmitted, or a period during which a signal is transmitted, or an offset with respect to the time during which a signal is transmitted, or the length of time between transmitted signals, or a list of a plurality of channel measurement signals that can be transmitted, or a time transmission resource (or frequency transmission resource) indicating the location of a transmitted signal, or a transmission resource (a time transmission resource or a frequency transmission resource) to report the measurement result, or a cycle to report the measurement result. In addition, the first channel measurement configuration information may be configured differently for each cell or for each bandwidth part for a plurality of cells or bandwidth parts configured in the RRC message, and may configure beam-related configuration information (transmission configuration indication (TCI) state or quasi co-location (QCL)) such as a beam direction, a beam number, or a beam location together to support for the UE to easily measure the transmission resource for measuring a channel.

In addition, in the first channel measurement configuration information, a timing advance (TA) value (or an offset value) for synchronizing a downlink signal of a base station or an uplink signal of a base station, or a timer (time alignment tinier (TAT)) indicating validity of the TA value, or a timer value (a TAT value) may be configured to correctly perform channel measurement or channel measurement report. In addition, the first channel measurement configuration information configured as an RRC message may include a plurality of channel measurement signal information, and may indicate any one channel measurement signal information of the configured plurality of channel measurement signal information or beam configuration information as an RRC message or MAC CE or DCI so that the UE may apply or use the indicated chancel measurement signal information or beam configuration information to perform channel measurement or perform channel measurement report.

The above indicating method may define a mapping between a bitmap, an index, or an identifier, and each channel measurement signal information configured above, and may perform indication based on the defined mapping. As another method, a method may configure or indicate the channel measurement signal information as an RRC message or MAC CE so that the UE applies or uses the configured (or indicated) channel measurement signal information to perform channel measurement or channel measurement report.

The first channel measurement configuration information provided in the disclosure may be initially deactivated when the first channel measurement configuration information is configured as an RRC message or after handover, and may be activated later when first channel measurement configuration information is configured as the MAC control information provided by the disclosure, or DCI information of PDCCH, or the RRC message. In case that the first channel measurement configuration information is configured as the RRC message as described above, the first channel measurement configuration information has to be configured to be in an inactive initial state so that the base station can easily manage the cell state or channel measurement procedure of the UE, and the timing of when and how the UE performs channel measurement can also be accurately performed without the problem of processing delay of the RRC message.

The first channel measurement configuration information provided in the disclosure may be configured only for the downlink bandwidth part configuration information of each cell. That is, the first channel measurement configuration information provided in the disclosure may not be configured for the uplink bandwidth part configuration information of each cell. This is because the UE can receive PDCCH correctly and follow the indication of the base station only after the UE first measures the channel for the downlink and reports the measurement result for the channel or cell.

In addition, a message (e.g., an RRC message or RRCReconfiguration or MAC control information or downlink control information (DCI) of PDCCH) indicating activation or resumption of the cell group or cell (SpCell (Pcell or PSCell) or SCell) may include second channel measurement configuration information for measuring a signal of a cell (PSCell or PCell or SCell) of a cell group. The second channel measurement configuration information may include general channel measurement configuration information, such as a transmission resource, cycle, time interval, or number of times of channel measurement signal, or a transmission resource, a cycle, or a time interval for channel measurement report.

In the disclosure, the UE may perform channel measurement by applying the first channel measurement configuration information or the second channel measurement configuration information according to the following conditions, and may report a measurement result to the base station.
1> If the UE has received a message (e.g., PDCCH indicator, MAC control information, or RRC message) indicating to activate (or resume) a cell (PCell, PSCell, or SCell) or a cell group;
  2> If the first channel measurement configuration information is configured for the UE;
    3> The UE determines that the base station is to transmit many channel measurement signals or transmit a channel measurement signal frequently according to the first channel measurement configuration information, and may measure many channel measurement signals or measure a channel measurement signal frequently according to the first channel measurement configuration information temporarily (for example, up to a time interval (e.g., subframe, slot, or symbol) configured in the first channel measurement configuration information, during an appointed (or predetermined) time interval in consideration of an offset, for a time (e.g., while a timer is running)), or until a first condition is satisfied. Also, the UE may report the measured channel measurement result according to the cycle or transmission resource configured in the first channel measurement configuration information, up to a time interval (e.g., subframe, slot, or symbol) configured in the first channel measurement configuration information, during an appointed (or predetermined) time interval in consideration of an offset, for a time (e.g., while a timer is running), or until the first condition is satisfied. Therefore, as the UE is able to quickly measure the frequent channel measurement signal and quickly report the measurement result, the cell (PCell. SCell, or PSCell) or the cell group may be quickly activated (or resumed), or scheduling information may be quickly indicated. If second channel measurement configuration information is configured for the UE after the time interval (e.g., subframe, slot, or symbol) configured in the first channel measurement configuration information, after the appointed (or predetermined) time interval, after the time (e.g., when the timer expires), or after the first condition is satisfied, the UE may suspend or release application of the first channel measurement configuration information, and may measure the channel measurement signal according to the second channel measurement configuration information. For example, fallback may be performed from the first channel measurement configuration information to the second channel measurement information, or the second channel information may be applied instead of the first channel measurement configuration information. The measured channel measurement result may be reported according to the cycle or transmission resource configured in the second channel measurement configuration information. If the second channel measurement configuration information is not configured, channel measurement may not be performed.

2> Otherwise (if the first channel measurement configuration information is not configured for the UE),
   3> If the second channel measurement configuration information is configured for the UE, a channel measurement signal may be measured according to the second channel measurement configuration information. Also, the measured channel measurement result may be reported according to the cycle or transmission resource configured in the second channel measurement configuration information. If the second channel measurement configuration information is not configured, channel measurement may not be performed.

The first condition of the disclosure may be one of the following conditions. Hereinafter, the disclosure proposes conditions under which the base station is required to transmit neither an unnecessarily large amount of transmission resources nor unnecessarily frequent transmission resources when, under the first condition, a cell is activated, a cell group is activated or resumed, or the UE in an RRC inactive mode resumes a connection in RRC connection resumption. For example, channel measurement or channel measurement reporting may be performed by applying the first channel measurement configuration information until one of the following conditions is satisfied.

1> The UE may determine that the first condition is satisfied, when the UE successfully completes random access procedure in the cell (e.g., PCell, SCell, or PSCell) or in a cell (e.g., PSCell or SCell) of the cell group, when the random access procedure is successfully completed and a first uplink transmission resource is allocated, or when an uplink transmission resource is indicated to the UE for the first time.
  2> More specifically, for example, if the UE performs a contention-free random access (CFRA) procedure (e.g., if a dedicated preamble or a UE cell identifier (e.g., C-RNTI) is assigned),
    3> It may be considered that the random access procedure is successfully completed when the UE transmits a dedicated preamble to the cell and receives a random access response (RAR) message or receives an indication of PDCCH for the random access response, and therefore the UE may determine that the first condition is satisfied. As another method, when an uplink transmission resource is received for the first time after RAR reception, the UE may determine that the first condition is satisfied.
  2> If the UE performs contention-based random access (CBRA) (e.g., if either a dedicated preamble or a UE cell identifier is not assigned (e.g., if C-RNTI is not assigned),
    3> When the UE transmits a preamble (e.g., random preamble) to the cell, receives a random access response (RAR) message, transmits Message 3 (e.g., handover completion message) by using an uplink transmission resource allocated, included, or indicated in the random access response message, and receives, from a target base station via Message 4, a MAC CE (contention resolution MAC CE) indicating that contention has been resolved, or when the UE receives an uplink transmission resource via PDCCH corresponding to C-RNTI of the UE, it may be considered that random access procedure to the target base station has been successfully completed, and the UE may thus determine that the first condition is satisfied. As another method, in case that the size of the uplink transmission resource allocated in the random access response message is sufficient so that the UE may transmit Message 3 and may additionally transmit uplink data, the UE may determine that the uplink transmission resource is received for the first time and may determine that the first condition is satisfied. That is, when the RAR is received, the UE may determine that the uplink transmission resource is received for the first time, and may determine that the first condition is satisfied.

1> In case that the UE performs 2-step random access procedure as configured or indicated,
1> Alternatively, in case that the UE supports the 2-step random access procedure in a UE capability even if the 2-step random access is not configured or indicated in the message, and when the 2-step random access procedure is supported in system information of the cell, and information (e.g., random access resource, threshold value for determination of whether to perform or not perform 2-step random access, or the like) for 2-step random access procedure is broadcasted in system information, or when the UE receives the system information, and the UE performs the 2-step random access procedure for the cell due to a signal strength that is sufficient or is greater than the threshold value broadcast in the system information,
  2> When the 2-step random access procedure is successfully completed, the UE may determine that the first condition is satisfied.
  2> The 2-step random access procedure may be performed specifically by one of contention based random access (CBRA) or contention-free random access (CFRA).
    3> In case that the UE performs a CBRA-based 2-step random access procedure,
      4> The UE may transmit a preamble in a transmission resource (e.g., PRACH occasion, transmission resource configured by the base station via the RRC message, or transmission resource broadcast in the system information) for the 2-step random access procedure, and may transmit data (e.g., MsgA MAC PDU) in a transmission resource (e.g., PUSCH occasion) for data transmission. The data may include MAC control information (C-RNTI MAC CE) including a UE identifier (C-RNTI) or an RRC message (RRCReconfigurationComplete message or handover completion message).

4> The UE may monitor PDCCH scrambled with the UE identifier (C-RNTI) or with a first identifier (MsgB-RNTI) derived by a time or frequency at which the preamble is transmitted.

4> If the UE receives the PDCCH scrambled with the UE identifier, allocates downlink transmission resource in the PDCCH, or receives MAC control information (timing advance command MAC CE) for timing adjustment in the downlink transmission resource, 5> The UE may determine that the 2-step random access procedure has been successfully completed, and may determine that the first condition is satisfied.

4> If the UE receives the PDCCH scrambled with the first identifier (MsgB-RNTI), or allocates the downlink transmission resource in the PDCCH, or if a fallback random access response for the preamble transmitted by the UE is received in the downlink transmission resource (that is, in case that the base station has received the preamble but has failed to receive MsgA, if a fallback RAR indicating to transmit MsgA via another transmission resource is received), 5> The UE may transmit data (MsgA MAC PDU) via the transmission resource indicated in the fallback random access response.

5> The UE may monitor the PDCCH scrambled with the UE identifier (C-RNTI).

5> If the UE receives the PDCCH scrambled with the UE identifier, or allocates an uplink transmission resource in the PDCCH, the UE may determine that the 2-step random access procedure has been successfully completed, and may determine that the first condition is satisfied.

3> In case that the UE performs the CFRA-based 2-step random access procedure,

4> The UE may transmit a preamble in a transmission resource (e.g., PRACH occasion, or transmission resource designated by the base station via the RRC message) for 2-step random access procedure, and may transmit data (e.g., MsgA MAC PDU) in a transmission resource (e.g., PUSCH occasion) for data transmission. The data may include MAC control information (C-RNTI MAC CE) including a UE identifier (C-RNTI) or an RRC message (RRCReconfigurationComplete message or handover completion message).

4> The UE may monitor the PDCCH scrambled with the UE identifier (C-RNTI) or with the first identifier (MsgB-RNTI) derived by a time or frequency at which the preamble is transmitted.

4> If the UE receives the PDCCH scrambled with the UE identifier, allocates a downlink transmission resource in the PDCCH, or receives MAC control information (timing advance command MAC CE) for timing adjustment in the downlink transmission resource, 5> The UE may determine that the 2-step random access procedure has been successfully completed, and may determine that the first condition is satisfied.

4> If the UE receives the PDCCH scrambled with the first identifier (MsgB-RNTI), or allocates a downlink transmission resource in the PDCCH, or if a fallback random access response for the preamble transmitted by the UE is received in the downlink transmission resource (that is, in case that the base station has received the preamble but has failed to receive MsgA, if a fallback RAR indicating to transmit MsgA via another transmission resource is received), 5> The UE may determine that the 2-step random access procedure has been successfully completed, and may determine that the first condition is satisfied.

5> The UE may transmit data (MsgA MAC PDU) via the transmission resource indicated in the fallback random access response.

1> When a random access procedure is started or when a preamble for a random access procedure is transmitted, the UE may determine that the first condition is satisfied.

1> As another method, in case that a 2-step random access procedure is configured or indicated for the UE via the message, the UE may determine that the first condition is satisfied. For example, in the above case, before starting the 2-step random access, the UE may determine that the first condition is satisfied 1> As another method, if the 2-step random access (2-step random access) procedure is configured or indicated for the UE in the message, and a transmission resource (PUSCH) configured for data transmission in the 2-step random access procedure is greater than a first threshold, or if a configuration value (timing advance value) for timing adjustment is included in the RRC message, the UE may determine that the first condition is satisfied. The first threshold value may be configured by the base station via the RRC message (e.g., RRCReconfiguration message), may be broadcast in the system information, or may be configured to the size of data that the UE has for transmission. For example, in the above case, before starting the 2-step random access procedure, the UE may determine that the first condition is satisfied. As another method, if a configuration value (timing advance value) for timing adjustment is included in the RRC message, or if the 2-step random access procedure is configured, the UE may transmit data directly from the configured transmission resource (e.g., transmission resource configured as the RRC message, or transmission resource indicated by PDCCH of a target base station, where the UE monitors the PDCCH) without transmitting a preamble.

Therefore, in the above case, before starting the 2-step random access procedure, when transmitting the data, or before transmitting the data, the UE may determine that the first condition is satisfied. As another method, if a configuration value (timing advance value) for timing adjustment is included in the RRC message, or if the 2-step random access procedure is configured, the UE may transmit data directly from the configured transmission resource (PUSCH) (e.g., transmission resource configured as the RRC message, or transmission resource indicated by PDCCH of the target base station, where the UE monitors the PDCCH) without transmitting a preamble. In the above case, if the configured transmission resource (PUSCH) (e.g., transmission resource configured as the RRC message, or transmission resource indicated by PDCCH of the target base station, where the UE monitors the PDCCH) is greater than the first threshold value, or if the RRC message includes the configuration value (timing advance value) for timing adjustment, the UE may determine that the first condition is satisfied, before starting the 2-step random access procedure, when transmitting the data, or before transmitting the data.

1> In case that the UE in an RRC inactive mode transmits an RRCResumeRequest message and then receives an RRCResume message (or RRCSetup message) in response thereto, the UE may determine that the first condition is satisfied.

1> In case that a timer indicating a period for channel measurement expires when the UE performs channel measurement based on the first channel measurement configuration information configured in the RRC message.

1> In case that the time interval indicating the period for channel measurement has passed (or has expired) or all of the time intervals have been used (or applied) when the UE performs channel measurement based on the first channel measurement configuration information configured in the RRC message.

1> In case that all of the signals for channel measurement are measured (or completed) the configured number of times, or the signal is received the configured number of times when the UE performs channel measurement based on the first channel measurement configuration information configured in the RRC message.

1> In case that the channel measurement has been completed (in case that the channel measurement expires) based on the above configuration information or the channel measurement report has been completed (in case that the channel measurement reporting expires) when the UE performs channel measurement based on the first channel measurement configuration information configured in the RRC message.

If the first condition is satisfied, an upper layer device (e.g., RRC layer device) may perform indication as an indicator to a lower layer device (e.g., PDCP layer device, RLC layer device, MAC layer device, or PHY layer device), or the lower layer (e.g., PDCP layer device, RLC layer device, MAC layer device, or PHY layer device) may perform indication to the upper layer (e.g., RRC layer device).

The methods for configuring or applying the first channel measurement configuration information provided in the disclosure may be extended, configured and used when activating or resuming a cell group (e.g., PSCell), or activating a Scell, or resuming an RRC connection in an RRC deactivation mode (e.g., when using an RRCResume message), or when performing a handover procedure (e.g., when using an RRCReconfiguration message).

In the disclosure, a bandwidth part (BWP) may be used regardless of distinction between an uplink and a downlink, which means that the bandwidth part may indicate each of an uplink bandwidth part and a downlink bandwidth part according to context.

In the disclosure, a link may be used regardless of distinction between an uplink and a downlink, which means that the link may indicate each of an uplink and a downlink according to context.

In the disclosure, a cell may indicate a PCell, an Scell (e.g., Scell configured in a master cell group (MCG)), a PSCell (e.g., PCell of a secondary cell group (SCG)), or an Scell (e.g., Scell configured in a secondary cell group (SCG)). In the disclosure, for an Scell or PSCell of the UE performing carrier aggregation or dual connectivity, a dormant bandwidth part (dormant BWP) may be configured or introduced, and battery consumption may be thus reduced by preventing the UE from performing PDCCH monitoring in the dormant bandwidth part. The UE may perform channel measurement in the dormant bandwidth part and report a channel measurement result (e.g., channel state information (CSI) or channel quality information (CQI) measurement or reporting) to the base station, or may perform beam measurement, beam tracking, or beam operation, so that, in case that data transmission is required, the UE may perform switching to a normal bandwidth part (normal BWP) or perform activation to the normal bandwidth part, so as to quickly start data transmission in the normal bandwidth part. The dormant bandwidth part may be neither configured for nor applied to an SPCell (PCell of MCG or PCell (or PSCell) of SCG) or an Scell for which PUCCH has been configured, where the SPCell needs to continuously monitor a signal, transmit or receive feedback, or identify and maintain synchronization.

In the above, if the UE receives, via a PCell, an indication of switching to a dormant bandwidth part or activation to a dormant bandwidth part with respect to an Scell of a master cell group, the UE may perform channel measurement for the dormant bandwidth part of the Scell, and may report a measured channel measurement result via a transmission resource of a PCell of the master cell group (MCG) (e.g., via a physical uplink control channel (PUCCH) transmission resource of the PCell) or via a transmission resource of the Scell (e.g., via a physical uplink control channel (PUCCH) transmission resource) for which PUCCH of the master cell group is configured. In the above, reporting a channel measurement result for a certain cell or bandwidth part thereof as a certain transmission resource (e.g., PUCCH or PUSCH) of a certain cell may be configured for the UE via an RRC message for each cell or each bandwidth part.

In the above, if the UE receives, via the PSCell, an indication of switching to a dormant bandwidth part or activation to a dormant bandwidth part with respect to a Scell of a secondary cell group, the UE may perform channel measurement for the dormant bandwidth part of the Scell, and may report a measured channel measurement result via a transmission resource of the PSCell of the secondary cell group (SCG) (e.g., via a physical uplink control channel (PUCCH) transmission resource of the PSCell) or via a transmission resource of the Scell (e.g., via a physical uplink control channel (PUCCH) transmission resource) for which PUCCH of the secondary cell group is configured. In the above, reporting of a channel measurement result for a certain cell or bandwidth part thereof as a certain transmission resource (e.g., PUCCH or PUSCH) of a certain cell may be configured for the UE via an RRC message for each cell or each bandwidth part.

In the above, if the UE receives, via the PCell, an indication of switching to a dormant bandwidth part or activation to a dormant bandwidth part with respect to the PSCell or Scell of the secondary cell group, or if the UE receives a cell group suspension (SCG suspension or cell group suspension) indication for the secondary cell group (SCG or PSCell), the UE may perform channel measurement for the bandwidth part (bandwidth part configured via the RRC message or last active bandwidth part) or the dormant bandwidth part of the PSCell or Scell, and may report a measured channel measurement result via a transmission resource (e.g., via a physical uplink control channel (PUCCH) transmission resource of the PCell) of the PCell of the master cell group (MCG), via a transmission resource (e.g., via a physical uplink control channel (PUCCH) transmission resource) of the Scell for which PUCCH of the master cell group is configured, or via a transmission resource (e.g., via a physical uplink control channel (PUCCH) transmission resource of the PSCell) of the PSCell of the secondary cell group (SCG). In the above, reporting a channel measurement result for a certain cell or bandwidth part thereof as a certain transmission resource (e.g., PUCCH or PUSCH) of a certain cell may be configured for the UE via an RRC message for each cell or each bandwidth part.

The disclosure proposes various embodiments of operations performed based on DCI of PDCCH, a MAC CE, or an RRC message in order to operate the dormant bandwidth part or cell group suspension state, provided above, with respect to an Scell (Scell of a master cell group when carrier aggregation is configured, or Scell of a secondary cell group when dual connectivity is configured) or a PSCell (PCell of a secondary cell group when dual connectivity is configured) of the UE.

A network or a base station may configure an SPCell (PCell and PSCell) and multiple Scells for a UE. The SPCell may indicate a PCell when the UE communicates with one base station, and may indicate a PCell of a master base station or a PSCell of a secondary base station when the UE communicates with two base stations (master base station and secondary base station). In the above, the PCell or PSCell indicates a main cell used when the UE and the base station communicate in each MAC layer device, and refers to a cell in which timing is performed for synchronization, random access is performed, HARQ ACK/NACK feedback is transmitted via a PUCCH transmission resource, and most control signals are exchanged. In the above, a technology, in which a base station operates multiple Scells with an SPCell so as to increase transmission resources and increase uplink or downlink data transmission resources, is referred to as carrier aggregation or dual connectivity.

When an SPCell and multiple Scells are configured via an RRC message, a state or mode may be configured for the UE via the RRC message, MAC CE, or DCI of PDCCH with respect to each cell (PCell, PSCell, or Scells), each Scell, a bandwidth part of each Scell, or a cell group. The state or mode of the cell may be configured as an active mode or an activated state, or a deactivated mode or a deactivated state. In the above, a cell being in an active mode or active state may represent that, in a cell in the active mode or in an activated cell, the UE may exchange uplink or downlink data with the base station in an activated bandwidth part, activated normal bandwidth part, or bandwidth part other than the activated dormant bandwidth part of the cell, the UE may perform PDCCH monitoring for identifying an indication of the base station, the UE may perform channel measurement for downlink of the cell (or activated bandwidth part, activated normal bandwidth part, or bandwidth part other than the activated dormant bandwidth part of the cell) in the active mode or in the active state, the UE may report measurement information periodically to the base station, and the UE may transmit a pilot signal (sounding reference signal (SRS)) periodically to the base station so that the base station can perform uplink channel measurement. Alternatively, the UE may activate or switch the bandwidth part of the activated cell to the dormant bandwidth part according to an indication (e.g., PDCCH, MAC CE, or RRC message) of the base station. If the dormant bandwidth part is activated in the activated cell, the UE may report channel measurement and may report a channel measurement result without PDCCH monitoring in the cell.

As another method, if the cell, in which the dormant bandwidth part is activated, is the Scell, the UE may not monitor PDCCH, or the UE may not receive downlink data, or the UE may perform channel measurement or measurement result reporting, or the UE may suspend a configured periodic transmission resource (e.g., type 1 periodic transmission resource (configured uplink grant type 1)), or the UE may release (or clear) or initialize a configured periodic transmission resource (e.g., type 2 periodic transmission resource (configured uplink grant type 2)), or the UE may not transmit a sounding reference signal (SRS), or the UE may not transmit uplink data, or the UE may not transmit PUCCH (e.g., scheduling request (SR) or preamble for random access) If the cell, in which the dormant bandwidth part is activated or cell group suspension is indicated, is the PSCell, the UE may not monitor PDCCH, or the UE may monitor PDCCH in a very long cycle, or the UE may not receive downlink data, or the UE may perform channel measurement or measurement result reporting, or the UE may suspend the configured periodic transmission resource (e.g., type 1 periodic transmission resource (configured uplink grant type 1)), or the UE may release (or clear) or initialize the configured periodic transmission resource (e.g., type 2 periodic transmission resource (configured uplink grant type 2)), or the UE may transmit a sounding reference signal (SRS), or the UE may not transmit uplink data, or the UE may transmit PUCCH (e.g., scheduling request (SR) or preamble for random access), or the UE may perform random access.

If the cell, in which activation is performed to the bandwidth part other than the dormant bandwidth part, is the Scell, the UE may monitor PDCCH, or the UE may receive downlink data, or the UE may perform channel measurement or measurement result reporting, or the UE may resume the configured periodic transmission resource (e.g., type 1 periodic transmission resource (configured uplink grant type 1)), or the UE may configure or activate the configured periodic transmission resource (e.g., type 2 periodic transmission resource (configured uplink grant type 2)), or the UE may transmit a sounding reference signal (SRS), or the UE may transmit uplink data, or the UE may transmit PUCCH (e.g., scheduling request (SR) or preamble for random access), or the UE may perform random access. If the cell, in which activation is performed to the bandwidth part other than the dormant bandwidth part or cell group resumption (SCG resumption) is indicated, is the PSCell, the UE may monitor PDCCH, or the UE may receive downlink data, or the UE may perform channel measurement or measurement result reporting, or the UE may resume the configured periodic transmission resource (e.g., type 1 periodic transmission resource (configured uplink grant type 1)), or the UE may configure or activate the configured periodic transmission resource (e.g., type 2 periodic transmission resource (configured uplink grant type 2)), or the UE may transmit a sounding reference signal (SRS), or the UE may transmit uplink data, or the UE may transmit PUCCH (e.g., scheduling request (SR) or preamble for random access), or the UE may perform random access.

The deactivated mode or deactivated state of the cell may represent a mode or state in which bandwidth parts configured for the cell are inactive, the configured bandwidth parts are not active, or the configured bandwidth parts have no activated bandwidth part, so that the UE cannot exchange data with the base station, does not perform PDCCH monitoring to identify an indication of the base station, performs neither channel measurement nor measurement reporting, or transmits no pilot signal.

Therefore, in order to activate cells in a deactivated mode, the base station first configures frequency measurement configuration information for the UE via an RRC message, and the UE performs cell or frequency measurement on the basis of the frequency measurement configuration information. The base station may receive a cell or frequency measurement report of the UE, and then may activate the deactivated cells on the basis of the frequency/channel measurement information. Accordingly, a lot of latency occurs for the base station to activate carrier aggregation or dual connectivity for the UE and start data transmission or reception. The disclosure proposes a dormant bandwidth part (dormant BWP) or a dormant state for a bandwidth part of each activated cell (e.g., activated Scell or activated PSCell) so as to reduce the consumption of a battery of the UE and quickly start data transmission or reception. Alternatively, the disclosure proposes configuration (or introduction) of a dormant bandwidth part (dormant BWP) for each activated cell. Alternatively, the disclosure proposes configuration or introduction of dormant bandwidth part (BWP) for each activated cell. Alternatively, the disclosure proposes an active state, a dormant state, a suspended state, a deactivated state, or a resumed state of a cell group state for each cell group when dual connectivity is configured for the UE, and proposes a method of performing an indication of cell group suspension (or SCG suspension or cell group suspension) or cell group resumption (SCG resumption or cell group resumption), which indicates state transition of the cell group, and UE operations according thereto.

In the bandwidth part in the dormancy mode of the activated cell, or dormant bandwidth part (dormant BWP in activated Scell) or when the dormant bandwidth part is activated, the UE cannot exchange data with the base station, does not perform PDCCH monitoring to identify an indication of the base station, or does not transmit a pilot signal, but the UE performs channel measurement and reports a measurement result for a measured frequency/cell/channel periodically or when an event occurs, according to a configuration by the base station. Therefore, since the UE neither monitors PDCCH nor transmits a pilot signal in the dormant bandwidth part (BWP) of the activated cell, the UE can reduce the consumption of a battery compared to a normal bandwidth part (or bandwidth part other than the dormant bandwidth part) of the activated cell or compared to when the normal bandwidth part (or bandwidth part other than the dormant bandwidth part) of the activated cell is activated.

Also, since the UE performs channel measurement reporting unlike when the cell is deactivated, the base station may quickly activate the normal bandwidth part of the activated cell on the basis of a measurement report or on the basis of a measurement report of the dormant bandwidth part of the activated cell, and may allow carrier aggregation to be used quickly, so as to reduce transmission latency Therefore, in the disclosure, the cell being in the active mode or active state may represent that, in the cell in the active mode or in the activated cell, the UE may exchange uplink or downlink data with the base station in the activated bandwidth part, activated normal bandwidth part, or bandwidth part other than the activated dormant bandwidth part of the cell, may perform PDCCH monitoring to identify an indication of the base station, may perform channel measurement for downlink of the cell (or activated bandwidth part, activated normal bandwidth part, or activated bandwidth part other than the dormant bandwidth part of the cell) in the active mode or active state, may report measurement information periodically to the base station, and may transmit a pilot signal (sounding reference signal (SRS)) periodically to the base station so that the base station can perform uplink channel measurement.

In the disclosure, the cell being in the active mode or active state may represent that, in the cell in the active mode or in the activated cell, the UE, in the dormant bandwidth part of the activated cell, cannot exchange uplink or downlink data with the base station or does not perform PDCCH monitoring to identify an indication of the base station, but may perform channel measurement for downlink of the activated dormant bandwidth part of the cell in the active mode or active state, and may report measurement information periodically to the base station.

If the cell, in which the dormant bandwidth part is activated or cell group suspension is indicated, is the PSCell, the UE may not monitor PDCCH, the UE may monitor PDCCH in a very long cycle, or the JE may not receive downlink data, or the UE may perform channel measurement or measurement result reporting, or the UE may suspend the configured periodic transmission resource (e.g., type 1 periodic transmission resource (configured uplink grant type 1)), or the UE may clear or initialize the configured periodic transmission resource (e.g., type 2 periodic transmission resource (configured uplink grant type 2)), or the UE may transmit a sounding reference signal (SRS), or the UE may not transmit uplink data, or the UE may transmit PUCCH (e.g., scheduling request (SR) or preamble for random access), or the UE may perform random access.

In the disclosure, a dormant bandwidth part may indicate a state of a bandwidth part or may be used as a name of a logical concept indicating a specific bandwidth part. Therefore, the dormant bandwidth part may be activated, deactivated, or switched. For example, an indication of switching an activated second bandwidth part to a dormant bandwidth part in a first cell, an indication of transiting the first cell to a dormancy state or a dormancy mode, or an indication of activating the dormant bandwidth part of the first cell may be interpreted in the same way.

In the disclosure, a normal bandwidth part may indicate bandwidth parts other than a dormant bandwidth part from among bandwidth parts configured for each cell of the UE via an RRC message. In the normal bandwidth part, the UE may exchange uplink or downlink data with the base station, may monitor PDCCH to identify an indication of the base station, may perform channel measurement for a downlink, may periodically report measurement information to the base station, and may periodically transmit a pilot signal (sounding reference signal, SRS) to the base station so as to enable the base station to perform uplink channel measurement. Also, the normal bandwidth part may indicate a first active bandwidth part, a default bandwidth part, a first active bandwidth part activated from dormancy, or an initial bandwidth part.

Only one dormant bandwidth part may be configured from among bandwidth parts configured for each cell of the UE, and the dormant bandwidth part may be configured for downlink. As another method, one dormant bandwidth part may be configured for uplink or downlink from among bandwidth parts configured for each cell of the UE.

In the disclosure, a state of a cell group may be configured to be activated, suspended, or deactivated. The state of the cell group may be indicated by a bitmap or an indicator of DCI of PDCCH, may be indicated via MAC control information, or may indicated by an indicator of an RRC message. In case that the state of the cell group is indicated to be active, configuration information of the cell group configured or indicated via an RRC message (e.g., RRCReconfiguration message, RRCSetup message, or RRCResume message) may be stored and applied to the UE, or may be restored or resumed, and the UE may perform PDCCH monitoring according to the configuration via the RRC message in the PCell, PSCell, or configured SCell of the cell group, or the UE may receive downlink data, or the UE may perform channel measurement or measurement result reporting, or the UE may resume the configured periodic transmission resource (e.g., type 1 periodic transmission resource (configured uplink grant type 1)), or the UE may configure or activate the configured periodic transmission resource (e.g., type 2 periodic transmission resource (configured uplink grant type 2)), or the UE may transmit a sounding reference signal (SRS), or the UE may transmit uplink data, or the UE may transmit PUCCH (e.g., scheduling request (SR) or preamble for random access), or the UE may perform random access.

In addition, in case that the state of the cell group is indicated to be in a suspended state or deactivated state, configuration information of the cell group configured or indicated via the RRC message (e.g., RRCReconfiguration message, RRCSetup message, or RRCResume message) may be stored in the JE, or the configuration information may be not discarded but application thereof to the UE may be suspended, and the UE may not perform PDCCH monitoring according to the configuration via the RRC message in the PCell, PSCell, or configured SCell of the cell group, or the UE may perform PDCCH monitoring in a very long cycle, or the UE may not receive downlink data or the UE may perform channel measurement or measurement result reporting, or the UE may suspend the configured periodic transmission resource (e.g., type 1 periodic transmission resource (configured uplink grant type 1)), or the UE may clear or initialize the configured periodic transmission resource (e.g., type 2 periodic transmission resource (configured uplink grant type 2)), or the UE may transmit a sounding reference signal (SRS), or the UE may not transmit uplink data, or the UE may transmit PUCCH (e.g., scheduling request (SR) or preamble for random access), or the UE may perform random access.

In addition, in case that the state of the cell group is indicated to be deactivated, or release of cell group configuration information is indicated, the UE may clear or discard the configuration information of the cell group configured or indicated via the RRC message (e.g., RRCReconfiguration message, RRCSetup message, or RRCResume message).

FIG. 1E is a diagram illustrating a procedure for providing a service to a UE by efficiently using a wide frequency bandwidth in the next-generation mobile communication system according to various embodiments of the present disclosure.

With reference to FIG. 1E, it describes a method of providing services to UEs having multiple different capabilities (or categories) and enabling the battery consumption by the next-generation mobile communication system by efficiently using a very wide frequency bandwidth.

One cell in which a base station provides a service may service a very wide frequency band, as shown in 1e-05. However, in order to provide services to UEs having different capabilities, one cell, in which the wide frequency band is divided into multiple bandwidth parts, may be managed.

First, a UE initially powered on may search the entire frequency band provided by a service provider (PLMN) in a unit of certain resource blocks (e.g., in a unit of 12 resource blocks (RBs)). That is, the UE may start searching for a primary synchronization sequence (PSS)/secondary synchronization sequence (SSS) in the entire system bandwidth in a unit of the resource blocks (1e-10). If the UE detects the PSS/SSS 1e-01 or 1e-02 while searching for the signals in the unit of resource blocks, the UE may read and interpret (decode) the signals, may identify a boundary between a subframe and a radio transmission resource frame (radio frame). Therefore, subframes can be distinguished in units of 1 ms, and may synchronize the base station with the downlink signal. In the above, the resource block (RB) corresponds to the size of a predetermined frequency resource and predetermined time resource, and may be defined to be a two-dimensional unit. For example, a unit of 1 ms may be defined for a time resource, and a unit of 12 subcarriers (1 carrier×15 kHz=180 kHz) may be defined for a frequency resource.

When the UE completes synchronization, the UE may identify a master system information block (MIB) or minimum system information (MSI) to identify control resource set (CORESET) information, and may identify initial access bandwidth part (initial BWP) (1E-15, 1E-20). The corsets information refers to a location of a time/frequency transmission resource, via which a control signal is transmitted from the base station, and indicates, for example, a location of a resource via which PDCCH is transmitted That is, the CORESET information is information indicating from where first system information (system information block 1, SIB1) is transmitted, and indicates a frequency/time resource via which PDCCH is transmitted. In the above, the UE may identify information on an initial bandwidth part (initial BWP) when reading the first system information. As described above, when the UE completes synchronization of the downlink signal with the base station and is able to receive a control signal, the UE may perform a random access procedure in an initial bandwidth part (initial BWP) of a cell on which the UE camps, may request an RRC connection configuration, and may receive an RRC message so as to perform RRC connection configuration.

In the RRC connection configuration, multiple bandwidth parts may be configured for one cell (PCell, PSCell, SPCell, or SCell). Multiple bandwidth parts may be configured for downlink within one cell, and regardless thereof, multiple bandwidth parts may be separately configured for uplink.

The multiple bandwidth parts may be indicated and configured by a bandwidth part identifier (BWP identifier) so as to be used as an initial bandwidth part (initial BWP), a default bandwidth part (default BWP), a first active bandwidth part (first active BWP), a dormant bandwidth part (dormant BWP), or a first active bandwidth part activated from dormancy (first active BWP from dormant).

In the above, the initial bandwidth part (initial BWP) may be used as a bandwidth part determined at a cell level (cell-specific) existing one for each cell, and may be used as a bandwidth part in which a UE accessing the cell for the first time may configure a connection to the cell via a random access procedure, or a UE having configured a connection may perform synchronization. Also, the base station may configure, for each cell, each of an initial downlink bandwidth part (initial downlink BWP) to be used in downlink and an initial uplink bandwidth part (initial uplink BWP) to be used in uplink. Also, the configuration information for the initial bandwidth part may be broadcast in the first system information (system information 1, SIB1) indicated by CORESET, and may be reconfigured for the UE to which the base station accesses for connection via an RRC message. Also, the initial bandwidth part may be designated with a bandwidth part identifier of 0 so as to be used in each of uplink and downlink. That is, all UEs accessing the same cell may use the same initial bandwidth part by designating the same bandwidth part identifier of 0. This is because, when a random access procedure is performed, the base station may transmit a random access response (RAR) message via the initial bandwidth part, which enables all UEs to read the RAR message, so that there may be an advantage in facilitating contention-based random access.

In the above, the first active bandwidth part (first active BWP) may be configured to be different for each UE (UE-specific), and may be designated and indicated by a bandwidth part identifier from among multiple bandwidth parts. The first active bandwidth part may be configured for each of downlink and uplink, and may be configured, by a bandwidth part identifier, as each of a first active downlink bandwidth part (first active downlink BWP) and a first active uplink bandwidth part (first active uplink BWP). The first active bandwidth part may be used for the purpose of indicating a bandwidth pan which is to be initially activated and used, when multiple bandwidth parts are configured in one cell. For example, when a PCell or a PSCell and multiple SCells are configured for a UE, and multiple bandwidth parts are configured for each of the PCell, PSCell, or SCells, if the PCell, PSCell, or SCell is activated, the UE may activate and use a first active bandwidth part (first active BWP) among the multiple bandwidth parts configured for the PCell, PSCell, or SCell. That is, the first active downlink bandwidth part (first active downlink BWP) may be activated and used for downlink, and the first active uplink bandwidth part (first active uplink BWP) may be activated and used for uplink.

An operation in which the UE switches the current or activated downlink bandwidth part of the cell so as to activate the first active downlink bandwidth part (or bandwidth part configured or indicated via an RRC message), or an operation in which the UE switches the current or activated uplink bandwidth part so as to activate the first active uplink bandwidth part (or bandwidth part configured or indicated via an RRC message), may be performed when the UE receives an indication of activating the cell or the bandwidth part, which has been deactivated, via an RRC message, MAC control information, or DCI. Also, an operation may be also performed when an indication of transiting the cell or the bandwidth part to a dormant state or an indication of activating to a dormant bandwidth part is received via an RRC message, MAC control information, or DCI. It is because, when the cell or the bandwidth part is activated, the current or activated downlink bandwidth part is switched to activate the first active downlink bandwidth part (or bandwidth part configured or indicated by an RRC message), or the uplink bandwidth part is switched to activate the first active uplink bandwidth part (or bandwidth part configured or indicated by an RRC message), and therefore the base station can efficiently use carrier aggregation only if a frequency/channel should be measured and reported for the first active downlink/uplink bandwidth part even when channel measurement reporting is performed in a dormant state.

The default bandwidth part (default BWP) may be configured to be different for each UE (UE-specific), and may be designated and indicated by a bandwidth part identifier from among multiple bandwidth parts. The default bandwidth part may be configured only for downlink. The default bandwidth part may be used as a bandwidth part, to which an activated bandwidth part among multiple downlink bandwidth parts falls back after a certain time. For example, a bandwidth part inactivity timer (BWP inactivity timer) may be configured for each cell or each bandwidth part via an RRC message, and the timer may start or restart when data transmission or reception occurs in an active bandwidth part other than the default bandwidth part, or the timer may start or restart when the activated bandwidth part is switched to another bandwidth part. When the timer expires, the UE may cause the downlink bandwidth part activated for the cell to fall back or switch to the default bandwidth part. The switching may refer to a procedure of deactivating a currently activated bandwidth part and activating a bandwidth part indicated for switching, and the switching may be triggered by an RRC message, MAC control information (MAC control element), or L1 signaling (downlink control information (DCI) of PDCCH). The switching may be triggered by indicating a bandwidth part to be switched or to be activated, and the bandwidth part may be indicated by a bandwidth part indicator (e.g., 0, 1, 2, 3, or 4).

The default bandwidth part is applied and used only for downlink because the base station may cause the UE to fall back to the default bandwidth part for each cell after a certain time to receive an indication (e.g., DCI of PDCCH) from the base station, thereby facilitating base station scheduling. For example, if the base station configures, as initial bandwidth parts, default bandwidth parts of UEs accessing one cell, the base station may continuously indicate scheduling only for the initial bandwidth parts after a certain time. In case that the default bandwidth part is not configured in an RRC message, an initial bandwidth part may be considered as the default bandwidth part, and fallback may be performed to the initial bandwidth part when a bandwidth part inactivity timer expires.

As another method, in order to enhance the freedom of implementation of the base station, a default bandwidth part may be also defined and configured for uplink and may be used as a default bandwidth part of downlink.

The dormant bandwidth part (dormant BWP) refers to a bandwidth part in a dormancy mode or a dormant bandwidth part (dormant BWP in activated SCell) in an activated cell, or when the dormant bandwidth part is activated, the UE cannot exchange data with the base station, does not perform PDCCH monitoring to identify an indication of the base station, or does not transmit a pilot signal, but the UE performs channel measurement and reports a measurement result for a measured frequency/cell/channel periodically or when an event occurs, according to a configuration by the base station Therefore, since the UE neither monitors PDCCH nor transmits a pilot signal in the dormant bandwidth part (BWP) of the activated cell, the UE can reduce the consumption of a battery, compared to a normal bandwidth part (or bandwidth part other than the dormant bandwidth part) of the activated cell or compared to when the normal bandwidth part (or bandwidth part other than the dormant bandwidth part) of the activated cell is activated. Also, since the UE performs channel measurement reporting unlike when the cell is deactivated, the base station may quickly activate the normal bandwidth part of the activated cell on the basis of a measurement report or on the basis of a measurement report of the dormant bandwidth part of the activated cell, and may allow carrier aggregation to be used quickly, so as to reduce transmission latency.

For a first active bandwidth part (or first active non-dormant bandwidth part, or bandwidth part configured or indicated via an RRC message) that is activated by switching from a dormant state or a dormant bandwidth part, when the UE is operating, as a dormant bandwidth part, a bandwidth part of one activated cell, or when an activated bandwidth part is a dormant bandwidth part in the activated cell, or when switching to a dormant bandwidth part in the cell, in case that the base station indicates, via DCI of PDCCH, a MAC CE, or an RRC message, the UE to switch the dormant bandwidth part, which is the bandwidth part of the activated cell, to a normal bandwidth part (or bandwidth part other than the dormant bandwidth part), indicates the UE to switch or change the active bandwidth part in the dormant bandwidth part to the normal bandwidth part, or indicates the UE to switch, change, or activate the active bandwidth part in the dormant bandwidth part to a normal bandwidth part (e.g., first active bandwidth part activated from dormancy), the first active bandwidth part may be a bandwidth part, which may be activated by switching the current or activated bandwidth part of the activated cell by the UE according to the indication, or a bandwidth part which may be activated from the dormant state configured via the RRC message.

FIG. 1F illustrates a procedure for a UE to switch from an RRC idle mode to an RRC connected mode, and a procedure of configuring bearer configuration information, or cell group or cell configuration information, or channel measurement configuration information for connection to the UE, in the next-generation mobile communication system according to various embodiments of the present disclosure.

One cell in which a base station provides a service may service a very wide frequency band. First, a UE may search the entire frequency band provided by a service provider (PLMN) in a unit of certain resource blocks (e.g., in a unit of 12 resource blocks (RBs)) That is, the UE may start searching for a primary synchronization sequence (PSS)/secondary synchronization sequence (SSS) in the entire system bandwidth in a unit of the resource blocks. If the UE detects the PSS/SSS while searching for the signals in a unit of the resource blocks, the UE may read and interpret (decode) the signals, and may identify a boundary between a subframe and a radio transmission resource frame (radio frame) When the UE completes synchronization, the UE may read system information of a cell on which the UE currently camps. That is, information of a control resource set (CORESET) may be identified by identifying a master system information block (MIB) or minimum system information (MSI), and initial bandwidth part (initial BWP) information may be identified by reading system information (1f-01, 1f-05) The coreset information refers to a location of a time/frequency transmission resource, via which a control signal is transmitted from the base station, and may indicate, for example, a location of a resource via which PDCCH is transmitted.

As described above, if the UE completes synchronization of a downlink signal with the base station and may receive a control signal, the UE, in an initial bandwidth part, may perform a random access procedure, may receive a random access response, may request an RRC connection configuration, may receive an RRC message, and may perform RRC connection configuration (1f-10, 1f-15, 1f-20, 1f-25, 1f-30).

If basic RRC connection configuration is completed, the base station may transmit, to the UE, an RRC message (UECapabilityEnquiry, 1f-35) to inquire about the capability of the UE, so as to identify the capability of the UE (UE capability). As another method, the base station may inquire about the capability of the UE to an MME or an AMF so as to identify the UE capability. This is because the MME or the AMF may have stored capability information of the UE if the UE had been previously connected. If there is no UE capability information desired by the base station, the base station may request UE capability to the UE. When the UE reports the UE capability, the UE may report the following information as the UE capability to the base station, where the information includes whether the UE supports a dormant bandwidth part for an SCell of each cell group (master cell group or secondary cell group), whether the UE supports the first, second, third, or fourth embodiment of the disclosure, whether the UE supports a dormant bandwidth part for a PSCell of each cell group, whether the UE supports cell group suspension or resumption for the PSCell of each cell group, the number of supporting cell groups, or the like. The UE may also report the following information as the UE capability to the base station, where the information includes whether it is possible, in an RRC connection resumption procedure, to save and restore, discard, partially reconfigure, or activate configuration information of an SCell of a master cell group, an SCell of a secondary cell group, or a PSCell of a secondary cell group via an RRCResume message.

The base station transmits an RRC message to the UE to identify the capability of the UE, and the capability of the UE may be thus identified, for example, a frequency band which the UE is capable of read, or a readable frequency band area may be determined After the capability of the UE is identified, an appropriate bandwidth part (BWP) may be configured for the UE. When the UE receives an RRC message inquiring about the capability of the UE, in response to the reception of the RRC message, the UE may indicate, using an offset from a reference center frequency, a range of a bandwidth supported by the UE, a range of a bandwidth supported by a current system bandwidth, or the like, may directly indicate the start and end points of a supported frequency bandwidth, or may indicate the start and end points by using a center frequency and a bandwidth (1f-40). In the above, a bandwidth part may be configured via an RRCSetup message or an RRCResume message (1f-25), or an RRCReconfiguration message (1f-45, 1f-70) of RRC connection configuration, and the RRC message may include configuration information for a PCell, a PSCell, or multiple SCells, and may configure multiple bandwidth parts for each cell (PCell. PSCell, or SCells). When multiple bandwidth parts are configured for each cell, multiple bandwidth parts to be used in downlink of each cell may be configured. In a case of an FDD system, multiple bandwidth parts to be used in uplink of each cell may be configured separately from the downlink bandwidth parts. In a case of a TDD system, multiple bandwidth parts to be commonly used in downlink and uplink of each cell may be configured.

Information for configuring cell configuration information or bandwidth parts of each cell (PCell, PSCell, or SCell) may include some of the following information
    Cell identifier (SCell index);
    Cell configuration information:
    First channel measurement configuration information for each cell or each bandwidth part, and
    Second channel measurement configuration information for each cell or each bandwidth part;
    Downlink bandwidth part configuration information of the cell;
        Initial downlink bandwidth part (initial downlink BWP) configuration information,
        Multiple pieces of bandwidth part configuration information, and bandwidth part identifier (BWP ID) corresponding to each bandwidth part,
        Initial state configuration information of the cell or downlink bandwidth part (e.g., active state, dormant state, or deactivated state),
        Bandwidth part identifier indicating a first active downlink bandwidth part (first active downlink BWP),
        Bandwidth part identifier indicating a default bandwidth part (default BWP), Configuration information for PDCCH monitoring for each bandwidth part. For example, CORESET information, search space resource information, PDCCH transmission resource, cycle, subframe number information, and the like, Bandwidth part identifier indicating a dormant bandwidth part, Bandwidth part identifier indicating a first active bandwidth part activated from dormancy, Bandwidth part inactivity timer configuration and timer value, first channel measurement configuration information for each cell or each bandwidth part, and second channel measurement configuration information for each cell or each bandwidth part;

Uplink bandwidth part configuration information of the cell:

Initial uplink bandwidth part (initial uplink BWP) configuration information,

Multiple pieces of bandwidth part configuration information, and a bandwidth part identifier (BWP ID) corresponding to each bandwidth part, Initial state configuration information of the cell or downlink bandwidth part (e.g., active state, dormant state, or deactivated state), and Bandwidth part identifier indicating a first active uplink bandwidth part (first active uplink BWP); and Configuration information relating to a transmission resource via which channel measurement is performed in a dormant bandwidth part or in a bandwidth part other than the dormant bandwidth part, and a measurement result is reported (e.g., PUCCH transmission resource information of a PCell, a PUCCH Scell, or a PSCell).

The first channel measurement configuration information may be configured by being included in the RRC message (RRCReconfiguration or RRCResume), and, in order for the base station to temporary, many, or frequently transmit a channel measurement signal to allow the cell to quickly perform channel measurement to quickly activate the cell group, the first channel measurement configuration information may include, in the configuration information of the cell (e.g., PCell or PSCell or Scell) of the cell group, configuration information such as a cycle of a frequent channel measurement signal (e.g., radio resources, a temporary reference signal (TRS), a synchronization signal block (SSB), a channel state information reference signal (CSI-RS), or a reference signal (RS)), or transmission resource information for transmission (frequency or time transmission resource via which the frequent channel measurement signal is transmitted), an interval or number (the number of times the frequent channel measurement signal is transmitted), a timer value (time at which the frequent channel measurement signal is transmitted), or a time interval (interval in which the frequent channel measurement signal is transmitted (e.g., an offset of time unit (slot, subframe, symbol, or the like)), or a transmission resource, a cycle, an interval, a timing, or an offset for reporting the measurement result of the UE.

In the above, the first channel measurement configuration information may configure the transmission resource for channel measurement such that a reporting cycle (or transmission resource) via which the UE may report a channel measurement result can be configured short, or the base station can transmit many or frequently channel measurement signal (or transmission resources or for example, a radio resource or a temporary reference signal (TRS)) so as to support the UE to perform fast channel measurement or many signal measurements. In the above, the first channel measurement configuration information may include configuration information for a channel measurement signal for a specific UE (or specific UEs) by the base station in the cell or bandwidth part. For example, the first channel measurement configuration information may include a cycle of the channel measurement signal, or a number of times a signal is transmitted, or a period during which a signal is transmitted, or an offset with respect to the time during which a signal is transmitted, or the length of time between transmitted signals, or a list of a plurality of channel measurement signals that can be transmitted, or a time transmission resource (or frequency transmission resource) indicating the location of a transmitted signal, or a transmission resource (a time transmission resource or a frequency transmission resource) to report the measurement result, or a cycle to report the measurement result.

In addition, the first channel measurement configuration information may be configured differently for each cell or for each bandwidth part for a plurality of cells or bandwidth parts configured in the RRC message, and may configure beam-related configuration information (transmission configuration indication (TCI) state or quasi co-location (QCL)) such as a beam direction, a beam number, or a beam location together to support for the UE to easily measure the transmission resource for measuring a channel. In addition, in the first channel measurement configuration information, a timing advance (TA) value (or an offset value) for synchronizing a downlink signal of a base station or an uplink signal of a base station, or a timer (time alignment timer (TAT)) indicating validity of the TA value, or a timer value (a TAT value) may be configured to correctly perform channel measurement or channel measurement report.

In addition, the first channel measurement configuration information configured as an RRC message may include a plurality of channel measurement signal information, and may indicate any one channel measurement signal information of the configured plurality of channel measurement signal information or beam configuration information as an RRC message or MAC CE or DCI so that the UE may apply or use the indicated chancel measurement signal information or beam configuration information to perform channel measurement or perform channel measurement report. The above indicating method may define a mapping between a bitmap, an index, or an identifier, and each channel measurement signal information configured above, and may perform indication based on the defined mapping. As another method, a method may configure or indicate the channel measurement signal information as an RRC message or MAC CE so that the UE applies or uses the configured (or indicated) channel measurement signal information to perform channel measurement or channel measurement report.

The first channel measurement configuration information provided in the disclosure may be initially deactivated when the first channel measurement configuration information is configured as an RRC message or after handover, and may be activated later when the first channel measurement configuration information is configured as the MAC control information provided by the disclosure, or DCI information of PDCCH, or the RRC message. In case that the first channel measurement configuration information is configured as the RRC message as described above, the first channel measurement configuration information has to be configured to be in an inactive initial state so that the base station can easily manage the cell state or channel measurement procedure of the UE, and the timing of when and how the UE performs channel measurement can also be accurately performed without the problem of processing delay of the RRC message.

In addition, in an RRC message (RRCReconfiguration or RRCResume), second channel measurement configuration information may be included or configured. The second channel measurement configuration information may include general channel measurement configuration information, such as a transmission resource, cycle, time interval, or number of times of channel measurement signal, or a transmission resource, a cycle, or a time interval for channel measurement report. The initial bandwidth part (initial BWP) or default bandwidth part (default BWP) or first active bandwidth part (first active BWP) configured above may be used for the following purposes, and may operate as follows according to the purpose.

The initial bandwidth part (initial BWP) may be used as a bandwidth part determined at a cell level (cell-specific) existing one for each cell, and may be used as a bandwidth part in which a UE accessing the cell for the first time may configure a connection to the cell via a random access procedure, or a UE having configured a connection may perform synchronization. In addition, the base station may configure, for each cell, each of an initial downlink bandwidth part (initial downlink BWP) to be used in downlink and an initial uplink bandwidth part (initial uplink BWP) to be used in uplink. In addition, the configuration information for the initial bandwidth part may be broadcast in the first system information (system information 1, SIB1) indicated by CORESET, and may be reconfigured for a connected UE by the base station via an RRC message. In addition, the initial bandwidth part may be designated with a bandwidth part identifier of 0 so as to be used in each of uplink and downlink. That is, all UEs accessing the same cell may use the same initial bandwidth part by designating the same bandwidth part identifier of 0. This is because, when a random access procedure is performed, the base station may transmit a random access response (RAR) message via the initial bandwidth part, which enables all UEs to read the RAR message, so that there may be an advantage in facilitating a contention-based random access procedure.

The first active bandwidth part (first active BWP) may be configured to be different for each UE (UTE specific), and may be designated and indicated by a bandwidth part identifier from among multiple bandwidth pails. The first active bandwidth part may be configured for each of downlink and uplink, and may be configured, by a bandwidth part identifier, as each of a first active downlink bandwidth part (first active downlink BWP) and a first active uplink bandwidth part (first active uplink BWP). The first active bandwidth part may be used for the purpose of indicating a bandwidth part which is to be initially activated and used, when multiple bandwidth parts are configured in one cell. For example, when a PCell or a PSCell and multiple SCells are configured for a UE, and multiple bandwidth parts are configured for each of the PCell, PSCell, or SCell, if the PCell. PSCell, or SCell is activated, the UE may activate and use a first active bandwidth part (first active BWP) among the multiple bandwidth parts configured for the PCell, PSCell, or SCell. That is, the first active downlink bandwidth part (first active downlink BWP) may be activated and used for downlink, and the first active uplink bandwidth part (first active uplink BWP) may be activated and used for uplink.

An operation in which the UE switches the current or activated downlink bandwidth part of the cell so as to activate the first active downlink bandwidth part (or bandwidth part configured or indicated via an RRC message), or an operation in which the UE switches the current or activated uplink bandwidth part so as to activate the first active uplink bandwidth part (or bandwidth part configured or indicated via an RRC message), may be performed when the UE receives an indication of activating a bandwidth part of a certain cell or certain activated cell, which has been deactivated or dormant, or when the UE receives an indication of switching or activating a deactivated or dormant bandwidth part to a normal bandwidth part, where the indications are received via an RRC message, MAC control information, or DCI of PDCCH. Also, when the UE receives, via an RRC message, MAC control information, or DCI of PDCCH, an indication of transiting an activated cell or an activated bandwidth part to a dormant state, or receives an indication of switching the same to a dormant bandwidth part or activating the same, the UE may switch or activate the bandwidth part to the dormant bandwidth part or may make the bandwidth part dormant.

In the above, making the bandwidth part dormant, switching to the dormant bandwidth part, or activating to the dormant bandwidth part may refer to performing operations provided in the dormant state in the disclosure. That is, the UE does not perform PDCCH monitoring, but may perform channel measurement for a downlink bandwidth part (or dormant bandwidth part) and may report a channel measurement result to the base station. As another method, when the activated cell or activated bandwidth part is activated or switched to a normal bandwidth part, a downlink bandwidth part is switched anyway so as to be activated to a first active downlink bandwidth part, and an uplink bandwidth part is switched so as to be activated to a first active uplink bandwidth part, and therefore the dormant bandwidth part may be configured as the first active downlink or uplink bandwidth part or a default bandwidth part.

The default bandwidth part (default BWP) may be configured to be different for each UE (UE specific), and may be designated and indicated by a bandwidth part identifier from among multiple bandwidth parts. The default bandwidth part may be configured only for downlink. The default bandwidth part may be used as a bandwidth part, to which an activated bandwidth part among multiple downlink bandwidth parts falls back after a certain time. For example, a bandwidth part inactivity timer (BWP inactivity timer) may be configured for each cell or each bandwidth part via an RRC message, and the timer may start or restart when data transmission or reception occurs in an active bandwidth part other than the default bandwidth part, or the timer may start or restart when the activated bandwidth part is switched to another bandwidth part. When the timer expires, the UE may cause the downlink bandwidth part activated for the cell to fall back or switch to the default bandwidth part. The switching may refer to a procedure of deactivating a currently activated bandwidth part and activating a bandwidth part indicated for switching, and the switching may be triggered by an RRC message, MAC control information (MAC control element), or L1 signaling (downlink control information (DCI) of PDCCH). The switching may be triggered by indicating a bandwidth part to be switched or to be activated, and the bandwidth part may be indicated by a bandwidth part identifier (e.g., 0, 1, 2, 3, or 4).

The default bandwidth part is applied and used only for downlink because the base station may cause the UE to fall back to the default bandwidth part for each cell after a certain time to receive an indication (e.g., DCI of PDCCH) from the base station, thereby facilitating base station scheduling. For example, if the base station configures, as initial bandwidth parts, default bandwidth parts of UEs accessing one cell, the base station may continuously indicate scheduling only for the initial bandwidth parts after a certain time. In case that the default bandwidth part is not configured in an RRC message, initial bandwidth part may be considered as the default bandwidth part, and fallback may be performed to the initial bandwidth pan when a bandwidth part inactivity timer expires.

In another method, in order to enhance the freedom of implementation of the base station, a default bandwidth part may be also defined and configured for uplink and may be used as a default bandwidth part of downlink.

The dormant bandwidth part (dormant BWP) refers to a bandwidth part in a dormancy mode or a dormant bandwidth part (dormant BWP in activated SCell) in an activated cell, or when the dormant bandwidth part is activated, the UE cannot exchange data with the base station, does not perform PDCCH monitoring to identify an indication of the base station, or does not transmit a pilot signal, but the UE performs channel measurement and reports a measurement result for a measured frequency/cell/channel periodically or when an event occurs, according to a configuration by the base station Therefore, since the UE neither monitors PDCCH nor transmits a pilot signal in the dormant bandwidth part (BWP) of the activated cell, the UE can reduce the consumption of a battery, compared to a normal bandwidth part (or bandwidth part other than the dormant bandwidth part) of the activated cell or compared to when the normal bandwidth part (or bandwidth part other than the dormant bandwidth part) of the activated cell is activated. Also, since the UE performs channel measurement reporting unlike when the cell is deactivated, the base station may quickly activate the normal bandwidth part of the activated cell on the basis of a measurement report or on the basis of a measurement report of the dormant bandwidth part of the activated cell, and may allow carrier aggregation to be used quickly, so as to reduce transmission latency.

For a first active bandwidth part (or first active non-dormant bandwidth part) that is activated from dormancy, when the UE is operating, as a dormant bandwidth part, a bandwidth part of one activated cell, when an activated bandwidth part is the dormant bandwidth part in the activated cell, or when switching to the dormant bandwidth part is performed in the cell, in case that the base station indicates, via DCI of PDCCH, a MAC CE, or an RRC message, the UE to switch the bandwidth part of the activated cell from the dormant bandwidth part to a normal bandwidth part (or bandwidth part other than the dormant bandwidth part), indicates UE to switch or change the active bandwidth part in the dormant bandwidth part to the normal bandwidth part, or indicates the UE to switch or change or activate the active bandwidth part in the dormant bandwidth part to the normal bandwidth part (e.g., first active bandwidth part activated from dormancy), a bandwidth part, to which the UE may switch or activate the bandwidth part of the activated cell according to the indication, may be the first active bandwidth part activated from dormancy configured via the RRC message.

In the disclosure, switching a first bandwidth part to a second bandwidth part may be interpreted as activating the second bandwidth part, or may be interpreted as deactivating the activated first bandwidth part and activating the second bandwidth part.

In the RRCSetup message or RRCResume message 1F-25, or RRCReconfiguration message 1F-45 of the RRC connection configuration, a state transition timer may be configured so that the UE may perform state transition by itself even if the UE does not receive, from the base station, an indication via an RRC message, MAC control information, or DCI of PDCCH. For example, a cell deactivation timer (ScellDeactivationTimer) may be configured for each cell, and if the cell deactivation tinier expires, the cell may be transited to a deactivated state.

In the RRCSetup message or RRCResume message 1F-25, or RRCReconfiguration message 1F-45 of the RRC connection configuration, frequency measurement configuration information (measurement configuration), frequency measurement gap information (measurement gap information), and the like may be configured, and frequency measurement object (measurement object) information may be included. In addition, in the RRCSetup message or RRCResume message 1F-25, or RRCReconfiguration message 1F-45 of the RRC connection configuration, a function (power saving mode) for reducing power consumption of the UE may be configured, and configuration information, such as a discontinuous reception (DRX) cycle, an offset, an on-duration time (time during which the UE needs to monitor PDCCH), or time information, etc., information on a time at which PDCCH from the base station is monitored or detected before the on-duration time in the DRX cycle, short time cycle information, or the like may be configured in addition to the function for reducing power consumption. In the above, if the function for reducing power consumption of the UE is configured, the UE may configure a DRX cycle, and may detect a wake-up signal (WUS) in an interval configured for monitoring of PDCCH of the base station before the on-duration period, and the base station may indicate, via DCI of PDCCH of the WUS, to the UE whether to skip (or not perform) or perform PDCCH monitoring in an immediately following on-duration period. The UE always needs to monitor PDCCH in the on-duration period, where the base station indicates, via the WUS, to the UE not to perform PDCCH monitoring in the on-duration period, so as to enable reduction of battery consumption.

When the RRC connection configuration is completed as described above, the UE may configure multiple bandwidth parts according to an indication configured via an RRC message. In order to reduce the consumption of a battery, one or a small number of bandwidths among the multiple configured bandwidth parts may be activated. For example, the base station may indicate, to the UE, one bandwidth part to be activated. The base station may indicate activation of the bandwidth part via an RRC message, MAC control information (MAC CE), or L1 signaling (PHY layer control signal such as DCI of PDCCH), so as to indicate switching from an initial access bandwidth part to a new bandwidth part. As another method, new bitmap information may be defined in DCI of PDCCH, and whether to activate a normal bandwidth part (or bandwidth part other than a dormant bandwidth part), whether to activate a dormant bandwidth part, or whether to deactivate a bandwidth part may be indicated. As another method, the bitmap may indicate whether to activate a normal bandwidth part (e.g., first active bandwidth part to be activated from dormancy), whether to active a dormant bandwidth part, whether to switch to a dormant bandwidth part, or whether to perform bandwidth part switching. Since there may be many other new users accessing the initial access bandwidth part, it may be more advantageous, in terms of scheduling, to assign a new bandwidth part and separately manage connected users. This is because the initial access bandwidth part is not configured for each UE, but may be shared and used in common for all UEs. Further, in order to reduce signaling overhead, a default bandwidth part may be dynamically indicated by MAC control information, L1 signaling, or system information.

In the RRC message (RRCSetup message or RRCResume message 1*f*-25, or RRCReconfiguration message 1*f*-70), configuration information for a cell group may also be included. The configuration information for a cell group may include some or multiple pieces of information from the following information, or may indicate a state, procedure, application or releasing of configuration information, or the like for each cell group Cell group identifier indicating a cell group (e.g., cell group identifier or index);
Indicator indicating a state of a cell group (e.g., active state, suspended state, or deactivated state);
Indicator indicating a state of a cell group (e.g., indicator for suspending (or deactivating) a cell group (e.g., cell group (SCG) suspension indicator) or indicator for resuming (or activating) a cell group (e.g., cell group (SCG) resumption indicator)); and
Indicator for triggering a procedure of a corresponding protocol layer device (e.g., SDAP layer device, PDCP layer device, RLC layer device, or MAC layer device) according to the indicator indicating a state of a cell group (e.g., PDCP re-establishment indicator, PDCP data recovery indicator, indicator triggering a new procedure, RLC re-establishment indicator, MAC layer device initialization indicator, or MAC layer device partial initialization indicator)
In case that an indicator for suspending (or deactivating) a state of a cell group is included, second DRX configuration information (e.g., monitoring period, active period (on duration) length, cycle, offset, or the like) which enables PDCCH monitoring to be performed with a very long cycle in a PSCell of the cell group may be configured. For example, when the UE receives an indicator for suspending the cell group, the UE may perform PDCCH monitoring based on a very long cycle by applying the second DRX configuration information, so as to reduce the consumption of the UE. As another method, when the UE receives the indicator for suspending the cell group, the UE may, by applying bandwidth part configuration information for the PSCell of the cell group, activate or switch a downlink bandwidth part of the PSCell of the cell group to a dormant bandwidth part, and may perform UE operations, in a cell for which a dormant bandwidth part is activated, which are provided in the disclosure.

When the UE receives the indicator for suspending the cell group, the UE may deactivate all SCells configured in the cell group. As another method, when the UE receives the indicator for suspending the cell group, the UE may activate or switch a downlink bandwidth part to a dormant bandwidth part with respect to an SCell, for which a dormant bandwidth part is configured, among the SCells configured in the cell group, and may perform UE operations, in a cell for which a dormant bandwidth part is activated, which are provided in the disclosure, or may perform deactivation for an SCell for which a dormant bandwidth part is not configured. As another method, when the UE receives, via the RRC message, the indicator for suspending the cell group, the UE may, according to the indicator or configuration information on each SCell of the cell group, which is included in the RRC message, activate or deactivate each SCell, make each SCell dormant, or activate a dormant bandwidth part, or the UE may activate or deactivate each SCell of the cell group, make each SCell dormant, or activate a dormant bandwidth part, via the indicator (e.g., bitmap) of PDCCH, the MAC control information, or the RRC message before or after reception of the indicator for suspending the cell group Configuration information relating to a transmission resource via which channel measurement is performed in a dormant bandwidth part or in a bandwidth part other than the dormant bandwidth part, and a measurement result is reported (e.g., PUCCH transmission resource information of a PCell, PUCCH SCell, or PSCell).
In case that an indicator for resuming (or activating) a state of a cell group is included, first DRX configuration information (e.g., monitoring period, active period (on duration) length, cycle, offset, or the like) which enables PDCCH monitoring to be performed again in a PSCell of the cell group may be configured. Alternatively, the first DRX configuration information stored for the cell group may be restored and applied. For example, when the UE receives an indicator for resuming the cell group, the UE may perform PDCCH monitoring by applying the stored first DRX configuration information or the first DRX configuration information received via the RRC message, thereby resuming data transmission or reception.

As another method, when the UE receives an indicator for resuming the cell group, the UE may activate or switch a downlink bandwidth part of the PSCell of the group to a bandwidth part (e.g., bandwidth part configured via an RRC message) other than a dormant bandwidth part, by applying bandwidth part configuration information for the PSCell of the cell group, and the UE may perform UE operations, in a cell for which a normal bandwidth part (bandwidth part other than a dormant bandwidth part) is activated, which are provided in the disclosure. Alternatively, when the UE receives an indicator for resuming the cell group, the UE may trigger a random access procedure in the PSCell of the cell group by applying stored random access configuration information or random access configuration information received via the RRC message (random access transmission resource information (time or frequency transmission resource) or dedicated preamble information for transmission of a preamble, or the like).

As another method, when the UE receives an indicator for resuming the cell group, if the RRC message includes the random access configuration information (random access transmission resource information (time or frequency transmission resource) or dedicated preamble information for transmission of a preamble, or the like), the UE may trigger a random access procedure (e.g., contention-free random access) in the PSCell of the cell group by applying the random access configuration information, and if the RRC message for indicating resumption or activation of the cell group does not include the random access configuration information (random access transmission resource information (time or frequency transmission resource) or dedicated preamble information for transmission of a preamble, or the like), the UE may trigger a random access procedure (e.g., contention-based random access) in the PSCell of the cell group, or may trigger a random access procedure (contention-based random access or 2-step random access) on the basis of system information. If there is random access configuration information (random access transmission resource information (time or frequency transmission resource) or dedicated preamble information for transmission of a preamble, or the like) stored in the UE before reception of the indicator for resuming the cell group, the stored random access configuration information may be released or discarded. As another method, the UE may perform PDCCH monitoring in the indicated or configured cell group or cell, and may trigger and perform a random access procedure as indicated in PDCCH In case that the indicator for resuming (or activating) a state of the cell group is included, or when the UE receives an indicator for resuming the cell group, all Scells configured in the cell group may be activated. As another method, when the UE receives an indicator for resuming the cell group, the UE may activate or switch a downlink bandwidth part to a bandwidth part (e.g., first active bandwidth part or bandwidth part configured via an RRC message) other than a dormant bandwidth part with respect to an Scell, for which a dormant bandwidth part is configured, among Scells configured in the cell group, and may perform UE operations, in a cell for which a bandwidth part other than a dormant bandwidth part is activated, which are provided in the disclosure, or may perform activation for an Scell for which a dormant bandwidth part is not configured.

As another method, when the UE receives, via the RRC message, an indicator for resuming the cell group, the UE may, according to the indicator or configuration information on each SCell of the cell group, which is included in the RRC message, activate or deactivate each SCell, make each SCell dormant, or activate a dormant bandwidth part, or the UE may activate or deactivate each SCell of the cell group, make the each SCell dormant, or activate a dormant bandwidth part, via the indicator (e.g., bitmap) of PDCCH, the MAC control information, or the RRC message before or after reception of the indicator for resuming the cell group:

Indicator for adding cell group configuration;
Indicator for releasing cell group configuration;
Security configuration information (security key information, security key information for a cell group, or additional information (e.g., sk-counter);
Indicator indicating handover, cell group addition, or cell group change (e.g., ReconfigurationWithSync indicator or mobilitycontrolInfo indicator);
First channel measurement configuration information for each cell or each bandwidth part; and
Second channel measurement configuration information for each cell or each bandwidth part.

It is provided to include no indicator (e.g., ReconfigurationWithSync indicator or mobilitycontrolInfo indicator) indicating handover, cell group addition, or cell group change in case that the RRC message (e.g., RRCReconfiguration message) includes an indicator for suspending a cell group, and it is provided to include an indicator (e.g., ReconfigurationWithSync indicator or mobilitycontrolInfo indicator) indicating handover, cell group addition, or cell group change in case that the RRC message includes an indicator for resuming a cell group or configuration information for configuring a cell group. This is because, in case that a cell group is resumed, a connection with the cell group may be performed again, and therefore synchronization may be performed, system information may be received, or a random access procedure may be performed if necessary.

Hereinafter, a dormant bandwidth part is newly provided in the next-generation mobile communication system, and UE operation in each bandwidth part when each bandwidth part is transited or switched is specifically provided.

FIG. 1G illustrates a state transition procedure for each bandwidth part or a bandwidth part switching procedure according to various embodiments of the present disclosure.

As illustrated in FIG. 1G, a bandwidth part of each cell (e.g., Scell or PSCell) of each cell group of a UE may be activated to a normal bandwidth part 1g-01, may be activated to a dormant bandwidth part 1g-02, or may be deactivated 1g-03, and a normal bandwidth part or a dormant bandwidth part may be activated or deactivated via indication by configuration information of an RRC message, MAC control information, or DCI of PDCCH.

The state transition operation (activation, deactivation, or making dormant) for each bandwidth part of a cell, activating a normal bandwidth part, activating a dormant bandwidth part, activating a first active bandwidth part activated from dormancy, or deactivating a normal bandwidth part or a dormant bandwidth part, which are provided in the disclosure, may be performed based on one indication or configuration in the following cases.

In case that a bandwidth part state of a cell is configured via an RRC message, if a bandwidth part of each cell is configured via an RRC message and a dormant bandwidth part is configured for the cell, or if a first active bandwidth part is configured as a dormant bandwidth part, the cell starts by switching or activating to the dormant bandwidth part, and an operation in the dormant bandwidth part is performed.

In case that a cell activation, deactivation, or dormancy MAC CE is received.

In case that the MAC CE indicating activation or deactivation of a first active bandwidth part or a dormant bandwidth part from a normal bandwidth part or dormancy is received.

In case that the DCI of PDCCH indicating activation, deactivation, or switching of a first active bandwidth part or a dormant bandwidth part from a normal bandwidth part or dormancy is received In case that a cell hibernation timer is not configured for an active state cell, and a configured cell deactivation timer expires.

In case that a bandwidth part hibernation timer is not configured for an active state bandwidth part, and a configured bandwidth part state inactivity timer (e.g., bwpLnactivityTimer) expires, also the state transition operation or dormant bandwidth part operation method provided in the disclosure may has the following characteristics.

For an SPCell (PCell or PSCell)(or downlink bandwidth part or uplink bandwidth part of the cell), a dormant bandwidth part cannot be configured, and only normal bandwidth part is configured and is always activated. Since synchronization is performed and a main control signal is transmitted or received in an SPCell, if a bandwidth part of the SPCell is dormant or deactivated, or is operated as a dormant bandwidth part, a connection with a base station may be disconnected, so that the bandwidth part of the SPCell may always be kept active.

If PUCCH is configured despite an Scell or a bandwidth part of an Scell, a dormant state or a dormant bandwidth part cannot be configured. Since there may be another cell that needs to transmit feedback, such as HARQ ACK/NACK via PUCCH, an active state or a normal bandwidth part may be activated and used.

Due to the above characteristics, neither the cell deactivation timer (ScellDeactivationTimer) nor the bandwidth part dormancy timer is applied to an Spcell, a bandwidth part of an SPCell, an Scell for which PUCCH is configured, or a bandwidth part of an Scell, and the timers may be operated only for other Scells.

The cell hibernation timer or bandwidth part hibernation timer (ScellHibernationTimer) has priority over the cell deactivation timer or bandwidth part state deactivation timer (ScellDeactivationTimer). Also, for a timer value, if one timer value is configured via an RRC message, the same value may be applied to all cells. As another method, a base station may configure a different timer value for each Scell or for each BWP in consideration of characteristics of each Scell or each BWP.

Unless a cell or a bandwidth part is indicated to be active or dormant via an RRC message, the cell or bandwidth part operates initially in a deactivated state by default.

In the disclosure, an uplink may indicate an uplink bandwidth part, and a downlink may indicate a downlink bandwidth part. This is because only one active or dormant bandwidth part is operable for each uplink or downlink.

In the disclosure, an active state, a deactivated state, or a dormant state is operated, and when a cell or a bandwidth part is transited or switched, transition or switching is performed in bandwidth part level, where, when state transition or switching occurs according to a bandwidth part level, a bandwidth part (downlink bandwidth part or uplink bandwidth part), for which state transition or switching is indicated, performs state transition or switching according to an indication. For example, if a bandwidth part (downlink bandwidth part or uplink bandwidth part) is transited from an active state to a dormant state or is switched (activated) to a dormant bandwidth part, the bandwidth part may be transited to a dormant state or may be switched (or activated) to a dormant bandwidth part.

In the disclosure, bandwidth part switching (BWP switching) refers to a case where, when bandwidth part switching is indicated via DCI of PDCCH, if the switching is indicated by a bandwidth part identifier during downlink assignment allocation, a downlink bandwidth part is switched to a bandwidth part indicated by the bandwidth part identifier; and when bandwidth part switching is indicated via DCI of PDCCH, if the switching is indicated by a bandwidth part identifier during UL grant allocation, an uplink bandwidth part is switched to a bandwidth part indicated by the bandwidth part identifier. Since a DCI format itself of PDCCH is different from a format (format1) for downlink assignment and a format (format0) for UL grant, even if an uplink and a downlink are not separately described, the UE may operate according to the DCI format.

The method of performing state transition according to a bandwidth part level, and the bandwidth part operations according to respective states, provided in the disclosure, may be extended and applied to various embodiments. In the following of the disclosure, specific embodiments, in which the contents provided in the disclosure are extended and applied, will be described.

FIG. 1H illustrates a discontinuous reception (DRX) configuration or a DRX operation method capable of saving the consumption of a battery of a UE according to various embodiments of the present disclosure.

In FIG. 1H, a base station may configure a UE with a DRX function, such as a DRX cycle, start point, offset, or on-duration (active time), for a PCell, an Scell, or a PSCell via an RRC message, as shown in FIG. 1F. In the disclosure, it is considered to configure the DRX function for a PCell, an SPCell, or a PSCell.

As described above, if the DRX function is configured for a PCell (or SPCell or PSCell), the UE may apply the DRX function in consideration of a DRX cycle $1h$-03, a DRX start time, or an offset. When the DRX function is applied, the UE may monitor PDCCH or DCI of PDCCH, which may be received from the base station, in the PCell only in an activation time interval of DRX (on-duration or active time, $1h$-01) Also, the UE may reduce battery consumption by preventing the UE from monitoring PDCCH or DCI of PDCCH outside the activation time interval of the DRX function (outside active time, $1h$-02).

In above FIG. 1F, the base station may configure a power saving function (power saving mode) for the UE via an RRC message in order to further improve battery consumption of the UE. If the power saving function is configured together with the DRX function, the UE monitors PDCCH outside the activation time interval for a short time interval $1h$-04 configured via RRC before the active time $1h$-01, at which the UE needs to monitor PDCCH, in the DRX function, and the UE monitors and receives a wake up signal (WUS) outside the activation time interval. The base station may indicate, using a bit of DCI of PDCCH for the WUS signal, whether the UE may perform PDCCH monitoring or not at subsequent active time $1h$-05, $1h$-07.

That is, the UE, for which the power saving function or the DRX function has been configured, may monitor a WUS signal for the short time interval $1h$-04 configured via an RRC message before every active time $1h$-05, and if a bit value of DCI of PDCCH relating to the subsequent active time $1h$-05, $1h$-07 has 0 (or 1) in the received WUS signal, the UE may be indicated not to monitor PDCCH for the subsequent active time $1h$-07, or the UE may be indicated not to monitor PDCCH, by preventing a timer corresponding to the subsequent active time from operating in a MAC layer device. If the bit value of DCI of PDCCH relating to the subsequent active time $1h$-05, $1h$-07 has 1 (or 0) in the received WUS signal, the UE may be indicated to monitor PDCCH for the subsequent active time $1h$-05, or may be indicated to monitor PDCCH, by causing the timer corresponding to the subsequent active time to operate in the MAC layer device.

In addition, the UE may not monitor a WUS signal or PDCCH for detecting a WUS signal in an activation time interval.

When monitoring a WUS signal for the short time interval $1h$-04 configured via an RRC message before every active time $1h$-05, the UE, for which the power saving function or the DRX function has been configured, may detect the signal by identifying PDCCH with a first RNTI identifier (e.g., PS-RNTI). The first RNTI identifier (e.g., PS-RNTI) may be configured for multiple UEs, and the base station may concurrently indicate, using the first RNTI identifier (e.g., PS-RNTI), to multiple UEs whether or not to perform PDCCH monitoring at a subsequent activation time interval.

In addition, when monitoring and detecting PDCCH in the active time $1h$-05, the UE, for which the power saving function or the DRX function has been configured, may detect a signal on the basis of a second RNTI (e.g., C-RNTI), a third RNTI (e.g., MCS-C-RNTI), or a fourth RNTI (e.g., SPS-C-RNTI or CS-RNTI) uniquely configured for the UTE via an RRC message. The second RNTI (e.g., C-RNTI) may be used for indicating general UE scheduling, the third RNTI (e.g., MCS-C-RNTI) may be used for indicating a modulation and coding scheme of the UE, and the fourth RNTI (SPS-C-RNTI or CS-RNTI) may be used for indicating a periodic transmission resource of the UE.

FIG. 1I illustrates a method of operating a dormant bandwidth part in an activated Scell or PSCell according to various embodiments of the present disclosure.

As illustrated in FIG. 1F, a base station, for a UE via an RRC message, may, for carrier aggregation, configure multiple Scells, allocate respective Scell identifiers, and configure a dormant bandwidth part for each Scell, or may, for dual connectivity, configure multiple cell groups, allocate cell group identifiers, and configure or indicate a cell group suspension indicator or configure a dormant bandwidth part for each cell group or a PSCell of each cell group. In addition, the multiple Scells may be included in each Scell group so as to be configured, and each Scell group may include multiple Scells. An Scell group identifier may be allocated to each Scell group, and multiple Scell identifiers may be configured to be included in or mapped to each Scell group identifier. An Scell identifier value or an Scell group identifier value may be allocated with a predetermined bit value or may have an integer value (or natural number value). Alternatively, the PSCell of each cell group may be indicated by a cell group identifier.

In FIG. 1I, the base station may define a new bitmap for DCI of PDCCH transmitted in a PCell, may perform mapping to cause each bit value of the bitmap to indicate each Scell identifier value, each Scell group identifier value, a cell group (or secondary cell group) identifier, or a PSCell (or Scell) of a cell group (or secondary cell group), and may indicate, by defining each bit value, whether to perform switching to a dormant bandwidth part, whether to activate a dormant bandwidth part, or whether to suspend or resume a cell group, for an Scell corresponding to a bit, Scells belonging to an Scell group, a cell group (or secondary cell group), or a PSCell (or Scell) of a cell group (or secondary cell group). In addition, the base station may indicate whether to switch from a dormant bandwidth part to a normal bandwidth part (e.g., first active bandwidth part activated from dormancy) or whether to activate a normal bandwidth part (e.g., first active bandwidth part activated from dormancy) for the Scell corresponding to the bit, the SCells belonging to the SCell group, the cell group (or secondary cell group) identifier, or the PSCell (or Scell) of the cell group (or secondary cell group).

In FIG. 1I, after receiving DCI of PDCCH in a PCell 1i-01, the UE may determine, while reading DCI, whether there is a bitmap including an indication (e.g., switching or activation to a dormant bandwidth part, or switching or activation to a normal bandwidth part) for bandwidth parts of Scells or Scell groups, or an indication of suspending or resuming a cell group (or secondary cell group) or a PSCell (or Scell) of a cell group (or secondary cell group). If there is the bitmap, for an Scell. Scells 1i-02, 1i-03 belonging to an Scell group, a cell group (or secondary cell group), or a PSCell (or Scell) of a cell group (or secondary cell group), indicated by each bit of the bitmap, a bandwidth part may be switched or activated, or the cell group may be suspended or resumed according to the bit value.

For example, if the bit of the bitmap indicates a first Scell (or first Scell identifier 1i-02), a cell group (or secondary cell group), or a PSCell (or Scell) of a cell group (or secondary cell group), or indicates a Scell group including the first Scell (or identifier of Scell group), and the bit value is 0 (or 1), the UE may, for the first Scell 1i-02, the cell group (or secondary cell group), or the PSCell (or Scell) of the cell group (or secondary cell group), activate a bandwidth part 1i-21 to a dormant bandwidth part 1i-22, or switch a current bandwidth part to the dormant bandwidth part 1i-22, or in case that the current bandwidth part is not a dormant bandwidth part, the UE may switch or activate 1i-25 the currently activated bandwidth part 1i-21 to the dormant bandwidth part 1i-22, or may suspend or deactivate a cell group. As another method, power consumption of the UE may be reduced by maintaining the bandwidth part of a cell group (or secondary cell group) or a PSCell (or Scell) of a cell group (or secondary cell group) as it is, applying the second DRX configuration information or second SRS configuration information provided in the disclosure, and performing PDCCH monitoring or SRS transmission in a long cycle.

In FIG. 1I, after receiving DCI of PUCCH in the PCell 1i-01, the UE may determine, while reading DCI, whether there is a bitmap including an indication (e.g., switching or activation to a dormant bandwidth pail, or switching or activation to a normal bandwidth part) for bandwidth parts of Scell or Scell groups, an indication for a bandwidth part of a cell group (or secondary cell group) or a bandwidth part of a PSCell (or Scell) of a cell group (or secondary cell group), or an indication of suspending or resuming the cell group. If there is the bitmap, for an Scell, Scells 1i-02, 1i-03 belonging to an Scell group, a cell group (or secondary cell group), or a PSCell (or Scell) of a cell group (or secondary cell group), indicated by each bit of the bitmap, a bandwidth part may be switched or activated, or the cell group may be suspended or resumed according to the bit value.

For example, when the bit of the bitmap indicates a second SCell (or second SCell identifier 1i-03) or indicates an SCell group (or SCell group identifier) including the second SCell, a cell group (or secondary cell group), or a PSCell (or SCell) of a cell group (or secondary cell group), and the bit value is 1 (or 0), if a currently activated bandwidth part of the second SCell 1i-03 is a dormant bandwidth part 1i-32, if the currently activated bandwidth part is not a normal bandwidth part, or if the current bandwidth part (or cell) is activated and the current bandwidth part is activated to the dormant bandwidth part 1i-32 (or activated to a bandwidth part other than a normal bandwidth part), the UE may switch or activate 1i-35 the bandwidth part of the second SCell 1i-03 to a bandwidth part 1i-33 (e.g., first active bandwidth part activated from dormancy) configured via an RRC message or may resume or activate the cell group.

In case that, due to the bit value of 1 (or 0), the Scell, the Scells belonging to an Scell group, the cell group (or secondary cell group), or the PSCell (or Scell) of the cell group (or secondary cell group), indicated by the bit, may be switched or activated to a bandwidth part other than a dormant bandwidth part, or the cell group may be resumed, if the Scell is deactivated or if the Scell is activated and an activated bandwidth part is not a dormant bandwidth part (or is a normal bandwidth part), then the bit value may not be applied or may be disregarded or may not be read for the Scell or each of the Scells belonging to the Scell group, or if the cell group (or secondary cell group) or the PSCell (or Scell) of the cell group (or secondary cell group) has already been active or resumed, then the bit value may not be applied or may be disregarded or may not be read. In addition, in case that, due to the bit value of 0 (or 1), the Scell, the SCells belonging to an SCell group, the cell group (or secondary cell group), or the PSCell (or Scell) of the cell group (or secondary cell group), indicated by the bit may be switched or activated to a dormant bandwidth part, or the cell group may be resumed, if the Scell is active and an activated bandwidth part is a dormant bandwidth part, then the bit value may not be applied or may be disregarded or may not be read for the Scell or each of the Scells belonging to the SCell group, or if the cell group (or secondary cell group) or the PSCell (or Scell) of the cell group (or secondary cell group) has already been suspended or deactivated, then the bit value may not be applied or may be disregarded or may not be read.

Hereinafter, the disclosure proposes methods for quickly activating a cell (Scell, PSCell, or Scell) when the cell is activated.

Specifically, the base station may configure the first channel measurement configuration information that can quickly measure and report the channel when the UE activates a cell in an RRC message (RRCReconfiguration or RRCResume) In order for the base station to temporary, many, or frequently transmit a channel measurement signal to allow the cell to quickly perform channel measurement to quickly activate the cell group, the first channel measurement configuration information may include, in the configuration information of the cell (e.g., PCell or PSCell or Scell) of the cell group, configuration information such as a cycle of a frequent channel measurement signal (e.g., radio resources, a temporary reference signal (TRS), a synchronization signal block (SSB), a channel state information reference signal (CSI-RS), or a reference signal (RS)), or transmission resource information for transmission (frequency or time transmission resource via which the frequent channel measurement signal is transmitted), an interval or number (the number of times the frequent channel measurement signal is transmitted), a timer value (time at which the frequent channel measurement signal is transmitted), or a time interval (interval in which the frequent channel measurement signal is transmitted (e.g., an offset of time unit (slot, subframe, symbol, or the like)), or a transmission resource, a cycle, an interval, a timing, or an offset for reporting the measurement result of the UE.

In the above, the first channel measurement configuration information may configure the transmission resource for channel measurement such that a reporting cycle (or transmission resource) via which the UE may report a channel measurement result can be configured short, or the base station can transmit many or frequently channel measurement signal (or transmission resources or for example, a radio resource or a temporary reference signal (TRS)) so as to support the UE to perform fast channel measurement or many signal measurements. In the above, the first channel measurement configuration information may include configuration information for a channel measurement signal for a specific UE (or specific UEs) by the base station in the cell or bandwidth part. In addition, the first channel measurement configuration information may be configured differently for each cell or for each bandwidth part for a plurality of cells or bandwidth parts configured in the RRC message, and may configure beam-related configuration information (transmission configuration indication (TCI) state or quasi co-location (QCL)) such as a beam direction, a beam number, or a beam location together to support for the UE to easily measure the transmission resource for measuring a channel.

In addition, in the first channel measurement configuration information, a timing advance (TA) value (or an offset value) for synchronizing a downlink signal of a base station or an uplink signal of a base station, or a timer (time alignment timer (TAT)) indicating validity of the TA value, or a timer value (a TAT value) may be configured to correctly perform channel measurement or channel measurement report. For example, the first channel measurement configuration information may include a cycle of the channel measurement signal, or a number of times a signal is transmitted, or a period during which a signal is transmitted, or an offset with respect to the time during which a signal is transmitted, or the length of time between transmitted signals, or a list of a plurality of channel measurement signals that can be transmitted, or a time transmission resource (or frequency transmission resource) indicating the location of a transmitted signal, or a transmission resource (a time transmission resource or a frequency transmission resource) to report the measurement result, or a cycle to report the measurement result, or beam-related configuration information (transmission configuration indication (TCI) state or quasi co-location (QCL)) for measuring the channel measurement signals, or the like.

In addition, the first channel measurement configuration information configured as an RRC message may include a plurality of channel measurement signal information, and may indicate any one channel measurement signal information of the configured plurality of channel measurement signal information or beam configuration information as an RRC message or MAC CE or DCI so that the UE may apply or use the indicated chancel measurement signal information or beam configuration information to perform channel measurement or perform channel measurement report. The above indicating method may define a mapping between a bitmap, an index, or an identifier, and each channel measurement signal information configured above, and may perform indication based on the defined mapping. As another method, a method may configure or indicate the channel measurement signal information as an RRC message or MAC CE so that the UE applies or uses the configured (or indicated) channel measurement signal information to perform channel measurement or channel measurement report.

As another method, when the UE is configured with the first channel measurement configuration information via the RRC message, in case that the RRC message indicates a cell to be activated by configuring the state of the cell to an activated state in the RRC message, the UE may apply or use the first channel measurement configuration information to quickly perform channel measurement or report, thereby facilitating quick activation of the cell. For example, in case that the first channel measurement configuration information, or channel measurement signal information, or beam-related configuration information, which is applicable to a case where the RRC message indicates to activate a cell by configuring the state of the cell to an activated state in the RRC message, is configured as separate configuration information (default configuration) in the RRC message or if only the channel measurement signal information (or beam-related configuration information) corresponding to an identifier of 0 or single channel measurement signal information (or beam-related configuration information) is configured, this channel measurement signal information (or beam-related configuration information) may be applied.

The first channel measurement configuration information provided in the disclosure may be configured only for the downlink bandwidth part configuration information of each cell. That is, the first channel measurement configuration information provided in the disclosure may not be configured for the uplink bandwidth part configuration information of each cell. This is because the UE can receive PDCCH correctly and follow the indication of the base station only after the UE first measures the channel for the downlink and reports the measurement result for the channel or cell.

The first channel measurement configuration information provided in the disclosure is initially deactivated when the first channel measurement configuration information is configured as an RRC message or after handover, and may be activated later by the MAC control information provided in the disclosure or the DCI of PDCCH or the RRC message. In case that the first channel measurement configuration information is configured as an RRC message as described above, the base station can easily manage the cell state or channel measurement procedure of the terminal only when the initial state is configured to be in an inactive state, and without a problem of processing delay of the RRC message, the timing of when and how the UE performs channel measurement can also be accurately performed.

In addition, in the RRC message (RRCReconfiguration or RRCResume), second channel measurement configuration information may be included or configured. The second channel measurement configuration information may include general channel measurement configuration information, such as a transmission resource, cycle, time interval, or number of times of channel measurement signal, or a transmission resource, a cycle, or a time interval for channel measurement report.

Hereinafter, the disclosure proposes, as provided above, when the UE is configured with the first channel measurement configuration information or the second channel measurement information via an RRC message, the structure or indication method of MAC control information (MAC Control Element) that enables the UE to activate a cell, quickly measure a channel based on the first channel measurement configuration information, and report a measurement result to quickly activate the cell. For example, MAC control information (or RRC message) provided in the disclosure may indicate which cell to activate or deactivate among multiple cells (SCells) configured as RRC, or if MAC control information indicates to activate a certain cell, the MAC control information (or RRC message) may apply certain measurement signal information among the first channel measurement configuration information configured as an RRC message, and may indicate how to measure a signal (e.g., the MAC control information may indicate how many times to measure a signal transmission resource or how many signals are transmitted, or in which time interval to measure, or based on which offset to determine a measurement time interval, or at what cycle to measure a signal, or in which transmission resource to measure a signal, etc.), and how to report (e.g., the MAC control information indicate how many times to report a measurement result, or in what time interval to report a measurement result, or based on which offset to determine a transmission resource for a measurement result, or at what cycle to report a measurement result, or in which transmission resource to report a measurement result, etc.), thereby quickly activating a cell based on the first channel measurement configuration information configured as an RRC message.

FIG. 1J illustrates MAC control information according to various embodiments of the present disclosure.

When the MAC control information provided in the disclosure is generated and transmitted by a UE or a base station, the MAC control information may be included in a MAC protocol data unit (MAC PDU) to be transmitted, and may be included in a structure such as 1j-10. For example, if the MAC control information provided in the embodiments of the disclosure is generated, a MAC subheader corresponding to the MAC control information is generated as illustrated in 1j-11 with a structure like 1j-10, and is attached in front of the MAC control information and constituted to form one MAC subPDU. In case that the length (or size) of the MAC control information is fixed (fixed size), the MAC subheader of 1j-11 includes only a logical channel identify (LCID) field and a reserved field as in 1j-20, and may have a structure having a predetermined size (e.g., 1 byte), and in case that the length (or size) of the MAC control information is variable (variable size), the MAC subheader includes a logical channel identify (LCID) field, a reserved field, an L field, and an F field indicating the size of the L field, as in 1j-21 and may have a structure having a predetermined size (e.g., 2 bytes).

Hereinafter, the disclosure proposes and describes a first embodiment of MAC control information (SCell activation/deactivation MAC CEs) indicating the activation or deactivation of a SCell.

In a first embodiment, MAC control information (or bitmap information) for activating or deactivating a SCell having a size of 1 byte is identified by a 1-1 logical Channel Identity (LCID), and may have a structure such as 1j-30 of FIG. 1j. The MAC control information has a fixed size and consists of 8 bits (or 1 byte) including 7 C fields and 1 reserved field (R field).

In the first embodiment, the MAC control information (or bitmap information) for activating or deactivating the SCell having a size of 4 bytes is identified by a 1-2 logical channel identify (LCID), and may have the structure such as 1j-31 of FIG. 1j. The MAC control information has a fixed size and consists of 32 bits (or 4 bytes) including 31 C fields and 1 reserved field (R field).

C(i) field: As provided above of the disclosure, if a cell (SCell) configuration information has been configured in the UE or the MAC layer device via an RRC message, and there is a certain cell (SCell) in which a cell identifier value (i) is configured as a cell identifier (SCell Index) in the cell configuration information, the C(i) field indicates the activation or deactivation state of the cell (SCell) corresponding to the cell identifier value (i). Otherwise (if there is, in the UE or the MAC layer device, no cell (SCell) in which the cell identifier value (i) is configured as the cell identifier (SCell Index) in the RRC message), the MAC layer device may ignore the C(i) field. In the above, in case that the C(i) field value is configured to 1, the C(i) field indicates to activate the SCell corresponding to the cell identifier value (i). In the above, in case that the C(i) field value is configured to 0, the C(i) field indicates to activate the SCell corresponding to the cell identifier value (i).

R field: reserved bit, configured to 0;

When a cell identifier value is configured in the RRC message, the cell identifier (SCell index) has a length of 5 bits and indicates an integer value (0 to 31). In addition, the C (integer value) field value corresponding to the integer value may indicate the activation or deactivation of the cell.

When the base station transmits the MAC control information 1j-30 or 1j-3l proposed in the first embodiment to the UE, the base station determines for the UE whether to activate or deactivate the cells corresponding to the cell identifier value configured by the RRC message. Then, the base station configures each C(i) field value corresponding to each cell identifier (SCell index) value (i) in the MAC control information to 0 or 1 and transmits the configured C(i) field to the UE to activate or deactivate the cell configured in the UE.

When the UE receives the MAC control information 1j-30 or 1j-31 provided in the first embodiment from the base station, the UE identifies the cell identifier (SCell index) value of each cell (SCell) configured as the RRC message, reads each C(i) field value corresponding to each cell identifier (SCell index) value (i) from the received MAC control information, and activates (e.g., in case that the C(i) field value is 1) or deactivates (e.g., in case that the C(i) field value is 0) a cell corresponding to the cell identifier value (i) according to the C(i) field value.

Hereinafter, the disclosure proposes a second embodiment of a structure and indication method of MAC control information (MAC control element), which can quickly measure a channel based on the first channel measurement configuration information configured in the UE via an RRC message, or report a measurement result, and quickly activate a cell when activating a cell with the MAC control information of the first embodiment.

The second embodiment may have a structure such as 1*j*-40 of FIG. 1J. For example, the MAC control information may indicate a certain cell (SCell) by including a cell identifier value configured as RRC, and define a new first field (TRS related field for the SCell). When activating a cell indicated by the cell identifier, the first field may include or indicate configuration information related to the first channel measurement configuration information configured in the RRC message or the first channel measurement configuration information. For example, the first field may include the first channel measurement configuration information, or information indicating some information among the first channel measurement configuration information, or may indicate to apply (or use, or activate) certain information among the first channel measurement configuration information configured as an RRC message.

For example, the first field may indicate, in the first channel measurement configuration information configured in an RRC message, a cycle of a frequent channel measurement signal (e.g., radio resources, a temporary reference signal (TRS), a synchronization signal block (SSB), a channel state information reference signal (CSI-RS), or a reference signal (RS)), or transmission resource information for transmission (frequency or time transmission resource via which the frequent channel measurement signal is transmitted), an interval or number (the number of times the frequent channel measurement signal is transmitted), a timer value (time at which the frequent channel measurement signal is transmitted), or a time interval (interval in which the frequent channel measurement signal is transmitted (e.g., an offset of time unit (slot, subframe, symbol, or the like)), or a transmission resource, a cycle, an interval, a timing, or an offset for reporting the measurement result of the UE, or beam-related configuration information (transmission configuration indication (TCI) state or quasi co-location (QCL)) such as a beam direction, a beam number, or a beam location, or a timing advance (TA) value (or an offset value) for synchronizing a downlink signal of a base station or an uplink signal of a base station, or whether to start or suspend of a tinier (time alignment timer (TAT)) indicating validity of the TA value, or a timer value (a TAT value).

The above indicating method may define a mapping between each channel measurement signal information configured in the RRC as above and the first field by using a bitmap, an index, or an identifier, and performs indication based on the mapping. As another method, a method may configure or indicate the channel measurement signal information with the first field, so that the UE applies or uses the configured (or indicated) channel measurement signal information to perform channel measurement or channel measurement reporting.

Also, if the first field has a specific value (e.g., a value with all bits 0 (000 . . . 0) or a value with all bits 1 (111 . . . 1) or a promised or defined value), when activating a cell indicated by the cell identifier, the cell may be activated without considering or applying the first channel measurement configuration information (that is, a cell may be activated in the same procedure as in activating a cell of the UE with the MAC control information of the first embodiment provided in the disclosure). In addition, if the first channel measurement configuration information is not configured as an RRC message for a certain cell, the first field may be configured as the specific value (e.g., a value in which all bits are 0 (000 . . . 0), or all bits are 1 (111 . . . 1), or a promised, or defined value). Alternatively, if the first channel measurement configuration information is not configured as the RRC message for a certain cell of the UE, the UE may ignore, or not read, or not consider the first field value for the cell. The cell identifier information included in the MAC control information 1*j*-40 provided in the second embodiment may indicate one cell (SCell) among the cells configured in the UE, and when activating the cell, since the first field included in the MAC control information includes information that helps to quickly activate the cell as provided above, the MAC control information itself of the second embodiment may indicate to activate the cell indicated by the cell identifier included in the MAC control information.

As another method, the cell identifier information included in the MAC control information 1*j*-40 provided in the second embodiment may indicate one cell (SCell) among the cells configured in the UE, and when activating the cell, the first field included in the MAC control information includes information that helps to quickly activate the cell as provided above, and a new second field is defined in the MAC control information of the second embodiment to indicate the activation or deactivation of the cell indicated by the cell identifier included in the MAC control information.

As another method, the cell identifier information included in the MAC control information 1*j*-40 provided in the second embodiment may indicate one cell (SCell) among the cells configured in the UE, and when activating the cell, the first field included in the MAC control information may include information that helps to quickly activate the cell as provided above, and the MAC control information 1*j*-40 provided in the second embodiment and the MAC control information 1*j*-30 or 1*j*-31 provided in the first embodiment of the disclosure are included together in one transmission data (e.g., MAC PDU or transport block (TB)) to be transmitted. In this case, the MAC control information 1*j*-30 or 1*j*-31 provided in the first embodiment indicates which cell to activate or deactivate among the cells configured in the UE, and the MAC control information 1*j*-40 provided in the second embodiment may include in the first field the information that is applicable to the quick cell activation when activating a cell indicated by a cell identifier included in the MAC control information provided in the second embodiment, among the cells activated by the MAC control information of the first embodiment, and transmit the information included in the first field.

A plurality of pieces of MAC control information of the second embodiment may be included in the one transmission data so that each MAC control information may indicate first field information supporting quick activation of each cell. For example, the one transmission data (e.g., MAC PDU or transport block (TB)) includes the MAC control information 1*j*-30 or 1*j*-31 provided in the first embodiment to activate a plurality of cells. In the case of the indicated cell including the MAC control information 1*j*-40 provided in the second embodiment among the plurality of cells, the cell can be activated quickly in consideration of the first field information, In the case of a cell in which the MAC control information provided in the second embodiment is not included and is not indicated, the cell may be activated without the first field information.

When constituting a MAC subPDU such as 1*j*-10 to transmit the MAC control information provided in the first embodiment or second embodiment of the disclosure, the MAC control information provided above is constituted as 1*j*-12 and the MAC subheader 1*j*-10 corresponding thereto does not include an L field (length field) like 1*j*-20, but uses a header structure including an R field (reserved field) or a logical channel identify (LCID) field. This is because the MAC control information provided in the first or second embodiment of the disclosure has a fixed size to reduce unnecessary overhead due to the L field.

In the above, the MAC control information of the second embodiment may define a second logical channel identify (LCID) to identify whether it is the second embodiment.

FIG. 1K illustrates MAC control information according to various embodiments of the present disclosure.

Hereinafter, the disclosure proposes and describes a third embodiment of MAC control information (SCell activation/deactivation MAC CEs) indicating the activation or deactivation of a SCell or configuring or indicating information related to the first channel measurement information.

In the third embodiment, bitmap information 1*k*-10 for activating or deactivating a SCell having a size of 1 byte as in the first embodiment may be included, or a new first field (TRS related field for the SCell C(i)) 1*k*-11 may be defined and included.

In the above, the MAC control information of the third embodiment uses the same 1-1 logical channel identity (LCID) used in the first embodiment, but a reserved field (R field) value of the bitmap information 1*k*-10 may be newly defined to distinguish whether it is the first embodiment or the third embodiment (e.g., according to the value 0 or 1, the first embodiment or the third embodiment is indicated), and the MAC control information may have a structure such as 1*k*-10. As another method, in the third embodiment, by defining a 3-1 logical channel identify (LCID), it is possible to distinguish whether it is the MAC control information of the third embodiment.

The MAC control information has a variable size and consists of 8 bits (or 1 byte) including 7 C(i) fields and 1 reserved field (R field). In the above, the C(i) field may indicate activation or deactivation with a value of 0 or 1 for the cell (SCell) corresponding to the value (i) of the cell identifier (SCell index), and may also indicate the presence or non-presence of the first field (TRS related field for the SCell C(i)) 1*k*-11 for the cell. For example, if the C(i) field value is 1 (or 0), the MAC control information may indicate to activate the cell (SCell) corresponding to the value (i) of the cell identifier (SCell index), and also, may indicate the presence of the first field (TRS related field for the SCell C(i)) 1*k*-11 for the cell. In the above, when the first field is present and the first field activates the cell indicated by the cell identifier, the first field may include or indicate the configuration information related to the first channel measurement configuration information configured in the RRC message or the first channel measurement configuration information. For example, the first field may include the first channel measurement configuration information or information indicating some information among the first channel measurement configuration information, or may indicate to apply (or use, or activate) certain information among the first channel measurement configuration information configured as an RRC message.

Also, if the first field has a specific value (e.g., a value with all bits 0 (000 . . . 0) or a value with all bits 1 (111 . . . 1) or a promised or defined value), when activating a cell indicated by the cell identifier, the cell may be activated without considering or applying the first channel measurement configuration information (that is, a cell may be activated in the same procedure as in activating a cell of the LE with the MAC control information of the first embodiment provided in the disclosure). In addition, if the first channel measurement configuration information is not configured as an RRC message for a certain cell, the first field may be configured as the specific value (e.g., a value in which all bits are 0 (000 . . . 0), or all bits are 1 (111 . . . 1), or a promised, or defined value). Alternatively, if the first channel measurement configuration information is not configured as the RRC message for a certain cell of the UE, the UE may ignore, or not read, or not consider the first field value for the cell.

The first field may have a length of 1 byte (or 2 bytes), and by defining the length to be byte aligned, the implementation of the first field may be simplified and a processing may be performed quickly.

The MAC control information having a variable length (variable sized MAC CE) of the third embodiment provided in the disclosure may have a variable size or a dynamic length. As provided above, according to the C(i) field value of the bitmap information 1*k*-10, the respective first fields 1*k*-11 for each cell may be added after the bitmap information. For example, for cells (SCells) in which the C(i) field value is configured to 1 (or 0) to indicate the presence of the first field, the first fields may be added in ascending (or descending) order of the cell identifier (SCell index) value or in ascending (or descending) order of i value, and may indicate the information related to the first channel measurement configuration information corresponding (or mapping) to each cell (SCell).

In FIG. 1K, 1*k*-30 illustrates an example of the MAC control information of the third embodiment of the disclosure. In the bitmap information of 1*k*-30, a C(2) field, a C(5) field, and a C(7) field are configured to 1 to indicate the activation of the cell having the value (2, or 5, or 7) of the cell identifier corresponding to the C field value. The respective first fields corresponding to the C(2) field, the C(5) field, and the C(7) field may be added after the bitmap information in ascending order of the cell identifier value or (i) value. In addition, when the UE activates a cell in which activation is indicated in the bitmap information, the UE may quickly activate the cell by applying the first channel measurement configuration information indicated by the first field.

In the above, the number of first fields is the same as the number of C(i) fields in which the field value is configured to 1 (or 0) in the bitmap information. Also, the number of the first fields may be 0. That is, in the MAC control information of the third embodiment, the bitmap field is always present, but the first field may not be present.

The MAC control information of the third embodiment provided in the disclosure may be easily extended to the MAC control information having 4-byte bitmap information as illustrated in 1*k*-20 and 1*k*-21 of FIG. 1K. In the third embodiment, when defining the first field (TRS related field for the SCell C(i)) and activating the cell indicated by the cell identifier, the first field may include or indicate configuration information related to the first channel measurement configuration information configured in the RRC message or the first channel measurement configuration information. For example, the first field may include the first channel measurement configuration information or information indicating some information among the first channel measurement configuration information, or may indicate to apply (or use, or activate) certain information among the first channel measurement configuration information configured as an RRC message.

For example, the first field may indicate, in the first channel measurement configuration information configured in an RRC message, a cycle of a frequent channel measurement signal (e.g., radio resources, a temporary reference signal (TRS), a synchronization signal block (SSB), a channel state information reference signal (CSI-RS), or a reference signal (RS)), or transmission resource information for transmission (frequency or time transmission resource via which the frequent channel measurement signal is transmitted), an interval or number (the number of times the frequent channel measurement signal is transmitted), a timer value (time at which the frequent channel measurement signal is transmitted), or a time interval (interval in which the frequent channel measurement signal is transmitted (e.g., an offset of time unit (slot, subframe, symbol, or the like)), or a transmission resource, a cycle, an interval, a timing, or an offset for reporting the measurement result of the UE, or beam-related configuration information (transmission configuration indication (TCI) state or quasi co-location (QCL)) such as a beam direction, a beam number, or a beam location, or a timing advance (TA) value (or an offset value) for synchronizing a downlink signal of a base station or an uplink signal of a base station, or whether to start or suspend of a timer (time alignment timer (TAT)) indicating validity of the TA value, or a timer value (a TAT value).

The above indicating method may define a mapping between each channel measurement signal information configured in the RRC as above and the first field by using a bitmap, an index, or an identifier, and performs indication based on the mapping. As another method, a method may configure or indicate the channel measurement signal information with the first field, so that the UE applies or uses the configured (or indicated) channel measurement signal information to perform channel measurement or channel measurement reporting.

When constituting a MAC subPDU such as 1j-10 to transmit the MAC control information provided in the third embodiment of the disclosure, the above-provided MAC control information is constituted as 1j-12 and MAC subheader 1j-10 corresponding thereto uses a header structure including an R field (reserved field) or a logical channel identify (LCID) field without including an L field (length field) as in 1j-20. This is because, even if the length of the MAC control information provided in the third embodiment of the disclosure is variable, the bitmap information indicates the presence or non-presence of the first field so that the length of the MAC control information may be calculated. Accordingly, overhead due to the L field can be reduced.

As another method, when constituting the MAC subPDU such as 1j-10 to transmit the MAC control information provided in the third embodiment of the disclosure, the above-provided MAC control information is constituted as 1j-12 and the MAC subheader 1j-10 corresponding thereto uses a header structure including an L field (length field) and including an R field (reserved field) or a logical channel identify (LCID) field as in 1j-21. Because the MAC control information provided in the third embodiment of the disclosure has a variable length, if there is no L field, it is necessary to calculate the length of the MAC control information by always identifying the presence or non-presence of the first field in the bitmap information. Therefore, if the L field is included in the MAC subheader, the UE may directly identify the length of the MAC control information based on the L field and read the MAC control information without having to calculate the length of the MAC control information.

The fields of the MAC control information provided in the third embodiment may be described as follows
C(i) field: As provided above of the present disclosure, if the cell (SCell) configuration information has been configured in the UE or the MAC layer device via an RRC message, and there is a certain cell (SCell) in which a cell identifier value (i) is configured as a cell identifier (SCell Index) in the cell configuration information, the C(i) field indicates the activation or deactivation state of the cell (SCell) corresponding to the cell identifier value (i). As another method, a cell identifier field may be defined to indicate a cell. Also, the C(i) field may indicate the presence or non-presence of the first field Otherwise (if there is, in the UE or the MAC layer device, no cell (SCell) in which the cell identifier value (i) is configured as the cell identifier (SCell Index) in the RRC message), the MAC layer device may ignore the C(i) field. In the above case, in case that the C(i) field value is configured to 1, the C(i) field indicates to activate the SCell corresponding to the cell identifier value (i), and indicates the presence of the first field. In the above, in case that the C(i) field value is configured to 0, the C(i) field indicates to activate the SCell corresponding to the cell identifier value (i), and indicates the non-presence of the first field. Also, if the first field has a specific value (e.g., a value in which all bits are 0 (000 . . . 0) or all bits are 1 (111 . . . 1) or a promised or defined value), when activating the cell indicated by the cell identifier, the cell may be activated without considering or applying the first channel measurement configuration information (that is, a cell may be activated in the same procedure as in activating a cell of the UE with the MAC control information of the first embodiment provided in the disclosure). In addition, if the first channel measurement configuration information is not configured as an RRC message for a certain cell, the first field may be configured as the specific value (e.g., a value in which all bits are 0 (000 . . . 0) or all bits are 1 (111 . . . 1) or a promised or defined value) (e.g., the value may be configured by the base station).

Alternatively, if the first channel measurement configuration information is not configured as the RRC message for a certain cell of the UE, the UE may ignore, or not read, or not consider the first field value for the cell:
R field; reserved bit, configured to 0.

When the cell identifier value is configured in the RRC message, the cell identifier (SCell index) has a length of 5 bits and indicates an integer value (0 to 31). In addition, the C (integer value) field value corresponding to the integer value may indicate the activation or deactivation of the cell.

The third embodiment provided above may be easily extended to the MAC control information having the bitmap information 1k-20 having a size of 4 bytes and the first fields 1k-21, such as 1k-20 and 1k-21. The MAC control information (or bitmap information) is distinguished by a 3-2 logical channel identity (LCID) (alternatively, the 1-2 logical channel identity (LCID) used in the first embodiment is identically used, but the reserved field (R field) value of the bitmap information 1k-20 is newly defined, so that it is possible to distinguish whether it is the first embodiment or the third embodiment), the MAC Control information has a variable size, and may be composed of first fields and bitmap information consisting of 32 bits (or 4 bytes) including 31 C fields and 1 reserved field (R field).

As another method, in the above provided third embodiment, in order to fix the size of the MAC control information, the first fields are always added as many as the number of C(i) fields of the bitmap information so that the MAC control information may be constituted with the bitmap information and the fixed number of first fields. If the MAC control information is constituted as described above, although the overhead increases, the processing speed of the UE may be increased because the size of the MAC control information is always fixed.

FIGS. 1LA and 1LB are illustrate MAC control information according to various embodiments of the present disclosure.

Hereinafter, the disclosure proposes and describes a fourth embodiment of MAC control information (SCell activation/deactivation MAC CEs) indicating the activation or deactivation of a SCell or configuring or indicating information related to the first channel measurement information.

In the fourth embodiment, bitmap information 1*l*-10 for activating or deactivating a SCell having a size of 1 byte as in the first embodiment may be included, or a new first field (TRS related field for the SCell C(i)) 1*l*-11 may be defined and included.

In the above, the MAC control information of the fourth embodiment uses the same 1-1 logical channel identity (LCID) used in the first embodiment, but a reserved field (R field) value of the bitmap information 1*l*-10 may be newly defined to distinguish whether it is the first embodiment or the fourth embodiment (e.g., according to the value 0 or 1, the first embodiment or the fourth embodiment is indicated), and the MAC control information may have a structure such as 1*l*-10. As another method, in the fourth embodiment, by defining a 4-1 logical channel identify (LCID), it is possible to distinguish whether it is the MAC control information of the fourth embodiment.

The MAC control information has a variable size and consists of 8 bits (or 1 byte) including 7 C(i) fields and 1 reserved field (R field). In the above, the C(i) field may indicate activation or deactivation with a value of 0 or 1 for the cell (SCell) corresponding to the value (i) of the cell identifier (SCell index), and may also indicate the presence or non-presence of the first field (TRS related field for the SCell C(i)) 1*l*-11 for the cell. For example, if the C(i) field value is 1 (or 0), the MAC control information may indicate to activate the cell (SCell) corresponding to the value (i) of the cell identifier (SCell index), and also, may indicate the presence of the first field (TRS related field for the SCell C(i)) 1*l*-11 for the cell. In the above, when the first field is present and the first field activates the cell indicated by the cell identifier, the first field may include or indicate the configuration information related to the first channel measurement configuration information configured in the RRC message or the first channel measurement configuration information. For example, the first field may include the first channel measurement configuration information or information indicating some information among the first channel measurement configuration information, or may indicate to apply (or use, or activate) certain information among the first channel measurement configuration information configured as an RRC message.

Also, if the first field has a specific value (e.g., a value with all bits 0 (000 . . . 0) or a value with all bits 1 (111 . . . 1) or a promised or defined value), when activating a cell indicated by the cell identifier, the cell may be activated without considering or applying the first channel measurement configuration information (that is, a cell may be activated in the same procedure as in activating a cell of the UE with the MAC control information of the first embodiment provided in the disclosure). In addition, if the first channel measurement configuration information is not configured as an RRC message for a certain cell, the first field may be configured as the specific value (e.g., a value in which all bits are 0 (000 . . . 0), or all bits are 1 (111 . . . 1), or a promised, or defined value). Alternatively, if the first channel measurement configuration information is not configured as the RRC message for a certain cell of the UE, the UE may ignore, or not read, or not consider the first field value for the cell.

The MAC control information having a variable length (variable sized MAC CE) of the fourth embodiment provided in the disclosure may have a variable size or a dynamic length. As provided above, according to the C(i) field value of the bitmap information 1*l*-10, the respective first fields 1*l*-11 for each cell may be added after the bitmap information. For example, for cells (SCells) in which the C(i) field value is configured to 1 (or 0) to indicate the presence of the first field, the first fields may be added in ascending (or descending) order of the cell identifier (SCell index) value or in ascending (or descending) order of i value, and may indicate the information related to the first channel measurement configuration information corresponding (or mapping) to each cell (SCell).

The first field may have a length smaller than 1 byte (e.g., 4 bits). In this case, the MAC control information is constituted to be byte aligned to simplify implementation and speed up processing. For example, as in 1*l*-11, in case that the length of the first field is 4 bits, the number of C(i) fields having a value of 1 (or 0) indicating cell activation in the bitmap information is an odd number (or an even number), the MAC control information may have a size in bytes by adding an N/A field like 1*l*-12 for byte alignment. That is, in case that an odd number (or an even number) of first fields are added, the size of the MAC control information is configured to have a size in bytes, so that processing can be easily performed. In the above, the N/A field may be composed of padding or may be composed of an arbitrary value, or may have a predefined value (for example, a value in which all bits are 0 (000 . . . 0) or all bits are 1 (111 . . . 1) or a promised or defined value). In case that the N/A field is included in the above, the UE may ignore, not read, or not consider the N/A field.

In FIG. 1L, 1*l*-30 illustrates an example of the MAC control information of the fourth embodiment of the disclosure. In the bitmap information of 1*l*-30, a C(2) field, a C(5) field, and a C(7) field are configured to 1 to indicate the activation of the cell having the value (2, or 5, or 7) of the cell identifier corresponding to the C field value. The respective first fields corresponding to the C(2) field, the C(5) field, and the C(7) field may be added after the bitmap information in ascending order of the cell identifier value or (i) value. In the above, since the number of the first fields is odd and the length of the first field is 4 bits, it is not the MAC control information having a size in bytes. Accordingly, by adding the N/A field 1*l*-32 having 4 bits, the MAC control information may have a size in bytes. Upon receiving the MAC control information, the UE may quickly activate the cell by applying the first channel measurement configuration information indicated by the first field when activating the cell for which activation is indicated, and the UE may ignore the N/A field.

In the above, the number of first fields is the same as the number of C(i) fields in which the field value is configured to 1 (or 0) in the bitmap information. Also, the number of the first fields may be 0. That is, in the MAC control information of the fourth embodiment, the bitmap field is always present, but the first field may not be present.

The MAC control information of the fourth embodiment provided in the disclosure may be easily extended to the MAC control information having 4-byte bitmap information as illustrated in 1*l*-20 and 1*l*-21 of FIG. 1L.

In the fourth embodiment, when defining the first field (TRS related field for the SCell C(i)) and activating the cell indicated by the cell identifier, the first field may include or indicate configuration information related to the first channel measurement configuration information configured in the RRC message or the first channel measurement configuration information. For example, the first field may include the first channel measurement configuration information or information indicating some information among the first channel measurement configuration information, or may indicate to apply (or use, or activate) certain information among the first channel measurement configuration information configured as an RRC message.

For example, the first field may indicate, in the first channel measurement configuration information configured in an RRC message, a cycle of a frequent channel measurement signal (e.g., radio resources, a temporary reference signal (TRS), a synchronization signal block (SSB), a channel state information reference signal (CSI-RS), or a reference signal (RS)), or transmission resource information for transmission (frequency or time transmission resource via which the frequent channel measurement signal is transmitted), an interval or number (the number of times the frequent channel measurement signal is transmitted), a timer value (time at which the frequent channel measurement signal is transmitted), or a time interval (interval in which the frequent channel measurement signal is transmitted (e.g., an offset of time unit (slot, subframe, symbol, or the like)), or a transmission resource, a cycle, an interval, a timing, or an offset for reporting the measurement result of the UE, or beam-related configuration information (transmission configuration indication (TCI) state or quasi co-location (QCL)) such as a beam direction, a beam number, or a beam location, or a timing advance (TA) value (or an offset value) for synchronizing a downlink signal of a base station or an uplink signal of a base station, or whether to start or suspend of a timer (time alignment timer (TAT)) indicating validity of the TA value, or a timer value (a TAT value).

The above indicating method may define a mapping between each channel measurement signal information configured in the RRC as above and the first field by using a bitmap, an index, or an identifier, and performs indication based on the mapping. As another method, a method may configure or indicate the channel measurement signal information with the first field, so that the UE applies or uses the configured (or indicated) channel measurement signal information to perform channel measurement or channel measurement reporting.

When constituting a MAC subPDU such as 1*j*-10 to transmit the MAC control information provided in the fourth embodiment of the disclosure, the above-provided MAC control information is constituted as 1*j*-12 and MAC subheader 1*j*-10 corresponding thereto uses a header structure including an R field (reserved field) or a logical channel identify (LCID) field without including an L field (length field) as in 1*j*-20. This is because, even if the length of the MAC control information provided in the fourth embodiment of the disclosure is variable, the bitmap information indicates the presence or non-presence of the first field so that the length of the MAC control information may be calculated. Accordingly, overhead due to the L field can be reduced.

As another method, when constituting the MAC subPDU such as 1*j*-10 to transmit the MAC control information provided in the fourth embodiment of the disclosure, the above-provided MAC control information is constituted as 1*j*-12 and the MAC subheader 1*j*-10 corresponding thereto uses a header structure including an L field (length field) and including an R field (reserved field) or a logical channel identify (LCID) field as in 1*j*-21. Because the MAC control information provided in the fourth embodiment of the disclosure has a variable length, if there is no L field, it is necessary to calculate the length of the MAC control information by always identifying the presence or non-presence of the first field in the bitmap information. Therefore, if the L field is included in the MAC subheader, the UE may directly identify the length of the MAC control information based on the L field and read the MAC control information without having to calculate the length of the MAC control information. The fields of the MAC control information provided in the fourth embodiment may be described as follows.

C(i) field: As provided above of the present disclosure, if the cell (SCell) configuration information has been configured in the UE or the MAC layer device via an RRC message, and there is a certain cell (SCell) in which a cell identifier value (i) is configured as a cell identifier (SCell Index) in the cell configuration information, the C(i) field indicates the activation or deactivation state of the cell (SCell) corresponding to the cell identifier value (i). As another method, a cell identifier field may be defined to indicate a cell. Also, the C(i) field may indicate the presence or non-presence of the first field. Otherwise (if there is, in the UE or the MAC layer device, no cell (SCell) in which the cell identifier value (i) is configured as the cell identifier (SCell Index) in the RRC message), the MAC layer device may ignore the C(i) field.

In the above case, in case that the C(i) field value is configured to 1, the C(i) field indicates to activate the SCell corresponding to the cell identifier value (i), and indicates the presence of the first field. In the above, in case that the C(i) field value is configured to 0, the C(i) field indicates to activate the SCell corresponding to the cell identifier value (i), and indicates the non-presence of the first field. Also, if the first field has a specific value (e.g., a value in which all bits are 0 (000 . . . 0) or all bits are 1 (111 . . . 1) or a promised or defined value), when activating the cell indicated by the cell identifier, the cell may be activated without considering or applying the first channel measurement configuration information (that is, a cell may be activated in the same procedure as in activating a cell of the UE with the MAC control information of the first embodiment provided in the disclosure).

In addition, if the first channel measurement configuration information is not configured as an RRC message for a certain cell, the first field may be configured as the specific value (e.g., a value in which all bits are 0 (000 . . . 0) or all bits are 1 (111 . . . 1) or a promised or defined value) (e.g., the value may be configured by the base station). Alternatively, if the first channel measurement configuration information is not configured as the RRC message for a certain cell of the UE, the UE may ignore, or not read, or not consider the first field value for the cell:

R field: reserved bit, configured to 0; and

N/A field. If the number of C(i) fields having a value of 1 (or 0) indicating cell activation in the bitmap information is an odd number (or an even number), the MAC control information may have a size in bytes by adding an N/A field like 1*l*-12 for byte alignment. That is, in case that an odd number (or an even number) of first fields are added, the size of the MAC control information is configured to have a size in bytes, so that processing can be easily performed. In the above, the N/A field may be composed of padding or may be composed of an arbitrary value, or may have a predefined value (for example, a value in which all bits are 0 (000 . . . 0) or all bits are 1 (111 . . . 1) or a promised or defined value). In case that the N/A field is included in the above, the UE may ignore, not read, or not consider the N/A field.

When the cell identifier value is configured in the RRC message, the cell identifier (SCell index) has a length of 5 bits and indicates an integer value (0 to 31). In addition, the C (integer value) field value corresponding to the integer value may indicate the activation or deactivation of the cell.

The fourth embodiment provided above may be easily extended to the MAC control information having the bitmap information 1*l*-20 having a size of 4 bytes and the first fields 1*l*-21, such as 1*l*-20 and 1*l*-21. The MAC control information (or bitmap information) is distinguished by a 4-2 logical channel identity (LCID) (alternatively, the 1-2 logical channel identity (LCID) used in the first embodiment is identically used, but the reserved field (R field) value of the bitmap information 1*l*-20 is newly defined, so that it is possible to distinguish whether it is the first embodiment or the fourth embodiment), the MAC Control information has a variable size, and may be composed of first fields and bitmap information consisting of 32 bits (or 4 bytes) including 31 C fields and 1 reserved field (R field).

As another method, in the above provided fourth embodiment, in order to fix the size of the MAC control information, the first fields are always added as many as the number of C(i) fields of the bitmap information so that the MAC control information may be constituted with the bitmap information and the fixed number of first fields. If the MAC control information is constituted as described above, although the overhead increases, the processing speed of the UE may be increased because the size of the MAC control information is always fixed.

When activating a cell, the MAC control information or the first channel measurement configuration information of the RRC message provided in the first embodiment or second embodiment or third embodiment or fourth embodiment of the disclosure may be extended and applied or modified to quickly activate a cell, for example, SCell or PSCell (e.g., when activating secondary cell group (SCG) in dual connectivity) or PCell (e.g., when activating a target cell quickly in a handover procedure, or the UE performs a connection resumption procedure in INACTIVE mode).

Hereinafter, the disclosure proposes a fifth embodiment of the MAC control information processing procedure or cell activation procedure of the UE when receiving the MAC control information or RRC message provided in the first embodiment, or second embodiment, or third embodiment, or fourth embodiment of the disclosure.

1> If a MAC layer device has received the MAC control information or RRC message provided in the first embodiment, second embodiment, third embodiment, or fourth embodiment provided in the disclosure, 2> information about or included in the MAC control information (e.g., first channel measurement configuration information) may be indicated or delivered to a lower layer device (e.g., a PHY layer device). Alternatively, information related to or included in the MAC control information (e.g., first channel measurement configuration information) may be applied, and a corresponding cell or cells may be activated. Hereinafter, the disclosure proposes a sixth embodiment of MAC control processing procedure or cell activation procedure of the UE when receiving the MAC control information or RRC message provided in the first embodiment, second embodiment, third embodiment, or fourth embodiment of the disclosure. In the sixth embodiment, when processing the MAC control information, the first channel measurement configuration information is applied only the case where the first active bandwidth part identifier configured as the RRC message of the activated cell is not configured to a dormant bandwidth part, or only for the cell in a deactivated state before receiving the MAC control information.

For each configured cell (SCell or PSCell or PCell) in the above, the MAC layer device operates as follows. Hereinafter, an embodiment of the SCell is provided, but the operation may be extended and applied to a PSCell (e.g., when activating a secondary cell group (SCG) or a cell group) or a PCell (e.g., when activating a target cell in a handover procedure or a UE performs connection resumption procedure in INACTIVE mode).

1> If a SCell state (SCellState) is configured to an active state when a certain SCell is configured, or if the SCell activation or deactivation MAC control information indicating the activation of the SCell is received, 1> alternatively, if the MAC control information provided in the first embodiment, second embodiment, third embodiment, or fourth embodiment of the disclosure indicating activation of the SCell is received, 2> if the SCell has been deactivated before receiving the SCell activation or deactivation MAC control information, 2> alternatively, if the SCell has been deactivated before receiving the MAC control information provided in the first embodiment, second embodiment, third embodiment, or fourth embodiment of the disclosure, and 2> alternatively, if the Scell state (ScellState) is configured to an active state when the Scell is configured, 3> if the first active downlink (DL) bandwidth part (BWP) identifier (firstActiveDownlinkBWP-Id) is not configured as a dormant bandwidth part, 4> the Scell may be activated according to a predetermined (or promised) timing. That is, a general Scell operation may be applied or performed as follows, 5> The SCell may transmit a sounding reference signal (SRS), and 5> If the first channel measurement configuration information is configured or indicated as the RRC message, or if in the above received MAC control information provided by the first embodiment, second embodiment, third embodiment, or fourth embodiment, the first channel measurement configuration information is indicated or configured, 6> for quick activation of the SCell, a channel measurement procedure is performed by applying (or based on) the above indicated first channel measurement configuration information, or a channel measurement result may be reported by applying (or based on) the first channel measurement configuration information, 5> If the first channel measurement configuration information is not configured or not indicated as the RRC message, or if in the received MAC control information provided by the first embodiment, second embodiment, third embodiment, or fourth embodiment, the first channel measurement configuration information is not indicated or not configured, 6> channel state information (CSI) may be reported for the SCell. Alternatively, a channel measurement procedure is performed by applying (or based on) the above second channel measurement configuration information configured as the RRC message to activate the SCell, or a channel measurement result may be reported by applying (or based on) the second channel measurement configuration information 5> PDCCH monitoring may be performed in the Scell, 5> PDCCH monitoring for the SCell may be performed. (e.g., PDCCH monitoring for the SCell may be performed in the PCell or another SCell by cross scheduling), and 5> The SCell may perform PUCCH transmission, 3> Otherwise, if the first active DL BWP identifier (firstActiveDownlinkBWP-Id) is configured as a dormant BWP, 4> If the BWP inactivity timer (bwp-InactivityTimer) of the SCell or Serving Cell is running, this running may be stopped, 3> The DL BWP and UL BWP of the SCell may be activated as the DL BWP and UL BWP indicated by a first active DL BWP identifier and a first active UL BWP identifier, respectively, 2> A cell deactivation timer (SCellDeactivationTimer) configured in the SCell or related to the SCell may be started or restarted according to a predetermined or promised timing, and 2> If the activated DL BWP (or the currently activated DL BWP) or the activated DL BWP of the activated SCell (or the currently activated DL BWP) is not a dormant BWP, 3> According to the stored configuration information, if a type 1 periodic UL transmission resource (configured uplink grant Type 1 configured as RRC) configured in the cell (SCell) or BWP of the cell is suspended or if there is a suspended type 1 periodic UL transmission resource, the type 1 periodic UL transmission resource may be reset or re-reset. In addition, it is possible to start or start using the type 1 UL transmission resource according to a predetermined or promised timing 3> A power head room (PHR) reporting procedure may be triggered for the SCell or BWP of the Scell, 1> Otherwise, if the SCell activation or deactivation MAC control information indicating the deactivation for the SCell is received, 1> alternatively, if the cell deactivation timer for the activated SCell has expired, 2> The SCell may be deactivated according to a predetermined or promised timing, 2> The cell deactivation timer for the SCell may be suspended, 2> The BWP deactivation timer for the SCell or serving cell may be suspended, 2> A certain activated BWP for the SCell may be deactivated, 2> It is possible to clear the configured periodic DL transmission resource (DL SPS or configured downlink assignment) or configured periodic UL transmission resource (UL SPS or configured uplink grant Type 2) for the BWP of the cell. In the above, the releasing (or clearing) means that the UE stores configuration information such as period information configured in the RRC message, but information on the periodic transmission resource indicated or activated by L1 signaling (e.g., DCI) is removed and is no longer used. The above provided method, that is, the operation of clearing the configured periodic DL transmission resource (DL SPS or configured downlink assignment) or the configured periodic UL transmission resource (UL SPS or configured uplink grant) may be performed only the case where the BWP is transited from an active state to a dormant state. This is because, in case that the BWP is transited from an inactive state to the dormant state, there is no information on the periodic transmission resource information indicated or activated by L1 signaling. As another method, the periodic transmission resources may be cleared only the case where the periodic DL transmission resource or the periodic UL transmission resource is configured or configured and used, 2> A PUSCH transmission resource configured for periodic channel measurement reporting (semi-persistent CSI reporting) for the SCell may be cleared, and 2> It is possible to suspend the use of the periodic UL transmission resource (configured uplink grant Type 1 configured as RRC) configured in the BWP of the cell. In the above, the suspending means that the UE stores the transmission resource configuration information configured in the RRC message, but does not use the configured transmission resource configuration information anymore. The above provided method, that is, the operation of suspending the configured periodic UL transmission resource (configured uplink grant Type 1) may be performed only the case where the BWP is transited from the active state to the dormant state. This is because, in case that the BWP is transited from the inactive state to the dormant state, the periodic transmission resource is not used. As another method, the periodic transmission resources may be cleared only the case where the periodic DL transmission resource or the periodic UL transmission resource is configured or configured and used.

2> All HARQ buffers related to the SCell may be flushed.

In the above, if the cell (SCell) has been activated and if the first channel measurement configuration information has expired in a predefined timing or a timing configured as RRC or a time resource, or if a channel measurement procedure based on the first channel measurement configuration information (or the channel measurement reporting procedure) has expired (or if the channel measurement procedure has been deactivated or performed until a configured period), or if the timer (or time) for the procedure has expired (or if the time has passed or has been used up), or if the channel measurement procedure based on the first measurement configuration information (or channel measurement reporting procedure) has been completed.

The UE may suspend (or deactivate or not apply) a channel measurement procedure or a channel measurement reporting procedure performed based on the first channel measurement configuration information. Alternatively, the channel measurement procedure or the channel measurement reporting procedure may be performed without applying (or inactivating) the first channel measurement configuration information. Alternatively, the first channel measurement configuration information may no longer be applied. Alternatively, the second channel measurement configuration information configured in the RRC message may be applied (or activated) and a channel measurement procedure or a channel measurement reporting procedure may be performed. For example, the second channel measurement configuration information may be applied by falling back without applying the first channel measurement configuration information anymore.

Hereinafter, the disclosure proposes a seventh embodiment of the MAC control information processing procedure or cell activation procedure of the UE when receiving the MAC control information or RRC message provided in the first embodiment, second embodiment, or third embodiment, or fourth embodiment of the disclosure. In the seventh embodiment, regardless of whether the first active BWP identifier configured as an RRC message of the cell, which is activated in processing the MAC control information, is configured as a dormant BWP, the first channel measurement configuration information is applied only for the cell, which has been in an inactivated state before receiving the MAC control information.

In the above, for each configured cell (SCell or PSCell or PCell), the MAC layer device operates as follows. Hereinafter, an embodiment of the SCell is provided, but the operation may be extended and applied for a PSCell (e.g., when activating a secondary cell group (SCG) or a cell group) or a PCell (e.g., when activating a target cell in a handover procedure or a UE performs a connection resumption procedure in INACTIVE mode).

1> If a SCell state (SCellState) is configured to an active state when a certain SCell is configured, or if the SCell activation or deactivation MAC control information indicating the activation of SCell is received,
1> alternatively, if the MAC control information indicating the activation of SCell, provided in the first embodiment, second embodiment, third embodiment, or fourth embodiment of the disclosure is received,
  2> If the SCell has been deactivated before receiving the SCell activation or deactivation MAC control information,
  2> alternatively, if the SCell has been deactivated before receiving the MAC control information provided in the first embodiment, second embodiment, third embodiment, or fourth embodiment of the disclosure, and
  2> alternatively, if the Scell state (ScellState) is configured to an active state when the Scell is configured,
    3> if the first active DL BWP identifier (firstActiveDownlinkBWP-Id) is not configured as a dormant BWP,
      4> The Scell may be activated according to a predetermined (or promised) timing. That is, the general Scell operation may be applied or performed as follows,
        5> The SCell may transmit a sounding reference signal (SRS),
        5> PDCCH monitoring may be performed in the Scell,
        5> PDCCH monitoring for the SCell may be performed. (e.g., PDCCH monitoring for the SCell may be performed in the PCell or another SCell by cross scheduling), and
        5> PUCCH transmission may be performed in the Scell,
    3> Otherwise, if the first active DL BWP identifier (firstActiveDownlinkBWP-Id) is configured as a dormant partial BWP,
      4> if the BWP inactivity timer (bwp-InactivityTimer) of the SCell or serving cell is running, this running may be suspended,
    3> The DL BWP and UL BWP of the SCell may be activated as the DL BWP and UL BWP indicated by the first active DL BWP identifier and the first active UL BWP identifier, respectively, and
    3> If the first channel measurement configuration information is configured or indicated as an RRC message, or the first channel measurement configuration information is indicated or configured in the received MAC control information provided in the first embodiment, second embodiment, third embodiment, or fourth embodiment provided,
      4> A channel measurement procedure is performed by applying (or based on) the above indicated first channel measurement configuration information to quickly activate the SCell, or a channel measurement result may be reported by applying (or based on) the first channel measurement configuration information,
    3> If the first channel measurement configuration information is not configured or not indicated as an RRC message, or the first channel measurement configuration information is not indicated or configured in the received MAC control information provided in the first embodiment, second embodiment, third embodiment, or fourth embodiment,
      4> Channel state information (CSI) may be reported for the SCell. Alternatively, a channel measurement procedure is performed by applying (or based on) the second channel measurement configuration information configured as the RRC message to quickly activate the SCell, or a channel measurement result may be reported by applying (or based on) the second channel measurement configuration information,
  2> A cell deactivation timer (SCellDeactivationTimer) configured in the SCell or related to the SCell may be started or restarted according to a predetermined or promised timing, And 2> If the activated DL BWP (or the currently activated DL BWP) or the activated DL BWP of the activated Scell (or the currently activated DL BWP) is not a dormant BWP,
3> According to the stored configuration information, if a type 1 periodic UL transmission resource (configured uplink grant Type 1 configured as RRC) configured in the cell (Scell) or BWP of the cell is suspended or if there is a suspended type 1 periodic UL transmission resource, the type 1 periodic UL transmission resource may be reset or re-reset. In addition, it is possible to start or start using the type 1 UL transmission resource according to a predetermined or promised timing, and
3> A power head room (PHR) reporting procedure may be triggered for the SCell or BWP of the Scell,
1> Otherwise, if the SCell activation or deactivation MAC control information indicating the deactivation for the SCell is received, and
1> alternatively, if the cell deactivation tinier for the activated SCell has expired,
2> The SCell may be deactivated according to a predetermined or promised timing,
2> The cell deactivation timer for the SCell may be suspended,
2> The BWP deactivation timer for the SCell or serving cell may be suspended,
2> A certain activated BWP for the SCell may be deactivated,
2> It is possible to clear the configured periodic DL transmission resource (DL SPS or configured downlink assignment) or configured periodic UL transmission resource (UL SPS or configured uplink grant Type 2) for the BWP of the cell. In the above, the releasing (or clearing) means that the UE stores configuration information such as period information configured in the RRC message, but information on the periodic transmission resource indicated or activated by L1 signaling (e.g., DCI) is removed and is no longer used. The above provided method, that is, the operation of clearing the configured periodic DL transmission resource (DL SPS or configured downlink assignment) or the configured periodic UL transmission resource (UL SPS or configured uplink grant) may be performed only the case where the BWP is transited from an active state to a dormant state. This is because, in case that the BWP is transited from an inactive state to the dormant state, there is no information on the periodic transmission resource information indicated or activated by L1 signaling. As another method, the periodic transmission resources may be cleared only the case where the periodic DL transmission resource or the periodic UL transmission resource is configured or configured and used,
2> A PUSCH transmission resource configured for periodic channel measurement reporting (semi-persistent CSI reporting) for the SCell may be cleared,
2> It is possible to suspend the use of the periodic LL transmission resource (configured uplink grant Type 1 configured as RRC) configured in the BWP of the cell. In the above, the suspending means that the UE stores the transmission resource configuration information configured in the RRC message, but does not use the configured transmission resource configuration information anymore. The above provided method, that is, the operation of suspending the configured periodic UL transmission resource (configured uplink grant Type 1) may be performed only the case where the BWP is transited from the active state to the dormant state. This is because, in case that the BWP is transited from the inactive state to the dormant state, the periodic transmission resource is not used. As another method, the periodic transmission resources may be cleared only the case where the periodic DL transmission resource or the periodic UL transmission resource is configured or configured and used, and
2> All HARQ buffers related to the SCell may be flushed.
If the BWP is activated and the activated DL BWP is a dormant BWP,
If the first channel measurement configuration information is configured or indicated in the above, a channel measurement procedure is performed in consideration of the first channel measurement configuration information, or a channel measurement result may be reported in consideration of the first channel measurement configuration information. Alternatively, if the first channel measurement configuration information is not configured or is not indicated, the channel measurement procedure may not be performed in the BWP.
In the above, if the cell (SCell) has been activated and if the first channel measurement configuration information has expired in a predefined timing or a timing configured as RRC or a time resource, or if a channel measurement procedure based on the first channel measurement configuration information (or the channel measurement reporting procedure) has expired (or if the channel measurement procedure has been deactivated or performed until a configured period), or if the timer (or time) for the procedure has expired (or if the time has passed or has been used up), or if the channel measurement procedure based on the first measurement configuration information (or channel measurement reporting procedure) has been completed,
The UE may suspend (or deactivate or not apply) a channel measurement procedure or a channel measurement reporting procedure performed based on the first channel measurement configuration information. Alternatively, the channel measurement procedure or the channel measurement reporting procedure may be performed without applying (or inactivating) the first channel measurement configuration information. Alternatively, the first channel measurement configuration information may no longer be applied. Alternatively, the second channel measurement configuration information configured in the RRC message may be applied (or activated) and a channel measurement procedure or a channel measurement reporting procedure may be performed. For example, the second channel measurement configuration information may be applied by falling back without applying the first channel measurement configuration information anymore.
Hereinafter, the disclosure proposes an eighth embodiment of the MAC control information processing procedure or cell activation procedure of the UE when receiving the MAC control information or RRC message provided in the first embodiment, second embodiment, or third embodiment, or fourth embodiment of the disclosure. In the eighth embodiment, regardless of whether the first active BWP identifier configured as an RRC message of the cell, which is activated in processing the MAC control information, is configured as a dormant BWP, or is deactivated before receiving the MAC control information, the first channel measurement configuration information is applied.

In the above, for each configured cell (SCell or PSCell or PCell), the MAC layer device operates as follows. Hereinafter, an embodiment of the SCell is provided, but the operation may be extended and applied for a PSCell (e.g., when activating a secondary cell group (SCG) or a cell group) or a PCell (e.g., when activating a target cell in a handover procedure or a UE performs a connection resumption procedure in INACTIVE mode).

1> If a SCell state (SCellState) is configured to an active state when a certain SCell is configured, or if the SCell activation or deactivation MAC control information indicating the activation of SCell is received,
   1> alternatively, if the MAC control information indicating the activation of SCell, provided in the first embodiment, second embodiment, third embodiment, or fourth embodiment of the disclosure is received.
      2> if the first channel measurement configuration information is configured or indicated as an RRC message, or if, in the above received MAC control information provided in the first embodiment, second embodiment, third embodiment, or fourth embodiment, the first channel measurement configuration information is configured or indicated,
         3> A channel measurement procedure is performed by applying (or based on) the above indicated first channel measurement configuration information to quickly activate the SCell, or a channel measurement result may be reported by applying (or based on) the first channel measurement configuration information,
      2> If the first channel measurement configuration information is not configured or not indicated as an RRC message, or the first channel measurement configuration information is not indicated or configured in the received MAC control information provided in the first embodiment, second embodiment, third embodiment, or fourth embodiment,
         3> Channel state information (CSI) may be reported for the SCell. Alternatively, a channel measurement procedure is performed by applying (or based on) the second channel measurement configuration information configured as the RRC message to quickly activate the SCell, or a channel measurement result may be reported by applying (or based on) the second channel measurement configuration information,
   2> If the SCell has been deactivated before receiving the SCell activation or deactivation MAC control information, and
   2> alternatively, if the SCell state (SCellState) is configured to an active state when the SCell is configured,
      3> if the first active DL BWP identifier (firstActiveDownlinkBWP-Id) is not configured as a dormant BWP,
         4> The SCell may be activated according to a predetermined (or promised) timing. That is, the general SCell operation may be applied or performed as follows,
            5> The SCell may transmit a sounding reference signal (SRS),
            5> PDCCH monitoring may be performed in the Scell,
            5> PDCCH monitoring for the SCell may be performed (e.g., PDCCH monitoring for the SCell may be performed in the PCell or another SCell by cross scheduling), and
            5> PUCCH transmission may be performed in the Scell,
      3> Otherwise, if the first active DL BWP identifier (frrstActiveDownlinkBWP-Id) is configured as a dormant partial BWP,
         4> if the BWP inactivity timer (bwp-InactivityTimer) of the SCell or serving cell is running, this running may be suspended,
      3> The DL BWP and UL BWP of the SCell may be activated as the DL BWP and UL BWP indicated by the first activate DL BWP identifier and the first activate UL BWP identifier, respectively,
   2> A cell deactivation timer (SCellDeactivationTimer) configured in the SCell or related to the SCell may be started or restarted according to a predetermined or promised timing, and
   2> If the activated DL BWP (or the currently activated DL BWP) or the activated DL BWP of the activated SCell (or the currently activated DL BWP) is not a dormant BWP,
      3> According to the stored configuration information, if a type 1 periodic UL transmission resource (configured uplink grant Type 1 configured as RRC) configured in the cell (SCell) or BWP of the cell is suspended or if there is a suspended type 1 periodic UL transmission resource, the type 1 periodic UL transmission resource may be reset or re-reset. In addition, it is possible to start or start using the type 1 UL transmission resource according to a predetermined or promised timing, and
      3> A power head room (PHR) reporting procedure may be triggered for the SCell or BWP of the Scell,
1> Otherwise, if the SCell activation or deactivation MAC control information indicating the deactivation for the SCell is received, and
1> alternatively, if the cell deactivation tinier for the activated Scell has expired,
   2> The Scell may be deactivated according to a predetermined or promised timing,
   2> The cell deactivation timer for the SCell may be suspended,
   2> The BWP deactivation tinier for the SCell or serving cell may be suspended,
   2> A certain activated BWP for the SCell may be deactivated,
   2> It is possible to clear the configured periodic DL transmission resource (DL SPS or configured downlink assignment) or configured periodic UL transmission resource (UL SPS or configured uplink grant Type 2) for the BWP of the cell. In the above, the releasing (or clearing) means that the UE stores configuration information such as period information configured in the RRC message, but information on the periodic transmission resource indicated or activated by L1 signaling (e.g., DCI) is removed and is no longer used. The above provided method, that is, the operation of clearing the configured periodic DL transmission resource (DL SPS or configured downlink assignment) or the configured periodic UL transmission resource (UL SPS or configured uplink grant) may be performed only the case where the BWP is transited from an active state to a dormant state. This is because, in case that the BWP is transited from an inactive state to the dormant state, there is no information on the periodic transmission resource information indicated or activated by L1 signaling. As another method, the periodic transmission resources may be cleared only the case where the periodic DL transmission resource or the periodic UL transmission resource is configured or configured and used, 2> A PUSCH transmission resource configured for periodic channel measurement reporting (semi-persistent CSI reporting) for the SCell may be cleared, 2> It is possible to suspend the use of the periodic UL transmission resource (configured uplink grant Type 1 configured as RRC) configured in the BWP of the cell. In the above, the suspending means that the UE stores the transmission resource configuration information configured in the RRC message, but does not use the configured transmission resource configuration information anymore. The above provided method, that is, the operation of suspending the configured periodic UL transmission resource (configured uplink grant Type 1) may be performed only the case where the BWP is transited from the active state to the dormant state. This is because, in case that the BWP is transited from the inactive state to the dormant state, the periodic transmission resource is not used. As another method, the periodic transmission resources may be cleared only the case where the periodic DL transmission resource or the periodic UL transmission resource is configured or configured and used, and 2> All HARQ buffers related to the SCell may be flushed.

If the BWP is activated and the activated DL BWP is a dormant BWP,

If the first channel measurement configuration information is configured or indicated in the above, a channel measurement procedure is performed in consideration of the first channel measurement configuration information, or a channel measurement result may be reported in consideration of the first channel measurement configuration information. Alternatively, if the first channel measurement configuration information is not configured or is not indicated, the channel measurement procedure may not be performed in the BWP.

In the above, if the cell (SCell) has been activated and if the first channel measurement configuration information has expired in a predefined timing or a timing configured as RRC or a time resource, or if a channel measurement procedure based on the first channel measurement configuration information (or the channel measurement reporting procedure) has expired (or if the channel measurement procedure has been deactivated or performed until a configured period), or if the timer (or time) for the procedure has expired (or if the time has passed or has been used up), or if the channel measurement procedure based on the first measurement configuration information (or channel measurement reporting procedure) has been completed, The UE may suspend (or deactivate or not apply) a channel measurement procedure or a channel measurement reporting procedure performed based on the first channel measurement configuration information. Alternatively, the channel measurement procedure or the channel measurement reporting procedure may be performed without applying (or inactivating) the first channel measurement configuration information. Alternatively, the first channel measurement configuration information may no longer be applied. Alternatively, the second channel measurement configuration information configured in the RRC message may be applied (or activated) and a channel measurement procedure or a channel measurement reporting procedure may be performed. For example, the second channel measurement configuration information may be applied by falling back without applying the first channel measurement configuration information anymore.

In the embodiments of the disclosure, when the UE performs a channel measurement procedure based on the first channel measurement configuration information, the first channel measurement configuration information may be configured as an RRC message or MAC control information. The indication to apply (or activate or use) the first channel measurement configuration information may be indicated in the RRC message or the MAC control information. When reporting a channel measurement result based on the first channel measurement configuration information, the reporting procedure may be performed with the transmission resource of the PUCCH of the cell (PCell or PUCCH SCell) configured as the RRC message.

Although the embodiments provided in the disclosure are applied to a SCell, the embodiments may be extended and applied to a PSCell (e.g., when activating a secondary cell group (SCG) or a cell group) or a PCell (e.g., when activating a target cell in a handover procedure or a UE performs a connection resumption procedure in INACTIVE mode). In the case of activating the cell group (SCG), the first channel measurement configuration information is configured or activated as an RRCReconfiguration message, and the UE may perform a channel measurement procedure or a channel measurement reporting procedure in the PSCell or the SCG (first active DL or UL BWP of PSCell, or BWP or initial BWP configured as the RRC message).

In addition, in case that the UE activates a target cell (Pcell) in a handover procedure, the first channel measurement configuration information is configured or activated with an RRCReconfiguration message, and thus, the UE may perform a channel measurement procedure or a channel measurement reporting procedure in the PCell (the first active DL or UL of the PCell or BWP or initial BWP configured as the RRC message), thereby facilitating quick activation. In addition, in case that the UE performs the RRC connection resumption procedure in the INACTIVE mode when the UE activates the target cell (Pcell or Scell), the first channel measurement configuration information is configured or activated in the RRCRelease message included in the indicator or information to transit to an RRC INACTIVE mode, or in an RRCResume message of the RRC connection resumption procedure, so the UE performs a channel measurement procedure or a channel measurement reporting procedure in the PCell or Scell (the first active DL or UL BWP of the cell or BWP or initial BWP configured as the RRC message), thereby facilitating quick activation.

FIG. 1M illustrates an eighth embodiment in which the embodiments provided in the disclosure are extended and applied to a terminal in an RRC inactive mode.

In the disclosure, a cell group or cell may indicate a PCell of a master cell group (MCG) or an Scell of MCG or a PSCell of a secondary cell group (SCG) or Scell of SCG.

The eighth embodiment proposes that a UE continuously stores Scell configuration information (e.g., configuration information described or provided in FIG. 1F) or configuration information of a PSCell (or Scell) of a cell group (or secondary group), which is configured or stored, as illustrated in FIG. 1F, in an RRC connected mode for the above provided embodiments, without clearing or discarding the same even if the UE transits to an RRC inactive mode. The eighth embodiment also proposes that, when the UE in the RRC inactive mode performs RRC connection resumption, the UE determines whether to discard or clear, maintain and apply, or reconfigure the stored Scell configuration information (e.g., configuration information described or provided in FIG. 1F) or configuration information of the PSCell (or Scell) of the cell group (e.g., secondary cell group), via a reconfiguration procedure or an indicator of an RRCResume message or an RRCReconfiguration message, which is transmitted by a base station.

In addition, when the base station transmits, to the UE, an RRCRelease message including an indicator or configuration for transiting the UE to the RRC inactive mode, the base station may transmit, to the UE, the message including configuration information or an indicator indicating whether to discard or clear, maintain and apply, or reconfigure the SCell configuration information (e.g., configuration information described or provided in FIG. 1F) or the configuration information of the PSCell (or SCell) of the cell group (e.g., secondary cell group), which is stored in the RRCRelease message. In addition, when the UE moves and performs RAN notification area (RNA) update in the RRC inactive mode, the UE may receive and apply the configuration information or the indicator indicating whether to discard or clear, maintain and apply, or reconfigure the SCell configuration information (e.g., configuration information described or provided in FIG. 1F) or the configuration information of the PSCell (or SCell) of the cell group (e.g., secondary cell group), which is stored in the RRCRelease message transmitted to the UE by the base station.

In the eighth embodiment provided in the disclosure, the base station may allow a first active bandwidth part of downlink or uplink bandwidth part configuration information of each cell to be configured as a dormant bandwidth part, in the SCell configuration information (e.g., configuration information described or provided in FIG. 1F) or configuration information of the PSCell (or SCell) of the cell group (e.g., secondary cell group) of the RRC message, and when the UE activates each SCell, each cell group, or a PSCell of each cell group, the base station may directly enable operation, as a dormant bandwidth part, of a downlink bandwidth part or uplink bandwidth part of each SCell, each cell group, or the PSCell of each cell group, or may enable suspension or resumption of the cell group, thereby reducing battery consumption of the UE.

As another method, in the eighth embodiment provided in the disclosure, the base station may not configure, as a dormant bandwidth part, a first active bandwidth part of downlink or uplink bandwidth part configuration information of each cell, in the SCell configuration information (e.g., configuration information described or provided in FIG. 1F) or configuration information of the PSCell (or SCell) of the cell group (e.g., secondary cell group) of the RRC message, and when the UE activates or resumes each SCell, each cell group, or a PSCell of each cell group, the base station may always cause activation of a downlink bandwidth part or uplink bandwidth part of each SCell, each cell group, or the PSCell of each cell group to a first active bandwidth part, and may enable switching or activation to a dormant bandwidth part according to the embodiments provided in the disclosure, or may enable suspension or resumption of the cell group, thereby reducing battery consumption of the UTE In addition, the eighth embodiment provided above may be extended to each SCell configuration information or PSCell configuration information of a master cell group (MCG) or a secondary cell group (SCG) of the UE, for which dual connectivity has been configured, so as to be applied. That is, the SCell configuration information or PSCell configuration information of the SCG may also be stored when the UE is transited to the RRC inactive mode, and when RRC connection resumption is performed as in the above, or when the UE is transited to the RRC inactive mode, the base station may transmit, to the UE, configuration information or an indicator indicating whether to discard or clear, maintain and apply, or reconfigure the SCell configuration information (e.g., configuration information described or provided in FIG. 1F) or the PSCell configuration information of the MCG or SCG, stored in the RRC message (e.g., RRCResume or RRCReconfiguration or RRCRelease message).

In FIG. 1M, a UE 1m-01 may perform network connection to a base station 1m-02 and transmit or receive data 1m-05. If, for some reason, the base station needs to transit the UE to an RRC inactive mode, the base station may transmit an RRCRelease message 1m-20 to transit the UE to the RRC inactive mode. The base station may transmit, to the UE, the message including configuration information or an indicator indicating whether to discard or clear, maintain and apply, or reconfigure SCell configuration information (e.g., configuration information described or provided in FIG. 1F) of an MCG or SCG, or PSCell (or SCell) configuration information of a cell group (e.g., secondary cell group), stored in the RRC message (e.g., RRCRelease). In a case of a UE to which dual connectivity is applied, the base station may determine whether to suspend or resume master cell group bearer configuration or RRC configuration information or SCell configuration information of the MCG or SCG, and may inquire a secondary cell base station about whether or not to perform suspension or resumption and receive a respond in order to determine whether to suspend or resume secondary cell group bearer configuration and RRC configuration information 1m-15. Also, the base station may configure a list of frequencies to be measured by the UE in an RRC idle mode or an RRC inactive mode, frequency measurement configuration information, a frequency measurement period, or the like via the RRCRelease message.

The UE in the RRC inactive mode may, while moving, receive a paging message 1m-25 and perform RRC connection resumption when uplink data needs to be transmitted or a RAN notification area needs to be updated.

When the UE needs to establish a connection, the UE performs a random access procedure, and when transmitting an RRCResumeRequest message 1m-30 to the base station, UE operations related to transmission of the message are as follows.

1. When the UE identifies system information, and the system information indicates transmission of a complete UE connection resumption identifier (I-RNTI or full resume ID), the UE prepares to transmit the message including the stored complete UE connection resumption identifier (I-RNTI). If the system information indicates to transmit a truncated UE connection resumption identifier (truncated I-RNTI or truncated resume ID), the UE constitutes the stored complete UE connection resumption identifier (I-RNTI) with a truncated UE connection resumption identifier (truncated resume ID) according to a predetermined scheme, and prepares to transmit the message including the constituted truncated UE connection resumption identifier.

2. The UE restores RRC connection configuration information and security context information from stored UE context.

3 Then, the UE updates a new KgNB security corresponding to the master cell group key on the basis of a current KgNB security key, a NextHop (NH) value, and an NCC value received via the RRCRelease message so as to be stored.

4. If the UE receives a SCG-counter value (or sk-counter) via the RRCRelease message, the UE updates a new SKgNB security key corresponding to the secondary cell group on the basis of the KgNB security key and the SCG-counter (or sk-counter).

5. Then, the UE derives new security keys (K_RRCenc, K_RRC_int, K_UPint, and K_UPenc) to be used in integrity protection and verification procedure and in encryption and decryption procedure, by using the newly updated KgNB security key.

6 Then, if the UE receives the SCG-counter value (or sk-counter) via the RRCRelease message, the UE derives new security keys (SK_RRCenc, SK_RRC_int, SK_UPint, and SK_UPenc) to be used in integrity protection and verification procedure and in encryption and decryption procedure, by using the newly updated SKgNB security key.

7 Then, the UE calculates MAC-I and prepares to transmit the message including the calculated MAC-I.

8. Then, the UE resumes SRB1 (SRB1 may be resumed in advance because the RRCResume message is to be received via SRB1 in response to the RRCResumeRequest message to be transmitted).

9. The UE constitutes the RRCResumeRequest message and transmits the message to a lower layer device.

10. The UE resumes the integrity protection and verification procedure by applying the updated security keys and a preconfigured algorithm with respect to all bearers (MCG terminated RBs) except for SRB0 corresponding to the master cell group, and applies the integrity verification and protection to data to be transmitted and received at a later time (for increasing reliability and security on the data to be transmitted to or received from SRB1 or DRBs at a later time).

11. The UE resumes the encryption and decryption by applying the updated security keys and a preconfigured algorithm with respect to all bearers (MCG terminated RBs) except for SRB0 corresponding to the master cell group, and applies the encryption and decryption to data to be transmitted and received at a later time. (for increasing reliability and security on the data to be transmitted to or received from SRB1 or DRBs at a later time.)

12. If the UE receives the SCG-counter value (or sk-counter) via the RRCRelease message, the UE resumes the integrity protection and verification procedure by applying the updated security keys and a preconfigured algorithm with respect to all bearers (SCG terminated RBs) corresponding to the secondary cell group, and applies the integrity verification and protection to data to be transmitted and received at a later time. (for increasing reliability and security on the data to be transmitted to or received from DRBs at a later time.)

13 If the UE receives the SCG-counter value (or sk-counter) via the RRCRelease message, the UE resumes the encryption and decryption by applying the updated security keys and a preconfigured algorithm with respect to all bearers (SCG terminated RBs) corresponding to the secondary cell group, and applies the encryption and decryption to data to be transmitted and received at a later time (for increasing reliability and security on the data to be transmitted to or received from DRBs at a later time.)

When the UE needs to establish a connection so as to perform a random access procedure, the UE transmits an RRCResumeRequest message to the base station, and then receives an RRCResume message 1m-35 in response thereto, provided UE operations are as follows. If the RRCResume message includes an indicator indicating to report, if the UE has a valid frequency measurement result measured in the RRC inactive mode, the frequency measurement result, the UE may report the frequency measurement result constituted in an RRCResumeComplete message. Also, the base station may transmit, to the UE, the RRC message (e.g., RRCResume) including configuration information or an indicator indicating whether to discard or clear, maintain and apply, or reconfigure the SCell configuration information (e.g., configuration information described or provided in FIG. 1F) of the MCG or SCG, stored in the UE.

1. When the message is received, the UE restores a PDCP state corresponding to the master cell group, resets a COUNT value, and re-establishes PDCP layer devices of all DRBs (MCG terminated RBs) and SRB2 corresponding to the master cell group.

2. If the UE receives a SCG-counter value (or sk-counter) via the message, the UE updates a new SKgNB security key corresponding to the secondary cell group on the basis of a KgNB security key and the SCG-counter (or sk-counter). The UE derives new security keys (SK_RRCenc, SK_RRC_int, SK_UPint, and SK_UPenc) to be used in integrity protection and verification procedure and in encryption and decryption procedure, by using the newly updated SKgNB security key corresponding to the secondary cell group.

3. If the message includes master cell group (masterCellgroup) configuration information,
   A. the UE performs and applies the master cell group configuration information included the message. The master cell group information may include configuration information on RLC layer devices belonging to the master cell group, a logical channel identifier, a bearer identifier, and the like.

4 If the message includes bearer configuration information (radioBearerConfig),
   A. the UE performs and applies the bearer configuration information (radioBearerConfig) included in the message. The bearer configuration information (radioBearerConfig) may include configuration information on PDCP layer devices for respective bearers, configuration information on SDAP layer devices, a logical channel identifier, a bearer identifier, and the like.

5. If the message includes secondary cell group (materCellgroup) configuration information,
   A. the UE performs and applies the secondary cell group configuration information included the message. The secondary cell group information may include configuration information on RLC layer devices belonging to the secondary cell group, a logical channel identifier, a bearer identifier, and the like.

6. If the message includes secondary bearer configuration information (radioBearerConfig),
   A. the UE performs and applies the secondary bearer configuration information (radioBearerConfig) included in the message. The secondary bearer configuration information (radioBearerConfig) may include configuration information on PDCP layer devices for respective secondary bearers, configuration information on SDAP layer devices, a logical channel identifier, a bearer identifier, and the like.

7. The UE resumes all DRBs (MCG terminated RBs) and SRB2 corresponding to the master cell group.

8. If the message includes frequency measurement configuration information (measConfig), A. the UE performs and applies the frequency measurement configuration information included the message. That is, frequency measurement may be performed according to the configuration.

9. The UE is transited to the RRC connected mode.

10. The UE indicates to an upper layer device that the suspended RRC connection has been resumed.

11. Then, the UE constitutes and transfers the RRCResumeComplete message 1m-40 for transmission to a lower layer.

In case that the UE has UE context information and bearer configuration information for the suspended secondary cell group, the UE may perform frequency measurement on the basis of frequency configuration information configured via system information, the RRCRelease message, or the RRCResume message, and in case that there is a valid result, the UE may transmit the RRCResumeComplete message including an indicator so as to indicate the presence of the result. When the base station receives the indicator, in case that resumption of frequency carrier aggregation or dual connectivity is necessary, the base station may indicate in a measurement report command 1m-45 to the UE to report a frequency measurement result and receive a frequency measurement result report, or the base station may receive the frequency measurement result report 1m-50 via the RRCResumeComplete message.

When the frequency measurement result is received, the base station may inquire the secondary cell base station about whether to resume bearer information for the suspended secondary cell group, and may receive a respond so as to make a determination, and the base station may provide an indication of resumption or release of bearers for the secondary cell group, by transmitting the RRCReconfiguration message to the UE. In addition, the base station may transmit, to the UE, the RRC message (e.g., RRCReconfiguration) including configuration information or an indicator indicating whether to discard or clear, maintain and apply, or reconfigure the SCell configuration information (e.g., configuration information described or provided in FIG. 1F) of the MCG or SCG, stored in the UE.

In the eighth embodiment provided in FIG. 1M of the disclosure, the base station may allow a first active BWP of downlink or uplink BWP configuration information of each cell to be configured as a dormant BWP, in the SCell configuration information (e.g., configuration information described or provided in FIG. 1F) or PSCell (or SCell) configuration information of the cell group (e.g., secondary cell group) of the RRC message (e.g., RRCRelease, RRCResume, or RRCReconfiguration message), and therefore when the UE activates each SCell or a PSCell of the cell group (e.g., secondary cell group), the base station may directly enable operation, as a dormant BWP, of a downlink BWP or uplink BWP of each SCell or PSCell, or may enable suspension or resumption of the cell group, thereby reducing battery consumption of the UE.

For example, in case that an Scell state is configured to be active or a cell group state is configured to be active, suspended, or deactivated in Scell configuration information or cell group configuration information of the RRC message (e.g., RRCRelease, RRCResume, or RRCReconfiguration message), or an indicator for suspending or resuming the cell group is configured, or an indication of activating the Scell is received via MAC control information provided in the disclosure, each Scell or PSCell may be activated, resumed, or suspended, and when the Scell or PSCell is activated, a DL BWP or UL BWP of the Scell or PSCell may be directly activated to a dormant BWP, thereby reducing battery consumption of the UE.

As described above, in case that the UE in the RRC inactive mode is transited to the RRC connected mode, and the Scell configuration information or PSCell (or Scell) configuration information of the cell group (e.g., secondary cell group) provided in the disclosure is restored, applied, or reconfigured, switching or activation between bandwidth parts or activation or application of a dormant BWP may be performed for each activated Scell or activated PSCell (or Scell) of the cell group according to the embodiments provided in the disclosure. The embodiments of the disclosure may also be extended and applied when handover is performed.

If the UE receives an indicator for suspension, resumption, activation, or deactivation for a cell, a cell group or a PSCell of a cell group by the embodiments provided in the disclosure, a PHY layer device or a MAC layer device having received the indication may indicate the indication to an upper layer device (e.g., MAC layer device, RLC layer device, PDCP layer device, or RRC layer device). When the upper layer device receives the indication (e.g., cell group suspension, resumption, activation, or deactivation) from the lower layer deice, a protocol layer device procedure for cell group suspension, resumption, activation, or deactivation corresponding to the indication may be performed. Alternatively, if the UE receives an indicator for suspension, resumption, activation, or deactivation for a cell group or a PSCell of a cell group via the RRC message as in the embodiments of the disclosure, an RRC layer device having received the indication may indicate the indication to a lower layer device (e.g., PHY layer device, MAC layer device, RLC layer device, PDCP layer device). When the lower layer device receives the indication (e.g., cell group suspension, resumption, activation, or deactivation) from the upper layer device, a protocol layer device procedure for cell group suspension, resumption, activation, or deactivation corresponding to the indication may be performed.

FIG. 1N illustrates an operation of a terminal according to various embodiments of the present disclosure.

In FIG. 1N, in case that a UE receives the RRC message or the MAC control information or DCI of the PDCCH according to the embodiments provided in the disclosure, or receives the RRC message first (or before) and configures the first channel measurement configuration information (or the second channel measurement configuration information), or receives the indication information indicating the activation of a cell via the RRC message or the MAC control information or the DCI of PDCCH or information related to the first channel measurement configuration information 1n-10, the UE may quickly activate the cell in consideration of the first channel measurement configuration information according to the above-provided embodiments of the disclosure 1n-20. In case that the UE has never configured the first channel measurement configuration information (or the second channel measurement configuration information) by receiving the RRC message first (or before), or received the indication information for activating a cell via the RRC message or the MAC control information or the DCI of the PDCCH, or has not received the information related to the first channel measurement configuration information 1n-10, the UE may activate the cell without considering the first channel measurement configuration information according to the above provided embodiments of the disclosure 1n-30. In case that the UE receives the indication information to deactivate the cell via the RRC message or the MAC control information or the DCI of the PDCCH 1n-10, the UE may deactivate the cell according to the above-provided embodiments of the disclosure 1n-40.

Various embodiments may be configured and operated by fusing or extending the embodiments provided in the disclosure.

The disclosure proposes a power headroom reporting procedure of the UE for allowing the base station to adjust or manage the UL transmission power of the UE. As provided in the disclosure, in a case of a cell (Scell) or a serving cell in which a dormant BWP is configured, or a suspended (or deactivated) cell group or cell, when a current or activated BWP (or downlink BWP) of an activated serving cell is a dormant BWP, or when it is activated to a BWP indicated by a dormant BWP identifier, or when a cell group is a suspended (or deactivated) cell (e.g., PSCell or Scell), even if a power headroom is reported, UL data transmission or PUCCH transmission is impossible in the dormant BWP or the suspended (or deactivated) cell group or cell, and thus unnecessary power headroom reporting may be performed.

Accordingly, hereinafter, in order to reduce unnecessary processing load on the UE and prevent waste of a transport resource due to unnecessary power headroom reporting, the disclosure proposes that the UE first identifies whether a cell is activated or deactivated, and performs a procedure of identifying, for an activated cell, whether an activated BWP (e.g., downlink BWP) of the activated cell is a dormant BWP (or BWP having a dormant BWP identifier configured in the RRC message) or is not a dormant BWP (or not a BWP having a dormant BWP identifier configured in the RRC message), or whether a cell group or cell (e.g., PSCell) is suspended (or deactivated) or activated (or resumed). In another method, the UE may first identify whether a cell is activated or deactivated, and may perform a procedure of identifying, for an activated cell when a dormant BWP is configured (e.g., when a dormant BWP identifier is configured for the cell in the RRC message), whether an activated BWP (e.g., downlink BWP) of the activated cell is a dormant BWP (or BWP having a dormant BWP identifier configured in the RRC message) or is not a dormant BWP (or not a BWP having a dormant BWP identifier configured in the RRC message), and for the activated cell in which a dormant BWP is not configured, the procedure of identifying an activated BWP may be omitted (or may not be performed).

In a case of a cell (Scell) or a serving cell in which a dormant BWP is configured in the above provided procedure, when a current or activated BWP (or downlink BWP) of an activated serving cell is a dormant BWP, or when it is activated to a BWP indicated by a dormant BWP identifier, or when a cell group or a cell (e.g., PSCell or Scell) is suspended (or deactivated), the power headroom reporting procedure may not be triggered, and even if the power headroom reporting procedure is triggered by another cell, a power headroom for the cell may not be reported. In another method, in a case of a cell (Scell) or a serving cell in which a dormant BWP is configured, only the case where a current or activated BWP (or downlink BWP) of an activated serving cell is not a dormant BWP, or it is not activated to a BWP indicated by a dormant BWP identifier, or a cell group or a cell (e.g., PSCell or Scell) is not suspended (or is not deactivated, or is activated, or is resumed), the power headroom reporting procedure may be triggered, and alternatively, even if the power headroom reporting procedure is triggered by another cell, only the case where a current or activated BWP (or downlink BWP) of an activated serving cell is not a dormant BWP, or it is not activated to a BWP indicated by a dormant BWP identifier, or a cell group or a cell (e.g., PSCell or Scell) is not suspended (or not deactivated, or is activated, or is resumed), a power headroom may be reported. Accordingly, the procedure provided in the disclosure may reduce unnecessary processing load, and may prevent waste of a transmission resource due to unnecessary power headroom reporting. A particular embodiment of the provided procedure will now be described in the second embodiment of the disclosure in which a dormant BWP below is considered.

In the first embodiment of the disclosure in which the dormant BWP is considered, a power headroom reporting procedure may be used to provide the following information to the base station (serving gNB) that serves the UE. In above, a power headroom may indicate a difference between maximum transmit power (or calculated or nominal UE maximum transmit power) that may be transmitted by the UE in each activated serving cell (PCell, Scell, PSCell, or SPCell) and power measured for uplink data transmission (UL-SCH) or sounding reference signal (SRS) transmission, or may indicate a difference between maximum transmit power that may be transmitted by the UE and power measured for PUCCH transmission and uplink data transmission in an SPCell (PCell or PSCell) of another MAC layer device (e.g., LTE MAC or E-UTRA MAC). The power headroom may be reported to the base station by constituting a power headroom value in MAC control information by the power headroom reporting procedure and transmitting the MAC control information via an uplink transmission resource.

A type 1 power headroom is a difference between maximum transmit power (or calculated or nominal UE maximum transmit power) that may be transmitted by the UE for each activated serving cell (PCell, Scell, PSCell, or SpCell) and power measured for uplink data transmission (UL-SCH), and may be reported.

A type 2 power headroom is a difference between maximum transmit power (or calculated or nominal UE maximum transmit power) that may be transmitted by the UE and power measured for PUCCH transmission or uplink data transmission (UL-SCH) in the SpCell (PCell or PSCell) of another MAC layer device (e.g., in case that dual connectivity is configured, LTE MAC or E-UTRA MAC), and may be reported.

A type 3 power headroom is a difference between maximum transmit power (or calculated or nominal UE maximum transmit power) that may be transmitted by the UE for each activated serving cell (PCell, Scell, PSCell, or SpCell) and power measured for sounding reference signal (SRS) transmission, and may be reported. The first embodiment of a procedure of reporting a power headroom considering a dormant BWP according to the disclosure is as below.

In the first embodiment of the disclosure, the UE may receive configuration information for power headroom reporting via an RRC message (e.g., RRCReconfiguration), and an RRC layer device may adjust a power headroom reporting procedure by using the following parameters:

Timer value (phr-PeriodicTimer) for periodically reporting a power headroom; for example, when a periodic power headroom reporting timer expires, the power headroom reporting procedure may be triggered;

Timer value (phr-ProhibitTimer) for prohibiting power headroom reporting: for example, when a power headroom reporting prohibit timer is running, the power headroom reporting procedure is not triggered;

Threshold value (phr-Tx-PowerFactorChange) for triggering power headroom reporting;

Indicator (phr-Type2OtherCell) indicating type 2 power headroom reporting considering another cell or MAC layer device;

Indicator (phr-ModeOtherCG) indicating power headroom reporting considering another cell group, and Indicator (multiplePHR) indicating multiple power headroom reporting.

The parameters may be configured through the RRC message (e.g., RRCReconfiguration) as illustrated in FIG. 1F of the disclosure.

In the first embodiment of a procedure of reporting a power headroom considering a dormant BWP, provided in the disclosure, the power headroom reporting procedure may be triggered when one event occurs or one condition is satisfied from among the following conditions.

When the power headroom reporting prohibit timer (phr-ProhibitTimer) expires or has expired, a BWP (or downlink BWP) of an activated serving cell of a certain MAC layer device is activated, and path loss is changed by a threshold value (phr-Tx-PowerFactorChange) dB configured in the RRC message for at least one activated serving cell in which an activated BWP (or downlink BWP) is not a dormant BWP or an activated BWP (or downlink BWP) or a current BWP (or activated current downlink BWP) of an activated serving cell is not a dormant BWP, the power headroom reporting procedure may be triggered. Then, the path loss may be used as a path loss reference value when a MAC layer device has (or receives) an uplink transmission resource for new transmission after a power headroom last transmitted by the MAC layer device.

When the periodic power headroom reporting timer expires, the power headroom reporting procedure may be triggered.

When a power headroom reporting function is configured or reconfigured by a higher layer device (e.g., RRC layer device), the power headroom reporting procedure may be triggered. The configuration or reconfiguration may not be used to deactivate the power headroom reporting function.

When a certain cell in which an uplink of a certain MAC layer device is configured is activated and a first active downlink BWP (or first active downlink BWP identifier (firstAciveDownlinkBWP-Id)) configured in the cell is not configured as a dormant BWP, the power headroom reporting procedure may be triggered.

When a PSCell or a cell group or a cell is added or newly added or modified (or when dual connectivity is configured and a PSCell of a SCG is newly added or modified), or when the PSCell or the cell group or the cell is activated or resumed, the power headroom reporting procedure may be triggered.

In another method, when a PSCell is added or newly added or modified (or when dual connectivity is configured or a PSCell of a SCG is newly added or modified), or when the PSCell or the cell group or the cell is activated or resumed, if a first active downlink BWP (or first active downlink bandwidth identifier (firstActiveDownlinkBWP-Id)) configured in the cell is not configured as a dormant BWP, the power headroom reporting procedure may be triggered.

When the power headroom reporting prohibit timer (phr-ProhibitTimer) expires or has expired, and a MAC layer device has (or receives) an uplink transmission resource for new transmission, if the following condition is true or satisfied for a certain activated serving cell in which an uplink of a certain MAC layer device is configured, the power headroom reporting procedure may be triggered.

According to the condition, when there is an uplink transmission resource allocated for PUCCH transmission or transmission in the cell, and the MAC layer device has an uplink resource for PUCCH transmission or transmission in the cell, if power backoff required for power management (e.g., to reduce interference of another frequency or avoid harm to human body) for the cell after a last transmitted power headroom is changed by a threshold value (phr-Tx-PowerFactorChange) dB configured in the RRC message, the power headroom reporting procedure may be triggered.

In case that an UP BWP is activated (or activated to a first active UL BWP), or a downlink BWP (or activated BWP or current BWP (or downlink BWP)) of a certain activated SCell configured with an uplink in a certain MAC layer device is switched or activated from a dormant BWP to a normal BWP (or BWP other than the dormant BWP (non-dormant BWP)), or a non-dormant BWP first activated from dormancy configured in the RRC message (BWP indicated by firstActiveNonDormantDownlinkBWP-Id or BWP identifier other than the dormant BWP), the power headroom reporting procedure may be triggered In case that a DL BWP (or activated BWP or current BWP (or DL BWP)) of a certain activated SCell configured with a UL in a certain MAC layer device is activated to a BWP indicated by a BWP identifier (firstOutsideActiveTimeBWP-Id or firstWithinActiveTimeBWP-Id) first activated from dormancy configured in the RRC message, the power headroom reporting procedure may be triggered. The activation of the BWP may be indicated by DCI of a PDCCH.

In case that a UL BWP is activated (or activated to a first active UL BWP), or a DL BWP (or activated BWP or current BWP (or DL BWP)) of a certain activated SCell configured with the UL in a certain MAC layer device is switched or activated from a dormant BWP to a normal BWP (or BWP other than the dormant BWP (non-dormant BWP)) or a non-dormant BWP first activated from dormancy configured in the RRC message (BWP indicated by firstActiveNonDormantDownlinkBWP-Id, firstOutsideActiveTimeBWP-Id, or firstWithinActiveTimeBWP-Id, or BWP identifier other than the dormant BWP), or first SRS configuration information or second SRS configuration information is configured (or when an activated BWP (or DL BWP) of an activated serving cell or a current BWP (or activated current DL BWP) is the dormant BWP and the first SRS configuration information or the second SRS configuration information is configured), the power headroom reporting procedure may be triggered When the power headroom prohibit timer (phr-ProhibitTimer) expires or has expired, a BWP (or DL BWP) of an activated serving cell of a certain MAC layer device is activated, and an activated BWP (or DL BWP) is not a dormant BWP, or when an activated BWP (or DL BWP) or a current BWP (or activated current DL BWP) of an activated serving cell is not a dormant BWP, or when first SRS configuration information or second SRS configuration information is configured (or when an activated BWP (or DL BWP) or a current BWP (or activated current DL BWP of an activated serving cell is a dormant BWP and first SRS configuration information or second SRS configuration information is configured), if path loss is changed by a threshold value (phr-Tx-PowerFactorChange) dB configured in the RRC message for at least one activated serving cell, the power headroom reporting procedure may be triggered. The path loss may be used as a path loss reference value when a MAC layer device has (or receives) a UL transmission resource for new transmission after a last transmitted power headroom in the MAC layer device.

In the disclosure, when one or more events occur or one or more conditions are satisfied from among the conditions and thus the power headroom reporting procedure is triggered, a MAC layer device may operate as below.

When the MAC layer device has or receives a UL allocated for new transmission, the MAC layer device may operate as follows.

1> When the UL transmission resource after a last MAC reset procedure is a first UL transmission resource allocated for new transmission,
   2> the periodic power headroom reporting timer for periodically reporting a power headroom starts,
1> When it is decided (or determined) that the power headroom reporting procedure has been triggered and has not been cancelled, and
1> when the allocated UL transmission resource may include MAC control information (MAC CE or MAC control element) or its subheader (e.g., MAC subheader) for power headroom reporting configured to be transmitted by the MAC layer device or may be transmitted via the transmission resource as a result of a logical channel prioritization (LCP) procedure (e.g., procedure of allocating a UL transmission resource to data or MAC control information),
   2> when an indicator (multiplePHR) indicating multiple power headroom reporting is configured as TRUE (or configured to report),
     3> for each activated serving cell connected to a certain MAC layer device, or configured in a certain MAC layer device and configured with a UL,
     3> when a BWP (or DL BWP) of the activated serving cell is activated and an activated BWP (or DL BWP) is not a dormant BWP, or when an activated BWP (or DL BWP) or a current BWP (or activated current DL BWP) of the activated serving cell is not a dormant BWP, or when the cell group or cell (e.g., PSCell) is not suspended or is not deactivated, and
     3> Alternatively, when a BWP (or DL BWP) of the activated serving cell is activated and an activated BWP (or DL BWP) is not a dormant BWP, or when an activated BWP (or DL BWP) or a current BWP (or activated current DL BWP) of the activated serving cell is not a dormant BWP, or when the cell group or cell (e.g., PSCell) is not suspended or is not deactivated, or when first SRS configuration information or second SRS configuration information is configured (or when an activated BWP (or DL BWP) or current BWP (or activated current DL BWP) of the activated serving cell is a dormant BWP and first SRS configuration information or second SRS configuration information is configured),
     4> a value of a type 1 power headroom or a type 3 power headroom for a UL carrier (or frequency) corresponding to the cell is obtained (or calculated),
     4> When the MAC layer device has or receives a UL transmission resource allocated for transmission for the serving cell, and
     4> alternatively, when another MAC layer device is configured, another MAC layer device has or receives a UL transmission resource allocated for transmission for the serving cell, and an indicator (phr-ModeOtherCG) indicating power headroom reporting considering another cell group by a higher layer device (RRC layer device) is configured as Real (or configured to report as a real value),
       5> a maximum transmission power value (or power value required for power headroom calculation) corresponding to the serving cell is obtained from a physical layer,
   3> When an indicator (phr-Type2OtherCell) indicating type 2 power headroom reporting considering another cell or MAC layer device is configured as TRUE (or is configured to report),
     4> when another MAC layer device is an E-UTRA MAC layer device,
       5> a value for type 2 power headroom reporting for a SPCell of the other MAC layer device is obtained (or calculated), and
       5> When an indicator (phr-ModeOtherCG) indicating power headroom reporting considering another cell group by a higher layer device (RRC layer device) is configured as Real (or is configured to be reported as a real value),
         6> a maximum transmission power value (or power value required for power headroom calculation) for a SpCell of the other MAC layer device (E-UTRA MAC layer device) is obtained from a physical layer device,
   3> A multiplexing and assembly procedure (multiplexing and assembly procedure of the MAC layer device) for generating and transmitting MAC control information reporting a plurality of power headrooms based on values reported from a physical layer device is indicated,
   2> When an indicator (multiplePHR) indicating multiple power headroom reporting is not configured as TRUE (or is not configured to report), or when one power headroom reporting is indicated, or when one power headroom reporting format is used,
     3> a type 1 power headroom value for a UL carrier (or frequency) of the serving cell (or Pcell) is obtained (or calculated) from a physical layer device,
     3> A maximum transmission power value (or power value required for power headroom calculation) for the serving cell (or Pcell) is obtained from a physical layer device, and
     3> A multiplexing and assembly procedure (multiplexing and assembly procedure of the MAC layer) for generating and transmitting MAC control information reporting one power headroom based on values reported from a physical layer device is indicated, 2> The tinier for periodically reporting a power headroom starts or restarts,
2> The timer for prohibiting power headroom reporting starts or restarts, and
2> All triggered power headrooms or power headroom reporting procedures are cancelled.

FIG. 1O proposes a signaling procedure of configuring or releasing dual connectivity, or activating or resuming or suspending or deactivating a secondary cell group configured with dual connectivity, in a next-generation mobile communication system of the disclosure.

In FIG. 1O, a first signaling procedure of configuring or releasing dual connectivity, or configuring, releasing, activating or resuming or suspending or deactivating a secondary cell group configured with dual connectivity is as below.

In FIG. 1O, a UE may configure an RRC connection with a network or a base station as illustrated in FIG. 1F of the disclosure, and may perform data transmission or reception with the base station (e.g., master cell group, master node (MN), or cells (PCells or SCells) of MCG).

In the above, the base station may configure dual connectivity for the UE for a certain reason (e.g., in case that a high data rate is required, at a request of the UE (1o-05), or a high QoS requirement may be satisfied). For example, the UE may transmit, to the base station, a request to configure or release, or activate or deactivate, or resume or suspend dual connectivity, a cell group (e.g., SCG), or a cell, and a message of the request may include a frequency (or channel) measurement result report or a cell group identifier or cell identifiers or measurement results (1o-05). In another method, the base station may determine whether to configure or release or add or deactivate or activate or resume or modify or reconfigure or suspend dual connectivity, a cell group (e.g., secondary cell group), or a cell, by considering the amount of DL (or UL) data or the amount of buffer.

In the above case, a master base station (master BS) (master node (MN) or master cell group (MCG)) may receive a frequency or channel measurement report for each frequency or channel received from the UE, and may determine a secondary BS (secondary BS) (secondary node (SN) or secondary cell group (SCG)) for configuring dual connectivity, based on the measurement report. Alternatively, the master BS may determine whether to configure or release or add or deactivate or activate or resume or modify or reconfigure or suspend dual connectivity or a cell group (e.g., SCG) or a cell, by considering the amount of DL (or UL) data or the amount of buffer. In the above case, in order to configure or release or add or deactivate or activate or resume or modify or reconfigure or suspend dual connectivity or a cell group (e.g., SCG) or a cell to the determined secondary BS, the master BS may transmit, to the secondary BS, a request message for requesting to configure or add to the SCG of the UE through an Xn interface (e.g., interface between the base stations) or an Sn interface (interface between the base station and an AM F or a UMF, or interface between the base stations) (1o-10).

In order to configure or release or add or deactivate or activate or resume or modify or reconfigure or suspend dual connectivity or a cell group (e.g., SCG) or a cell for the secondary BS, each separate new request message may be defined and used. In another method, a new indicator may be defined in an existing message (e.g., SN addition request message or SN modification request message or SN release request message) to indicate (or request) to configure or release or add or deactivate or activate or resume or modify or reconfigure or suspend a cell group (e.g., SCG) or a cell. The request message may include information such as cell group configuration information (e.g., MCG configuration information) currently configured in the UE or bearer configuration information or capability information of the UE or frequency (or channel) measurement result information of the UE, and by referring to the above information, the secondary BS may configure SCG configuration information or bearer configuration information to correspond to UE capability or not to exceed UE capability or to match bearer configuration information of the MCG when the SCG is configured for the UE.

In the above, in case that the secondary BS having received the request message 1o-10 rejects the request message, the secondary BS may constitute a rejection message and may transmit the rejection message to the master BS through the Xn interface (e.g., interface between BSs) or the Sn interface (interface between a BS and an AMF or a UMF, or interface between BSs) (1o-15) In case that the secondary BS accepts the request message, the secondary BS may transmit a request acceptance message including configuration information or an indicator for configuring or releasing or adding or deactivating or activating or resuming or modifying or reconfiguring or suspending dual connectivity or a cell group (e.g., SCG) or a cell through the Xn interface (e.g., interface between BSs) or the Sn interface (interface between a BS and an AMF or a UMF, or interface between BSs) to the master BS (1o-15). The request acceptance message may include at least some of the following information.

- The same identifier as a message identifier included in the request message, or an indicator indicating that a request in the request message is accepted.
- Configuration information or indicator (e.g., configuration information or indicator for the MCG) for configuring or releasing or adding or deactivating or activating or resuming or modifying or reconfiguring or suspending dual connectivity or a cell group (e.g., SCG) or a cell.
- First RRC message (e.g., RRCReconfiguration message) including configuration information or an indicator for configuring or releasing or adding or deactivating or activating or resuming or modifying or reconfiguring or suspending dual connectivity, a cell group (e.g., SCG) or a cell.
- The first RRC message may include at least some of the following information.
    - First RRC message identifier (e.g., rrc-Transaction identifier) for identifying the first RRC message. Because the UE and the base station (e.g., secondary BS) transmit or receive a plurality of RRC messages therebetween, an identifier for identifying each RRC message may be included in the RRC message. For example, the same first RRC identifier may be included in an RRC message (e.g., RRCReconfiguration) transmitted by a transmitting end, or an RRC message (e.g., RRCReconfigurationComplete) corresponding to the RRC message (e.g., RRCReconfiguration) transmitted by a receiving end, or an RRC message corresponding to the RRC message transmitted by the transmitting end
    - Configuration information or an indicator (e.g., configuration information or an indicator for the UE) for configuring or releasing or adding or deactivating or activating or resuming or modifying or reconfiguring or suspending dual connectivity or a cell group (e.g., SCG) or a cell.
    - Indicator indicating a state of a cell group (e.g., active or inactive or suspended or resumed)

Cell group identifier for identifying cell groups. The cell group identifier may be allocated by the master BS, or one identifier from among already preset identifiers may be allocated by the secondary BS.

Cell group or cell configuration information

Bearer configuration information. For example, indicator information indicating an operation of a protocol layer device (e.g., SDAP layer device or PDCP layer device or RLC layer device or MAC layer device) of each bearer (e.g., PDCP suspension indicator or PDCP reestablishment indicator or PDCP data recovery indicator or RLC reestablishment indicator or MAC partial reset indicator or MAC reset indicator or indicator triggering new operation).

In the above, in case that configuration information or an indicator for configuring or adding or activating or resuming or modifying or reconfiguring dual connectivity or a cell group (e.g., SCG) or a cell is included, a first indicator (e.g., mobilityControlInfor or ReconfigurationWithSync) may also be included. However, in the above, in case that configuration information or an indicator for releasing or deactivating or reconfiguring or suspending dual connectivity or a cell group (e.g., SCG) or a cell is included, the first indicator (e.g., mobilityControlInfor or ReconfigurationWithSync) may not be included. In the above case, the first indicator may be an indicator to trigger a random access procedure in the cell group or the cell, or an indicator to perform signal synchronization with a new cell, or an indicator indicating to perform frequency shift of the UE, or an indicator indicating to modify the cell group (or cell).

In case that configuration information or an indicator for configuring or adding or activating or resuming or modifying or reconfiguring dual connectivity or a cell group (e.g., SCG) or a cell is included, random access configuration information may also be included. However, in the above, in case that configuration information or an indicator for releasing or deactivating or reconfiguring or suspending dual connectivity or a cell group (e.g., SCG) or a cell is included, the random access configuration information may not be included. The random access configuration information may include random access transmission resource information (time or frequency transmission resource) for preamble transmission or designated preamble information for the cell group or cell.

Time information indicating when to activate or resume or deactivate or suspend dual connectivity, a cell group (e.g., SCG) or a cell (PSCell or SCG SCell) (e.g., information indicating a timing (e.g., X), a time unit, a subframe, a time slot, or a symbol unit, for example, when the message is received in an nth time unit, time information indicating whether to activate or resume or deactivate or suspend a cell in an n+Xth time unit.)

In the above case, in case that the master BS receives the request acceptance message 1o-15, the master BS may identify the request acceptance message, and may transmit, to the UE, a second RRC message 1o-20 (e.g., RRCReconfiguration) including information included in the request acceptance message (e.g., first RRC message included in the request acceptance message 1o-15). The second RRC message may include at least some of the following information.

Second RRC message identifier (e.g., rrc-Transaction identifier) for identifying the second RRC message. Because the UE and the base station (e.g., master BS) transmit or receive a plurality of RRC messages therebetween, the RRC message may include an identifier for identifying each RRC message. For example, the same second RRC identifier may be included in an RRC message (e.g., RRCReconfiguration) transmitted by a transmitting end, or an RRC message (e.g., RRCReconfigurationComplete) corresponding to the RRC message (e.g., RRCReconfiguration) transmitted by a receiving end, or an RRC message corresponding to the RRC message transmitted by the transmitting end.

First RRC message included in the request acceptance message 1o-15.

Configuration information or an indicator (e.g., configuration information or an indicator for the UE) for configuring or releasing or adding or deactivating or activating or resuming or modifying or reconfiguring or suspending dual connectivity or a cell group (e.g., SCG) or a cell.

Indicator indicating a state of a cell group (e.g., active or inactive or suspended or resumed).

Cell group identifier for identifying cell groups. The cell group identifier may be allocated by the masterBS, or one identifier from among already promised identifiers may be allocated by the secondary BS.

Cell group or cell configuration information.

Bearer configuration information. For example, indicator information indicating an operation of a protocol layer device (e.g., SDAP layer device or PDCP layer device or RLC layer device or MAC layer device) of each bearer (e.g., PDCP suspension indicator or PDCP reestablishment indicator or PDCP data recovery indicator or RLC reestablishment indicator or MAC partial reset indicator or MAC reset indicator or indicator to trigger new operation).

In case that configuration information or an indicator for configuring or adding or activating or resuming or modifying or reconfiguring dual connectivity or a cell group (e.g., SCG) or a cell is included, a first indicator (e.g., mobilityControlInfor or ReconfigurationWithSync) may also be included. However, in case that configuration information or an indicator for releasing or deactivating or reconfiguring or suspending dual connectivity or a cell group (e.g., SCG) or a cell is included, the first indicator (e.g., mobilityControlInfor or ReconfigurationWithSync) may not be included. In the above, the first indicator may be an indicator to trigger a random access procedure in the cell group or the cell or an indicator to perform signal synchronization with a new cell or an indicator indicating to perform frequency shift of the UE or an indicator indicating to modify the cell group (or cell). In another method, the UE may perform PDCCH monitoring in the indicated or configured cell group or cell, and may trigger and perform a random access procedure according to an indication indicated in the PDCCH. For example, a higher layer device (e.g., RRC layer device) may transmit an indicator to trigger a random access procedure to a lower layer device (e.g., MAC layer device).

In case that configuration information or an indicator for configuring or adding or activating or resuming or modifying or reconfiguring dual connectivity or a cell group (e.g., SCG) or a cell is included, random access configuration information may also be included. However, in case that configuration information or an indicator for releasing, deactivating, reconfiguring, or suspending dual connectivity, a cell group (e.g., SCG), or a cell is included, the random access configuration information may not be included. The random access configuration information may include random access transmission resource information (time or frequency transmission resource) for preamble transmission or designated preamble information for the cell group or cell.

Time information indicating when to activate or resume or deactivate or suspend dual connectivity or a cell group (e.g., SCG) or a cell (PSCell or SCG SCell) (e.g., information indicating a timing (e.g., X), a time unit, a subframe, a time slot, or a symbol unit, for example, when the message is received in an nth time unit, time information indicating whether to activate or resume or deactivate or suspend a cell in an n+Xth time unit.)

In the above, in case that the UE receives the second RRC message 1o-20, the UE may read and identify the second RRC message, or may read information included in the second RRC message (e.g., first RRC message included in the second RRC message) and may configure or add or modify or resume or suspend or deactivate dual connectivity or a cell group (e.g., SCG). Also, when a first indicator to trigger a random access procedure is included in the second RRC message or the first RRC message, a random access procedure for the configured or indicated cell group or cell may be triggered. When a random access procedure is performed, if there is random access information in the RRC message or if there is stored random access information, the UE may perform a random access procedure (e.g., contention free random access procedure (e.g., 4-step random access or 2-step random access)), based on the stored random access information or the random access information received in the RRC message or system information. When there is no random access information in the RRC message, the UE may perform a random access procedure (e.g., contention based random access procedure (e.g., 4-step random access or 2-step random access)). In another method, the UE may perform PDCCH monitoring in the indicated or configured cell group or cell, and may trigger and perform a random access procedure according to an indication indicated in the PDCCH. For example, a higher layer device (e.g., RRC layer device) may transmit an indicator triggering a random access procedure to a lower layer device (e.g., MAC layer device).

The UE may receive the second RRC message 1o-20 or apply received configuration information, and may generate a third RRC message or a fourth RRC message and may transmit the third RRC message or the fourth RRC message to the base station (1o-25). The third RRC message may include at least some of the following information.

Second RRC message identifier having the same value as a second RRC message identifier included in the second RRC message.

Indicator or an identifier indicating that the second RRC message is successfully received Fourth RRC message including a response indicating the first RRC message generated and transmitted by the secondary BS is successfully received. The fourth RRC message may include at least some of the following information.

First RRC message identifier having the same value as a first RRC message identifier included in the first RRC message Indicator or an identifier indicating that the first RRC message is successfully received.

Response indicator indicating that the first RRC message is successfully applied.

When the base station (e.g., master BS) receives the third RRC message, the base station may identify whether the third RRC message is a response message to the second RRC message via a second identifier. The base station may identify the fourth RRC message included in the third RRC message, may include the fourth RRC message in a configuration complete message indicating that a configuration is completed to a secondary cell group base station, and may transmit the same to the secondary BS through the Xn interface (e.g., interface between BSs) or the Sn interface (interface between a BS and an AMF or a UMF, or interface between BSs) 1o-30. The configuration complete message may include at least some of the following information.

Fourth RRC message included in the third RRC message.

Indicator or an identifier indicating that a configuration (addition or modification or release of a cell group) or an indication (e.g., activation or deactivation or suspension or resumption of a cell group) indicated in the request acceptance message or the first RRC message is completed.

When the base station (e.g., secondary BS) receives the configuration complete message, the base station may read or identify the fourth RRC message included in the configuration complete message, and may identify whether the fourth RRC message is a response message to the first RRC message through a first identifier. It may be identified whether a configuration or an indication indicated by the base station is successfully completed. In the above case, when the secondary BS receives the configuration complete message or the fourth RRC message, the secondary BS may transmit, to the master BS, a response message indicating that the configuration complete message or the fourth RRC message is successfully received as a response.

FIG. 1P illustrates a second signaling procedure of configuring or releasing dual connectivity, or configuring or releasing or activating or resuming or suspending or deactivating a secondary cell group configured with dual connectivity.

In FIG. 1P, a UE may configure an RRC connection with a network or a base station as illustrated in FIG. 1F of the disclosure, and may perform data transmission or reception with the base station (e.g., master cell group, master node (MN), or cells (PCells or SCells) of MCG).

In the above, the base station may configure dual connectivity in the UE for a certain reason (e.g., in case that a high data rate is required, at a request of the UE (1p-05), or a high QoS requirement may be satisfied). For example, the UE may transmit, to the base station, a request to configure, release, activate, deactivate, resume, or suspend dual connectivity, a cell group (e.g., SCG), or a cell, and the request message may include a frequency (or channel) measurement result report, or a cell group identifier, or cell identifiers, or measurement results (1p-05). In another method, the base station may determine whether to configure or release or add or deactivate or activate or resume or modify or reconfigure or suspend dual connectivity or a cell group (e.g., SCG) or a cell, by considering the amount of downlink (or uplink) data or the amount of buffer.

In the above, a master BS (MN or MCG) may receive a frequency or channel measurement report for each frequency or channel received from the UE, and may determine a secondary BS (secondary node (SN) or SCG) for configuring dual connectivity based on the measurement report.

Alternatively, the master BS may determine whether to configure or release or add or deactivate or activate or resume or modify or reconfigure or suspend dual connectivity or a cell group (e.g., SCG) or a cell, by considering the amount of downlink (or uplink) data or the amount of buffer. In the above case, with respect to the determined secondary BS, in order to configure or release or add or deactivate or activate or resume or modify or reconfigure or suspend dual connectivity or a cell group (e.g., SCG) or a cell, the master BS may transmit a first RRC message to the UE (1p-10) In order to indicate to the UE to configure or release or add or deactivate or activate or resume or modify or reconfigure or suspend dual connectivity or a cell group (e.g., SCG) or a cell, each separate new request message may be defined and indicated in the first RRC message, and in another method, a new indicator may be defined in an existing message (e.g., RRCReconfiguration message or RRCResume message) to indicate (or request) to configure or release or add or deactivate or activate or resume or modify or reconfigure or suspend a cell group (e.g., SCG) or a cell. The first RRC message may include at least some of the following information.

- First RRC message identifier (e.g., rrc-Transaction identifier) for identifying the first RRC message. Because the UE and the base station (e.g., master BS) transmit or receive a plurality of RRC messages therebetween, an identifier for identifying each RRC message may be included in the RRC message. For example, the same first RRC message identifier may be included in an RRC message (e.g., RRCReconfiguration) transmitted by a transmitting end, or an RRC message (e.g., RRCReconfigurationComplete) corresponding to the RRC message (e.g., RRCReconfiguration) transmitted by a receiving end, or an RRC message corresponding to the RRC message transmitted by the transmitting end
- Configuration information or an indicator (e.g., configuration information or an indicator for the UE) for configuring or releasing or adding or deactivating or activating or resuming or modifying or reconfiguring or suspending dual connectivity or a cell group (e.g., SCG) or a cell.
- Indicator indicating a state of a cell group (e.g., active or inactive or suspended or resumed).
- Cell group identifier for identifying cell groups. The cell group identifier may be allocated by the master BS, or one identifier from among already promised identifiers may be allocated by the secondary BS).
- Cell group or cell configuration information.
- Bearer configuration information. For example, indicator information indicating an operation of a protocol layer device (e.g., SDAP layer device or PDCP layer device or RLC layer device or MAC layer device) of each bearer (e.g., PDCP suspension indicator or PDCP reestablishment indicator or PDCP data recovery indicator or RLC reestablishment indicator or MAC partial reset indicator or MAC reset indicator or indicator to trigger new operation).
- In case that configuration information or an indicator for configuring or adding or activating or resuming or modifying or reconfiguring dual connectivity or a cell group (e.g., SCG) or a cell is included, a first indicator (e.g., mobilityControlInfor or ReconfigurationWithSync) may also be included. However, in the above, in case that configuration information or an indicator for releasing or deactivating or reconfiguring or suspending dual connectivity or a cell group (e.g., SCG) or a cell is included, the first indicator (e.g., mobilityControlInfor or ReconfigurationWithSync) may not be included. In the above, the first indicator may be an indicator to trigger a random access procedure in the cell group or the cell, or an indicator to perform signal synchronization with a new cell, or an indicator indicating to perform frequency shift of the UE, or an indicator indicating to modify the cell group (or cell). In another method, the UE may perform PDCCH monitoring in the indicated or configured cell group or cell, and may trigger and perform a random access procedure according to an indication indicated in the PDCCH. For example, a higher layer device (e.g., RRC layer device) may transmit an indicator to trigger a random access procedure to a lower layer device (e.g., MAC layer device).
- In case that configuration information or an indicator for configuring or adding or activating or resuming or modifying or reconfiguring dual connectivity or a cell group (e.g., SCG) or a cell is included, random access configuration information may also be included. However, in case that configuration information or an indicator for releasing or deactivating or reconfiguring or suspending dual connectivity or a cell group (e.g., SCG) or a cell is included, the random access configuration information may not be included. The random access configuration information may include random access transport resource information (time or frequency transport resource) for preamble transmission or designated preamble information for the cell group or cell.
- Time information indicating when to activate or resume or deactivate or suspend dual connectivity or a cell group (e.g., SCG) or a cell (PSCell or SCG SCell) (e.g., information indicating a timing (e.g., X), a time unit, a subframe, a time slot, or a symbol unit, for example, when the message is received in an nth time unit, time information indicating whether to activate or resume or deactivate or suspend a cell in an n+Xth time unit.)

In the above, in case that the UE receives the first RRC message 1p-15, the UE may read and identify the first RRC message, and may configure or add or modify or resume or suspend or deactivate dual connectivity or a cell group (e.g., SCG). Also, when a first indicator to trigger a random access procedure is included in the first RRC message, a random access procedure for the configured or indicated cell group or cell may be triggered. When the random access procedure is performed, if there is random access information in the RRC message or if there is stored random access information, the UE may perform a random access procedure (e.g., 4-step random access or 2-step random access) based on the stored random access information, or the random access information received in the RRC message, or system information. When there is no random access information in the RRC message, the UE may perform a random access procedure (e.g., CBRA procedure (e.g., 4-step random access or 2-step random access)). In another method, the UE may perform PDCCH monitoring in the indicated or configured cell group or cell, and may trigger and perform a random access procedure according to an indication indicated in the PDCCH For example, a higher layer device (e.g., RRC layer device) may transmit an indicator to trigger a random access procedure to a lower layer device (e.g., MAC layer device).

The UE may receive the first RRC message 1p-10 or apply received configuration information, and may generate a second RRC message and may transmit the second RRC message to the base station (1p-15). The second RRC message may include at least some of the following information.

> First RRC message identifier having the same value as a first RRC message identifier included in the first RRC message.
> Indicator or an identifier indicating that the first RRC message is successfully received.

In the above, when the base station (e.g., master BS) receives the second RRC message, the base station may identify whether the second RRC message is a response message to the first RRC message via a first identifier. The base station may identify the first RRC message and may transmit, to the secondary BS, an indication message including an indication that a cell group has been configured or added or released or activated or resumed or suspended or deactivated to a SCG BS through an Xn interface (e.g., interface between BSs) or an Sn interface (interface between a BS and an AMF or a UMF, or interface between BSs) (1p-20). The indication message may include at least some of the following information.

> Identifier for identifying the indication message
> Configuration information or an indicator (e.g., configuration information or an indicator for the SCG) indicating that dual connectivity or a cell group (e.g., SCG) or a cell has been configured or released or added or deactivated or activated or resumed or modified or reconfigured or suspended.

In the above, when the base station (e.g., secondary BS) receives the indication message, the base station may read or identify configuration information or a message included in the indication message, may generate an indication acknowledgement message as a response message to the indication message, and may transmit the indication acknowledgement message to the master BS (1p-25).

> Identifier having the same value as an identifier included in the indication message.
> Indicator or an identifier indicating that the indication message is successfully received.
> Response indicator indicating that the indication message is successfully applied.

With respect to FIG. 1Q, a third signaling procedure of configuring or releasing dual connectivity, or configuring or cleaning or activating or resuming or suspending or deactivating a SCG configured with dual connectivity is illustrated as follows.

In FIG. 1Q, a UE may configure an RRC connection with a network or a base station as illustrated in FIG. 1F of the disclosure, and may perform data transmission or reception with the base station (e.g., MCG, MN, or cells (PCells or SCells) of MCG).

In FIG. 1Q, according to a configuration procedure of FIG. 1F, the base station may configure, for the UE, an SRB (e.g., SRB3) for directly transmitting or receiving a control message or an RRC message between the UE and a secondary BS.

In the above case, the base station (e.g., secondary BS or master BS) may configure dual connectivity in the UE for a certain reason (e.g., in case that a high data rate is required, at a request of the UE (1q-05), or a high QoS requirement may be satisfied) For example, the UE may transmit, to the base station, a request to configure, release, activate, deactivate, resume, or suspend dual connectivity, a cell group (e.g., SCG), or a cell, or may transmit a request to the secondary BS through the SRB3, and a message of the request may include a frequency (or channel) measurement result report, or a cell group identifier, or cell identifiers, or measurement results (1q-05). In another method, the secondary BS may determine whether to configure or release or add or deactivate or activate or resume or modify or reconfigure or suspend dual connectivity or a cell group (e.g., SCG) or a cell, by considering the amount of DL (or UL) data or the amount of buffer.

In the above, the secondary BS (MN or MCG) may receive a frequency or channel measurement report for a frequency or a channel received from the UE, and may determine whether to configure or release or add or deactivate or activate or resume or modify or reconfigure or suspend dual connectivity or a cell group (e.g., SCG) or a cell based on the measurement result. Alternatively, the secondary BS may determine whether to configure or release or add or deactivate or activate or resume or modify or reconfigure or suspend dual connectivity or a cell group (e.g., SCG) or a cell, by considering the amount of DL (or UL) data or the amount of buffer.

In the above, in order to configure or release or add or deactivate or activate or resume or modify or reconfigure or suspend dual connectivity or a cell group (e.g., SCG) or a cell, the secondary BS may transmit a first RRC message to the UE via the SRB3 1q-10. In order to indicate to the UE to configure or release or add or deactivate or activate or resume or modify or reconfigure or suspend dual connectivity or a cell group (e.g., SCG) or a cell, each separate new request message may be defined and indicated in the first RRC message, and in another method, a new indicator may be defined in an existing message (e.g., RRCReconfiguration message or RRCResume message) to indicate (or request) to configure or release or add or deactivate or activate or resume or modify or reconfigure or suspend a cell group (e.g., SCG) or a cell. The first RRC message may include at least some of the following information.

> First RRC message identifier (e.g., rrc-Transaction identifier) for identifying the first RRC message. Because the UE and the base station (e.g., secondary BS) transmit or receive a plurality of RRC messages therebetween, an identifier for identifying each RRC message may be included in the RRC message. For example, the same first RRC message identifier may be included in an RRC message (e.g., RRCReconfiguration) transmitted by a transmitting end, or an RRC message (e.g., RRCReconfigurationComplete) corresponding to the RRC message (e.g., RRCReconfiguration) transmitted by a receiving end, or an RRC message corresponding to the RRC message transmitted by the transmitting end.
> Configuration information or an indicator (e.g., configuration information or an indicator for the UE) for configuring or releasing or adding or deactivating or activating or resuming or modifying or reconfiguring or suspending dual connectivity or a cell group (e.g., SCG), or a cell
> Indicator indicating a state of a cell group (e.g., active or inactive or suspended or resumed).
> Cell group identifier for identifying cell groups. The cell group identifier may be allocated by the master BS, or one identifier from among already promised identifiers may be allocated by the secondary BS.
> Cell group or cell configuration information.
> Bearer configuration information. For example, indicator information indicating an operation of a protocol layer device (e.g., SDAP layer device or PDCP layer device or RLC layer device or MAC layer device) of each bearer (e.g., PDCP suspension indicator or PDCP reestablishment indicator or PDCP data recovery indicator or RLC reestablishment indicator or MAC partial reset indicator or MAC reset indicator or indicator to trigger new operation).

In the above, in case that configuration information or indicator for configuring or adding or activating or resuming or modifying or reconfiguring dual connectivity or a cell group (e.g., SCG) or a cell is included, a first indicator (e.g., mobilityControlInfor or ReconfigurationWithSync) may also be included. However, in the above, in case that configuration information or an indicator for releasing or deactivating or reconfiguring or suspending dual connectivity or a cell group (e.g., SCG) or a cell is included, the first indicator (e.g., mobilityControlInfor or ReconfigurationWithSync) may not be included. In the above, the first indicator may be an indicator to trigger a random access procedure in the cell group or the cell, or an indicator to perform signal synchronization with a new cell, or an indicator indicating to perform frequency shift of the UE, or an indicator indicating to modify the cell group (or cell). In another method, the UE may perform PDCCH monitoring in the indicated or configured cell group or cell, and may trigger and perform a random access procedure according to an indication indicated in the PDCCH. For example, a higher layer device (e.g., RRC layer device) may transmit an indicator triggering a random access procedure to a lower layer device (e.g., MAC layer device).

In the above, in case that configuration information or an indicator for configuring or adding or activating or resuming or modifying or reconfiguring dual connectivity or a cell group (e.g., SCG) or a cell is included, random access configuration information may also be included. However, in the above, in case that configuration information or an indicator for releasing or deactivating or reconfiguring or suspending dual connectivity or a cell group (e.g., SCG) or a cell is included, the random access configuration information may not be included. The random access configuration information may include random access transmission resource information (time or frequency transport resource) for preamble transmission or designated preamble information for the cell group or cell.

Time information indicating when to activate or resume or deactivate or suspend dual connectivity or a cell group (e.g., SCG) or a cell (PSCell or SCG SCell) (e.g., information indicating a timing (e.g., X), a time unit, a subframe, a time slot, or a symbol unit, for example, when the message is received in an nth time unit, time information indicating whether to activate or resume or deactivate or suspend a cell in an n+Xth time unit.)

In case that the UE receives the first RRC message 1q-15 via the SRB3, the UE may read and identify the first RRC message, and may configure or add or modify or resume or suspend or deactivate dual connectivity or a cell group (e.g., SCG). Also, when a first indicator to trigger a random access procedure is included in the first RRC message, a random access procedure for the configured or indicated cell group or cell may be triggered. In the above, when the random access procedure is performed, if there is random access information in the RRC message or if there is stored random access information, the UE may perform a random access procedure (e.g., 4-step random access or 2-step random access) based on the stored random access information, or the random access information received in the RRC message, or system information. When there is no random access information in the RRC message, the UE may perform a random access procedure (e.g., 4-step random access or 2-step random access) In another method, the UE may perform PDCCH monitoring in the indicated or configured cell group or cell, and may trigger and perform a random access procedure according to an indication indicated in the PDCCH. For example, a higher layer device (e.g., RRC layer device) may transmit an indicator to trigger a random access procedure to a lower layer device (e.g., MAC layer device).

The UE may receive the first RRC message 1q-10 or apply received configuration information, and may generate a second RRC message and may transmit the second RRC message to the secondary BS through the SRB3 1q-15. The second RRC message may include at least some of the following information.

First RRC message identifier having the same value as a first RRC message identifier included in the first RRC message.

Indicator or an identifier indicating that the first RRC message is successfully received.

In the above case, when the base station (e.g., secondary BS) receives the second RRC message, the base station may identify whether the second RRC message is a response message to the first RRC message via a first identifier. When the base station identifies the first RRC message, the base station may transmit, to the master BS or an MCG BS, an indication message including an indication indicating that a cell group has been configured or added or released or activated or resumed or suspended or deactivated through an Xn interface (e.g., interface between the base stations) or an Sn interface (interface between a base station and an AMF or a UMF, or interface between base stations) 1q-20. The indication message may include at least some of the following information.

Identifier for identifying the indication message.

Configuration information or an indicator (e.g., configuration information or an indicator for the SCG) indicating that dual connectivity or a cell group (e.g., SCG) or a cell has been configured or released or added or deactivated or activated or resumed or modified or reconfigured or suspended.

In the above, when the base station (e.g., master BS) receives the indication message, the base station may read or identify configuration information or a message included in the indication message, may generate an indication acknowledgement message as a response message to the indication message, and may transmit the indication acknowledgement message to the secondary BS 1q-25.

Identifier having the same value as an identifier included in the indication message.

Indicator or identifier indicating that the indication message is successfully received.

Response indicator indicating that the indication message is successfully applied.

In case that transmitting a message to the UE in order to configure or indicate the provided cell group or cell configuration information in the UE, for example, in the above, when configuration information or indicator for configuring or adding or activating or resuming or modifying or reconfiguring dual connectivity or a cell group (e.g., SCG) or a cell is included in the message, configuration information may be included or reconfigured, or mapping configuration information between the bearer of the SDAP layer device and the QoS flow may be included or configured or reconfigured. However, in case that configuration information or an indicator for releasing or deactivating or reconfiguring or suspending dual connectivity or a cell group (e.g., SCG) or a cell is included in the message, the SDAP configuration information may not be included or not reconfigured, or the mapping configuration information between the bearer of SDAP layer device and the QoS flow may not be included, or not configured, or not reconfigured, or application thereof may be suspended.

The signaling procedures according to the disclosure may be combined and modified, and thus may be extended to new signaling procedures.

The signaling procedures according to the disclosure may be extended to multiple access technology. For example, configuration information of a plurality of cell groups may be configured in a UE through an RRC message, and one or more cell groups (or cells) from among the configured cell groups may be activated or resumed via an indicator of a PDCCH, or MAC control information or an RRC message or one or more cell groups may be suspended or deactivated.

Hereinafter, the disclosure proposes the UE operations for each cell (PSCell or SCG SCell) or the UE operations for each protocol layer device (e.g., SDAP layer device or PDCP layer device or RLC layer device or MAC layer device or PHY layer device) when dual connectivity or a cell group (e.g., SCG) or a cell (PSCell or SCG SCell) is activated or resumed or added or deactivated or released or suspended, as provided in the disclosure.

1> If a UE receives configuration information or an indicator (e.g., via DCI of a PDCCH or MAC control information or an RRC message) for configuring or adding or activating or resuming or modifying or reconfiguring dual connectivity or a cell group (e.g., SCG) or a cell, the UE may perform at least some of the following procedures
  2> A higher layer device (e.g., RRC layer device) may indicate the configuration information or the indicator to a lower layer device (e.g., PDCP layer device or RLC layer device or MAC layer device or PHY layer device).
  2> A UE operation for PSCell: If the UE receives the configuration information or the indicator, the UE may maintain a PSCell in an active state, may activate a DL BWP of the PSCell to a normal BWP configured in an RRC message (e.g., first active BWP, or BWP other than a dormant BWP) or a last activated BWP, and may perform a UE operation in an activated BWP. In another method, if the UE receives the configuration information or the indicator, the UE may maintain the PSCell in an active state, may reconfigure or switch the PDCCH monitoring cycle or DRX configuration cycle of the PSCell to a short cycle based on first DRX configuration information, and may perform PDCCH monitoring and perform a UE operation of an active cell. By using the method, the UE may perform a UE operation for the PSCell, thereby rapidly receiving a scheduling indication from a cell group or a cell and starting data transmission or reception. Also, in the above, in order to further rapidly receive a scheduling indication from a cell group or a cell and start data transmission or reception, the UE may measure many or frequent channel signals based on first channel measurement configuration information configured in an RRC message and may rapidly report a channel measurement result to a base station. In the above, when a certain condition is satisfied, the UE may measure a channel signal again based on second channel measurement configuration information and may report a measurement result to the base station,
  2> A UE operation for SCell of SCG: If the UE receives the configuration information or the indicator, the UE may activate an SCell of SCG, may activate a DL BWP or a UL BWP to a BWP (e.g., first active BWP) configured in an RRC message, and may perform a UE operation of an activated SCell or BWP. In another method, if the UE receives the configuration information or the indicator, in case that a dormant BWP is configured for an SCell of SCG, the UE may maintain the SCell in an active state, may activate a DL BWP of SCell to a BWP (e.g., first active BWP) configured in an RRC message, and may perform a UE operation in an activated BWP, and alternatively, in case that a dormant BWP is not configured for a SCell of SCG, the UE may switch the SCell to an active state, may activate a DL BWP or a UL BWP to a BWP (e.g., first active BWP) configured in an RRC message, and may perform a UE operation of the activated SCell or BWP. In another method, if the UE receives the configuration information or the indicator, the UE may determine switching or activation or deactivation of a BWP or a state of the SCell according to SCell configuration information or an indicator configured in the message including the configuration information or the indicator and may perform a UE operation,
  2> A UE operation of MAC layer device for SCG: If the UE receives the configuration information or the indicator, the UE may perform a MAC reset procedure on a MAC layer device (e.g., may reset or release configuration information configured in the MAC layer device, and may suspend or reset configured timers or may suspend or reset an HARQ procedure). For example, a timing advance timer (TAT) indicating the validity of signal synchronization between the UE and the base station may be considered as suspended or expired. In another method, if the UE receives the configuration information or the indicator, the UE may perform a MAC partial reset procedure (or in case that an indicator indicating a MAC partial reset procedure is included in a message including the configuration information or the indicator, the UE may perform a MAC partial reset procedure).

For example, the TAT indicating the validity of signal synchronization between the UE and the base station may be continuously maintained, or HARQ retransmission in retransmission may be continuously performed. In another method, the UE may not perform any procedure on the MAC layer device and may maintain a current configuration. Also, in the above case, if an indication to trigger a random access procedure is indicated from a higher layer device (e.g., RRC layer device), or the TAT is suspended or expired, the UE may trigger a random access procedure. In another method, if the TAT is not suspended or expired, the UE may not trigger nor perform a random access procedure. This is because, if the TAT is running, signal synchronization with a SCG is matched or maintained, and thus, the UE does not need to perform an unnecessary random access procedure. As another method, in the above, in case that the base station triggers a random access procedure according to the indication of PDCCH, the UE may trigger a random access procedure, configure or adjust a timing advance (TA) value, or start a TA timer.

In the above, after completing a random access procedure, the UE may resume or activate a SCG, and restart data transmission or reception. In the above, the random access procedure may perform a contention based random access (CBRA) procedure. In another method, in the above, when performing a random access procedure, if random access configuration information (dedicated RACH config or dedicated preamble) indicated in the message indicating activation or resumption of a cell group (or previously received message) is configured (or included), the UE may perform a CFRA procedure, or if the random access configuration information (dedicated RACH config or dedicated preamble) indicated in the message indicating activation or resumption of a cell group (or previously received message) is not configured (or not included), the UE may perform a CBRA procedure or may not perform a random access procedure.

2> An Operation for data radio bearer (DRB) configured for SCG: If the UE receives the configuration information or the indicator, the UE may resume DRBs (or SN(SCG) terminated DRBs, or DRBs with a PDCP layer device configured for SCG) included in a SCG. For example, for a split bearer with a PDCP layer device configured for an MCG (bearer for which one RLC layer device is configured for MCG and another RLC layer device is configured for SC)), an indicator (reestablishRLC) to trigger a procedure of reestablishing a RLC layer device configured for SCG may also be included in the RRC message including the configuration information or the indicator, and alternatively, the UE may perform a reestablishment procedure on a RLC layer device configured for SCG For example, for a split bearer with a PDCP layer device configured for SCG (bearer for which one RLC layer device is configured for MCG and another RLC layer device is configured for SCG), an indicator (reestablishRLC) to trigger a procedure of reestablishing a RLC layer device configured for MCG may also be included in the RRC message including the configuration information or the indicator, or an indicator to trigger a PDCP reestablishment procedure (reestablishPDCP) or a PDCP resume procedure (PDCP resume) in a PDCP layer device configured for SCG may also be included in the RRC message, and alternatively, the UE may perform a reestablishment procedure on a RLC layer device configured for MCG, or may perform a PDCP reestablishment procedure or a PDCP resume procedure (PDCP resume) in a PDCP layer device configured for SCG. For example, for a bearer configured for SCG, the UE may resume bearers, or may indicate an RRC layer device to trigger a PDCP reestablishment procedure or a PDCP resume procedure in a PDCP layer device, or may perform a PDCP reestablishment procedure or a PDCP resume procedure (PDCP resume) in a PDCP layer.

In the above, the UE may trigger a first PDCP resume procedure for bearers configured for SCG, or may perform a first PDCP resume procedure in a PDCP layer device. In another method, in order to solve a security issue problem which occurs when different data are transmitted with the same security key when SCG is activated or resumed, the UE may trigger a second PDCP resume procedure for bearers configured in SCG, or a second PDCP resume procedure may be performed in a PDCP layer device. In another method, in case that a PDCP layer device resume procedure is triggered in a higher layer device, a first PDCP resume procedure may be triggered and performed, and the resume procedure of a PDCP layer device is triggered in a higher layer device or an indicator to activate or resume a cell group (or cell) is indicated, a second PDCP resume procedure may be triggered and performed.

In another method, in the above, in order to solve a security issue problem occurring when different data are transmitted with the same security key, in case that the base station indicates an indicator to activate or resume a cell group (or cell), a new security key including security key configuration information (e.g., sk-counter) may be configured in the RRC message including an indicator to activate or resume a cell group (or cell), and the security key may be changed or updated, or a PDCP reestablishment procedure indicator is included in the RRC message to change or update a security key of bearers configured for SCG, or the UE may perform a PDCP reestablishment procedure on the bearers. In another method, in case that the security configuration information is included in the above message including the indication to resume or activate the cell group, or the security configuration information change (or update) is indicated, or an indicator to indicate a first PDCP resume procedure is included, the UE may trigger a first PDCP resume procedure for the bearers configured for SCG or may perform a first PDCP resume procedure in a PDCP layer device.

However, in case that the security configuration information is not included in the above message including indication to resume or activate the cell group, or security configuration information change (or update) is not indicated, or an indicator to indicate a second PDCP resume procedure is included, the UE may trigger a second PDCP resume procedure for the bearers configured for SCG or may perform a second PDCP resume procedure in a PDCP layer device, in order to solve a security issue problem which occurs when different data are transmitted with the same security key when SCG is activated or resumed. The above provided methods may be performed when a message including an indication to suspend or deactivate a cell group is received. In addition, the above provided methods may be applied to SCG bearers (bearers having a PDCP layer device in SCG, or SCG terminated bearer).

2> An Operation for signaling radio bearer (SRB) configured for SCG: If the UE receives the configuration information or the indicator and activates a PSCell, or an activated DL BWP of PSCell is a normal BWP other than a dormant BWP, or an activated PSCell monitors PDCCH with a long cycle based on first DRX configuration information, SRBs (or SN (SCG) terminated SRBs, or SRBs or SRB3s with a PDCP layer configured for SCG) included in SCG may be continuously maintained (e.g., the UE may continuously transmit or receive a control message to or from a secondary BS).

Alternatively, in order to discard a plurality of pieces of old data (e.g., PDCP SDU or PDCP PDU) stored in the SRBs configured for SCG, the UE may perform a data discard procedure (e.g., a discard indication to a PDCP layer device or an RLC layer reestablishment procedure). In another method, if the UE receives the configuration information or the indicator, the UE may resume SRBs (or SN (SCG) terminated SRBs, or SRBs or SRB3s with a PDCP layer device configured for SCG) included in SCG. Also, in order to discard a plurality of pieces of old data (e.g., PDCP SDU or PDCP PDU) stored in the SRBs configured for SCG, the UE may perform a data discard procedure (e.g., a discard indication to a PDCP layer device or an RLC layer reestablishment procedure).

For example, fora split bearer (bearer via which one RLC layer device is configured for MCG and another RLC layer device is configured for SCG) with a PDCP layer device configured for MCG, an indicator (reestablishRLC) to trigger a procedure of reestablishing a RLC layer device configured for SCG may also be included in the RRC message including the configuration information or the indicator, or alternatively, the UE may perform a reestablishment procedure on a RLC layer device configured for SCG. For example, for a split bearer (bearer via which one RLC layer device is configured for MCG and another RLC layer device is configured for SCG) with a PDCP layer configured for SCG, an indicator (reestablishRLC) to trigger a procedure of reestablishing a RLC layer device configured for MCG may also be included, or an indicator to trigger a PDCP reestablishment procedure (reestablishPDCP) or a PDCP resume procedure (PDCP resume) in a PDCP layer device configured for SCG may also be included in the message, or alternatively, the UE may perform a reestablishment procedure on a RLC layer device configured for MCG, or may perform a PDCP reestablishment procedure or a PDCP resume procedure (PDCP resume) in a PDCP layer device configured for SCG.

For example, for a bearer configured for SCG, the UE may resume bearers, or may indicate an RRC layer device to trigger a PDCP reestablishment procedure or a PDCP resume procedure in a PDCP layer device, or may perform a PDCP reestablishment procedure or a PDCP resume procedure (PDCP resume) in a PCP layer device. In the above case, the UE may trigger a first PDCP resume procedure for bearers configured for SCG, or may perform a first PDCP resume procedure in a PDCP layer device. In another method, in order to solve a security issue problem occurring when different data are transmitted with the same security key when SCG is activated or resumed, the UE may trigger a second PDCP resume procedure for bearers configured for SCG, or may perform a second PDCP resume procedure in a PDCP layer device. In another method, in case that a PDCP layer device resume procedure is triggered in a higher layer device, a first PDCP resume procedure may be triggered and performed, and in case that a PDCP layer device resume procedure is triggered in a higher layer device or an indicator to activate or resume a cell group (or cell) is indicated, a second PDCP resume procedure may be triggered and performed.

In another method, in order to solve a security issue problem occurring when different data are transmitted with the same security key, in case that the base station indicates an indicator to activate or resume a cell group (or cell), security key configuration information (e.g., sk-counter) is included in an RRC message including the indication to resume or activate the cell group (or cell) to configure a new security key, a security key may be changed or updated, or a PDCP reestablishment procedure indicator may be included in the RRC message to change or update a security key of bearers configured for SCG, or the UE may perform a PDCP reestablishment procedure on bearers.

In another method, in case that security configuration information is included in the message including an indication to resume or activate a cell group, or security configuration information change (or update) is indicated, or an indicator indicating a first PDCP resume procedure is included, the UE may trigger a first PDCP resume procedure for bearers configured for SCG, or may perform a first PDCP resume procedure in a PDCP layer device. However, in case that the security configuration information is not included in the message including an indication to resume or activate a cell group, or security configuration information change (or update) is not indicated, or an indicator to indicate a second PDCP resume procedure is included, the UE may trigger a second PDCP resume procedure for bearers configured for SCG or may perform a second PDCP resume procedure in a PDCP layer device, in order to solve a security issue problem which occurs when different data are transmitted with the same security key when SCG is activated or resumed. The above provided methods may be performed when a message including an indication to suspend or deactivate a cell group is received. In addition, the above provided methods may be applied to SCG bearers (bearers having the PDCP layer device in SCG, or SCG terminated bearer).

2> A UE operation for PUCCH SCell of SCG. If the UE receives the configuration information or the indicator, the UE may activate a PUCCH SCell of SCG, may activate a DL BWP or a UL BWP to a BWP (e.g., first active BWP) configured in an RRC message, and may perform a UE operation of an activated SCell or BWP. In another method, if the UE receives the configuration information or the indicator, in case that a dormant BWP is configured for the PUCCH SCell of SCG, the UE may maintain the SCell in an active state, may activate a DL BWP of the SCell to a BWP (e.g., first active BWP) configured in the RRC message, and may perform a UE operation in an activated BWP, and alternatively, in case that a dormant BWP is not configured for the SCell of SCG, the UE may switch the SCell to an active state, may activate a DL BWP or a UL BWP to a BWP (e.g., first active BWP) configured in the RRC message, and may perform a UE operation of the activated SCell or BWP. In another method, if the UE receives the configuration information or the indicator, the UE may determine switching or activation or deactivation of a BWP or a state of the SCell according to SCell configuration information or an indicator configured in a message including the configuration information or the indicator and may perform a UE operation. In another method, if the UE receives the configuration information or the indicator, the UE may apply, to the PUCCH SCell, first DRX configuration information (e.g., second DRX configuration information is suspended and first DRX configuration information is reconfigured) configured in an RRC message, and may perform a UE operation in an activated SCell when PDCCH monitoring is possible.

2> The UE may transmit an indicator that a cell group (e.g., SCG) or a cell has been configured, added, activated, resumed, modified, or reconfigured to MCG or SCG, and the UE may transmit the indicator to SCG (or base station) or MCG (or base station) via a physical signal (e.g., HARQ ACK or NACK or a new transmission resource), or MAC control information, or an RRC message.

2> If the UE receives an indication to resume, activate, or add a cell group (e.g., SCG) or a cell, the UE may trigger PDCP state reporting in a PDCP layer device for configured SCG bearers, or bearers connected to a SCG RLC layer device, or SCG split bearers, or MCG bearers, or MCG split bearers, and may report the triggered PDCP state reporting to the base station. This is because, by transmitting the PDCP state reporting, the state of lost data or window variables between the UE and the base station can be identified so that synchronization between a transmission window or a reception window can be achieved.

1> If the UE receives configuration information or an indicator (e.g., via DCI of a PDCCH or MAC control information or an RRC message) for releasing or deactivating or reconfiguring or suspending dual connectivity or a cell group (e.g., SCG) or a cell, the UE may perform at least some of the following procedures.

2> A higher layer device (e.g., RRC layer device) may indicate the configuration information or the indicator to a lower layer device (e.g., PDCP layer device or RLC layer device or MAC layer device or PHY layer device).

2> A UE operation for PSCell: If the UE receives the configuration information or the indicator, the UE may maintain a PSCell in an active state, may activate a DL BWP of the PSCell to a dormant BWP configured in an RRC message, and may perform a UE operation in a dormant BWP. In another method, if the UE receives the configuration information or the indicator, the UE may maintain a PSCell in an active state, may reconfigure or switch a PDCCH monitoring cycle or a DRX configuration cycle of the PSCell to a very long cycle based on second DRX configuration information, and may perform PDCCH monitoring and perform a UE operation of an active cell. In another method, if the UE receives the configuration information or the indicator, the UE may deactivate the PSCell and may perform a UE operation of an inactive cell. By using the above method, the UE may perform a UE operation for the PSCell, thereby reducing power consumption of the UE.

2> A UE operation for SCell of SCG If the UE receives the configuration information or the indicator, the UE may deactivate an SCell of SCG, and may perform a UE operation of a deactivated SCell. In another method, if the UE receives the configuration information or the indicator, in case that a dormant BWP is configured for a SCell of SCG, the UE may maintain the SCell in an active state, may activate a DL BWP of the SCell to a dormant BWP, and may perform a UE operation in a dormant BWP, or alternatively, in case that a dormant BWP is not configured for the SCell of SCG, the UE may switch the SCell to an inactive state, and may perform a UE operation in a deactivated cell or BWP. In another method, if the UE receives the configuration information or the indicator, the UE may determine switching or activation or deactivation of a BWP or a state of the SCell according to SCell configuration information or an indicator configured in a message including the configuration information or the indicator, and may perform a UE operation.

2> A UE operation of MAC layer device for SCG: If the UE receives the configuration information or the indicator, the UE may perform a MAC reset procedure on a MAC layer device (e.g., the UE may reset or release a plurality of pieces of configuration information configured in a MAC layer device, or may suspend or reset configured timers, or may suspend or reset an HARQ procedure). For example, a TAT (Timing Advance Timer) indicating the validity of signal synchronization between the UE and the base station may be considered as suspended or expired. In another method, in order to prevent data loss due to the reset procedure of the MAC layer device, if the UE receives the configuration information or the indicator, the UE may perform a MAC partial reset procedure (or in case that an indicator indicating a MAC partial reset procedure is included in the message including the configuration information or the indicator, the UE may perform the MAC partial reset procedure).

For example, a TAT (Timing Advance Timer) indicating the validity of signal synchronization between the UE and the base station may be continuously maintained, or HARQ retransmission in retransmission may be continuously performed. In another method, the UE may not perform any procedure on the MAC layer device and may maintain a current configuration. In the case of continuously maintaining the TAT, if the TAT expires, the UE may perform a random access procedure to re-adjust or configure the timing advance (TA) even if SCG is suspended or deactivated. In the above, when the UE performs a random access procedure, the UE may indicate to the base station that it was a random access procedure for adjusting the TA with an indicator (e.g., the UE may include a buffer state report (MAC control information) in the indicator and transmit the indicator, or may indicate that there is no data to transmit, or may introduce a new indicator), or the base station may transmit a message including an indication to suspend or deactivate a cell group again to the UE after completing a random access procedure, or the UE may maintain a cell group in a suspended or deactivated state after completing a random access procedure (as another method, the cell group may be maintained in a suspended or deactivated state by itself without an indication from the base station). In another method, in case that the TAT is continuously maintained in the above, if the TAT expires, the UE may trigger a random access procedure (for TA adjustment or reconfiguration) for MCG or SCG via a cell (PCell or Scell or PSCell) because the base station also drives the same TAT, or the base station may transmit an indicator to resume or activate a cell group to the UE.

2> An Operation for DRB configured for SCG: If The UE receives the configuration information or the indicator, the UE may suspend DRBs (or SN(SCG) terminated DRBs, or DRBs with a PDCP layer device configured for SCG) included in SCG. For example, for a split bearer with a PDCP layer device configured for MCG (bearer for which one RLC layer device is configured for MCG and another RLC layer device is configured for SCG), an indicator (reestablishRLC) to trigger a procedure of reestablishing a RLC layer device configured for SCG may also be included in the RRC message including the configuration information or the indicator, or, alternatively, an indicator to trigger a PDCP data recovery procedure (PDCP data recovery) in the PDCP layer configured for MCG may also be included in the message, or the UE may perform a reestablishment procedure on the RLC layer device configured for SCG, or may perform a PDCP data recovery procedure in the PDCP layer configured for MCG For example, for a split bearer (bearer via which one RLC layer device is configured for MCG and another RLC layer device is configured for SCG) with a PDCP layer device configured for SCG, an indicator (reestablishRLC) to trigger a procedure of reestablishing a RLC layer device configured for MCG may also be included in the RRC message including the configuration information or the indicator, or an indicator to trigger a procedure of reestablishing (reestablishPDCP) or suspending (PDCP suspend) PDCP in a PDCP layer device configured for SCG may also be included in the message, or the UE may perform a reestablishment procedure on the RLC layer device configured for MCG, or the UE may perform a PDCP reestablishment procedure or a PDCP suspend procedure (PDCP suspend) in the PDCP layer device configured for SCG. For example, for a bearer configured for SCG, the UE may suspend bearers, or may indicate an RRC layer device to trigger a PDCP reestablishment procedure or a PDCP suspend procedure in a PDCP layer device, or may perform a PDCP reestablishment procedure or a PDCP suspend procedure (PDCP suspend) in a PDCP layer device.

In the above, the UE may trigger a first PDCP suspend procedure for the bearers configured for SCG, or may perform a first PDCP suspend procedure in a PDCP layer device. In another method, in order to solve a security issue problem which occurs when different data are transmitted with the same security key when SCG is activated or resumed, the UE may trigger a second PDCP suspend procedure for the bearers configured for SCG, or a second PDCP suspend procedure may be performed in a PDCP layer device. In another method, in case that a PDCP layer device suspend procedure is triggered in a higher layer device, a first PDCP suspend procedure may be triggered and performed, and in case that a PDCP layer suspend procedure is triggered or an indicator to activate or resume a cell group (or cell) is indicated in a higher layer device, a second PDCP suspend procedure may be triggered and performed. In another method, in case that security configuration information is included in the message including an indication to suspend or deactivate a cell group, or security configuration information change (or update) is indicated, or an indicator for indication of a first PDCP suspend procedure is included, the UE may trigger a first PDCP suspend procedure for bearers configured for SCG or may perform a first PDCP suspend procedure in a PDCP layer device.

However, in case that security configuration information is not included in the message including an indication to suspend or deactivate a cell group, or security configuration information change (or update) is not indicated, or an indicator for indication of a second PDCP suspend procedure is included, in order to solve a security issue problem which occurs when different data are transmitted with the same security key when SCG is activated or resumed, the UE may trigger a second PDCP suspend procedure for the bearers configured for SCG, or a second PDCP suspend procedure may be performed in a PDCP layer device. The above provided methods may be performed when a message including an indication to resume or activate a cell group is received. In addition, the above provided methods may be applied to SCG bearers (bearers having a PDCP layer device in SCG, or SCG terminated bearer)

2> An Operation for signaling radio bearer (SRB) configured for SCG: If the UE receives the configuration information or the indicator and activates a PSCell, or an activated DL BWP of the PSCell is a normal BWP other than a dormant BWP, or an activated PSCell monitors PDCCH with a long cycle based on second DRX configuration information, SRBs (or SN(SCG) terminated SRBs, or SRBs or SRB3s with a PDCP layer device configured for SCG) included in SCG may not be suspended but may be continuously maintained (e.g., the UE may continuously transmit or receive a control message to or from a secondary BS). Also, in order to discard a plurality of pieces of old data (e.g., PDCP SDU or PDCP PDU) stored in the SRBs configured for SCG, the UE may perform a data discard procedure (e.g., a discard indication to a PDCP layer device or an RLC layer reestablishment procedure). In another method, if the UE receives the configuration information or the indicator, the UE may suspend SRBs (or SN(SCG) terminated SRBs, or SRBs or SRB3s with a PDCP layer device configured for SCG) included in SCG.

Alternatively, in order to discard a plurality of pieces of old data (e.g., PDCP SDU or PDCP PDU) stored in the SRBs configured for SCG, the UE may perform a data discard procedure (e.g., a discard indication to a PDCP layer device or an RLC layer reestablishment procedure). For example, for a split SRB bearer (bearer via which one RLC layer device is configured for MCG and another RLC layer device is configured for SCG) with a PDCP layer device configured for MCG, an indicator (reestablishRLC) to trigger a procedure of reestablishing the RLC layer device configured for SCG may also be included in the RRC message including the configuration information or the indicator, or an indicator to trigger a PDCP data recovery procedure (PDCP data recovery) in the PDCP layer device configured for MCG may also be included in the RRC message, or the UE may perform a reestablishment procedure on the RLC layer device configured for SCG, or may perform a PDCP data recovery procedure in the PDCP layer device configured for MCG. For example, for a split bearer (bearer via which one RLC layer device is configured for MCG and another RLC layer device is configured for SCG) with a PDCP layer device configured for SCG, an indicator (reestablishRLC) to trigger a procedure of reestablishing the RLC layer device configured for MCG may also be included in the RRC message including the configuration information or the indicator, or an indicator to trigger a PDCP reestablishment procedure (reestablishPDCP) or a PDCP suspend procedure (PDCP suspend) in the PDCP layer device configured for SCG may also be included in the RRC message, or the UE may perform a reestablishment procedure on the RLC layer device configured for MCG, or may perform a PDCP reestablishment procedure or a PDCP suspend procedure (PDCP suspend) in the PDCP layer device configured for SCG.

For example, for a bearer configured for SCG, the UE may suspend bearers, or may indicate an RRC layer device to trigger a PDCP reestablishment procedure or a PDCP suspend procedure in a PDCP layer device, or may perform the PDCP reestablishment procedure or the PDCP suspend procedure (PDCP suspend) in the PDCP layer device. In the above, the UE may trigger a first DPCP suspend procedure for bearers configured for SCG, or may perform a first PDCP suspend procedure in the PDCP layer device. In another method, in order to solve a security issue problem occurring when different data are transmitted with the same security key when the SCG is activated or resumed, the UE may trigger a second PDCP suspend procedure for bearers configured for SCG, or may perform a second PDCP suspend procedure in the PDCP layer device. In another method, in case that a PDCP layer suspend procedure is triggered in a higher layer device, a first PDCP suspend procedure may be triggered and performed, and in case that a PDCP layer device suspend procedure is triggered in a higher layer device or an indicator to deactivate or suspend a cell group (or cell) is indicated, a second PDCP suspend procedure may be triggered and performed.

In another method, in case that security configuration information is included in the message including an indication to suspend or deactivate a cell group, security configuration information change (or update) is indicated, or an indication to indicate a first PDCP suspend procedure is included, the UE may trigger a first PDCP suspend procedure for the bearers configured for SCG or may perform a first PDCP suspend procedure in the PDCP layer device.

However, in case that security configuration information is not included in the message including an indication to suspend or deactivate a cell group, or security configuration information change (or update) is not indicated, or an indicator for indication of a second PDCP suspend procedure is included, in order to solve a security issue problem which occurs when different data are transmitted with the same security key when SCG is activated or resumed, the UE may trigger a second PDCP suspend procedure for the bearers configured for SCG, or a second PDCP suspend procedure may be performed in the PDCP layer device. The above provided methods may be performed when a message including an indication to resume or activate a cell group is received. In addition, the above provided methods may be applied to SCG bearers (bearers having a PDCP layer device in SCG, or SCG terminated bearer).

2> An UE operation for PUCCH SCell of SCG: If the UE receives the configuration information or the indicator, the UE may deactivate a PUCCH SCell of SCG, and may perform a UE operation of the deactivated SCell. In another method, if the UE receives the configuration information or the indicator, in case that a dormant BWP is configured for the PUCCH SCell of SCG, the UE may maintain the SCell in an active state, may activate a DL BWP of the SCell to a dormant BWP, and may perform a UE operation in a dormant BWP, or alternatively, in case that a dormant BWP is not configured for the PUCCH SCell of SCG, the UE may switch the SCell to an inactive state, and may perform a UE operation in a deactivated cell or BWP. In another method, if the UE receives the configuration information or the indicator, the UE may determine switching or activation or deactivation of a BWP or a state of the SCell according to the SCell configuration information or indicator configured in the message including the configuration information or the indicator and may perform a UE operation. In another method, if the UE receives the configuration information or the indicator, the UE may apply, to the PUCCH SCell, second DRX configuration information configured in an RRC message, and may perform a UE operation in an activated SCell if it is possible to perform PDCCH monitoring based on a long cycle.

2> The UE may transmit an indicator that a cell group (e.g., secondary cell group) or cell has been suspended, deactivated, released, or modified in the above to MCG or SCG, and the UE may transmit the indicator to SCG (or base station) or MCG (or base station) via a physical signal (e.g., HARQ ACK or NACK or a new transmission resource), MAC control information, or an RRC message.

2> If the UE receives an indication to suspend, deactivate, or release a cell group (e.g., SCG) or a cell, the UE may trigger PDCP state reporting in a PDCP layer device for configured SCG bearers, or bearers connected to a SCG RLC layer device, or SCG split bearers, or MCG bearers, or MCG split bearers, and may report the triggered PDCP state to the base station. This is because, by transmitting the PDCP state reporting, the state of lost data or window variables between the UE and the base station can be identified so that synchronization between a transmission window or a reception window can be achieved.

Partial reset of a MAC layer device according to the disclosure may include one or more UE operations from among the following procedures.

The UE may perform an operation of flushing the remaining HARQ processes (i.e., general HARQ process or HARQ process for system information, etc.) except for an HARQ process for MBS from among HARQ processes configured in a serving cell, and after handover completion or after RRC state mode transition (to an RRC inactive mode or an RRC idle mode), the HARQ process for MBS may be emptied (flushed) or released (flushed) or reset (flushed), otherwise flushing may be omitted.

In case of flushing operation, or after handover completion, or after RRC state mode transition (to an RRC inactive mode or an RRC idle mode), at the time when MBS service reception becomes possible in a target base station (BS) or when G-RNTI monitoring starts, data of the HARQ process related to an MBS may be flushed. Alternatively, until handover is completed or until RRC state mode transition (to an RRC inactive mode or an RRC idle mode) is completed, data reception through a G-RNTI may be continuously performed. In the case of handover, the UE may perform an operation of monitoring a C-RNTI from a target cell allocated by the target BS via the RRC message. In another method, even before random access is completed from the target BS, the UE may continuously perform data reception through the G-RNTI.

A random access procedure that is being performed, if any, may be suspended.

A specifically configured or indicated preamble identifier, or preamble configuration information, or random access configuration related information (PRACH) configuration information, if any, may be discarded.

A temporary cell identifier (temporary C-RNTI), if any, may be released.

A buffer for message 3 transmission may be flushed.

All new data indicators for an HARQ process for a UL may be configured as 0.

When a UL DRX retransmission timer running for an UL is running, the UL DRX retransmission timer may be suspended When all UL HARQ related timers are running, the UL HARQ related timers may be suspended.

In the above, when a reset procedure of a MAC layer device is performed, or when a partial reset procedure indicator of the MAC layer device is not included, not indicated, or not performed, the UE may perform the entire reset procedure of the MAC layer device, and thus the UE may flush all of the configured general HARQ process, HARQ process for MBS, or HARQ process for system information.

A first PDCP suspension (resume) procedure provided in the disclosure may include one or more UE operations from among the following procedures.

A transmission PDCP layer device of the UE may reset a transmission window variable or may configure the transmission window variable as an initial value, or may discard stored data (e.g., PDCP PDU or PDCP SDU). In another method, in order to prevent data loss, the transmission PDCP layer device of the UE may discard only the PDCP PDU. This is a procedure for preventing old data from being transmitted or retransmitted when a SCG is activated or resumed at a later time.

If a reordering timer (t-reordering) (timer for arranging data in an ascending order based on PDCP sequence numbers or count values) is running, a reception PDCP layer device of the UE may stop or initialize the reordering timer. Alternatively, the reception PDCP layer device of the UE may perform a header decompression procedure on stored data (e.g., PDCP SDU), and may transmit the data to a higher layer device in an ascending order of count values. The reception PDCP layer device of the UE may reset a reception window variable or may configure the reception window variable as an initial value.

A second PDCP suspension (or resume) procedure provided in the disclosure may include one or more UE operations from among the following procedures.

A transmission PDCP layer device of a UE may maintain a variable value without initializing a transmission window variable, or without configuring the transmission window variable as an initial value. The reason why the variable value (e.g., count value) is maintained is to solve a security issue problem occurring when different data are transmitted with the same security key (e.g., count value) when a SCG is activated or resumed. In the above, the transmission PDCP layer device of the UE may discard stored data (e.g., PDCP PDU or PDCP SDU). In another method, in order to prevent data loss, the transmission PDCP layer device of the UE may discard only the PDCP PDU. This is a procedure for preventing old data from being transmitted or retransmitted when the SCG is activated or resumed at a later time. In another method, the transmission PDCP layer device may store the values of the transmission window variables and initialize (e.g., configured to 0) the window variables.

In addition, when resuming or activating a cell group, if the security configuration information is changed, or the security configuration information is included in the message indicating resume or activation of the cell group, or the security key change is indicated, the above initialized window variables can be used. Alternatively, when resuming or activating the cell group, if the security configuration information is not changed, or if the security configuration information is not included in the message indicating the resumption or activation of the cell group, or if the security key change is not indicated, the above stored values of the transmission window variables are again restored, or the values of the transmission window variables are configured with the stored values of the transmission window variables, or reconfigured or initialized to be used.

If a reordering timer (t-reordering) (timer for arranging data in an ascending order based on PDCP sequence numbers or count values) is running, a reception PDCP layer device of the UE may suspend or initialize the reordering timer. Alternatively, the reception PDCP layer device of the UE may perform a header decompression procedure on stored data (e.g., PDCP SDU), and may transmit the data to a higher layer device in an ascending order of count values. The reception PDCP layer of the UE may maintain a variable value without initializing a reception window variable or without configure the reception window variable as an initial value. The reason why the variable value (e.g., count value) is maintained is to solve a security issue problem occurring when different data are transmitted with the same security key (e.g., count value) when the SCG is activated or resumed.

In another method, in order not to directly trigger the reordering timer even without a count value or a PDCP sequence number gap when a SCG is activated or resumed or data is received, the UE may configure or update an RX_NEXT window variable (variable indicating a count value of data expected to be received next) to a value of an RX_DELIV window variable (variable indicating a count value corresponding to next data of data transmitted to a higher layer device) or to a count value of data first received by the UE. In another method, in case that a reordering timer value is configured in the message or an indicator is received from a higher layer device, the UE may configure or update an RX_REORD window variable (variable indicating a count value of next data of data triggering the reordering timer) to a variable value of an RX_NEXT window variable value, or may suspend or restart the reordering timer.

In another method, the reception PDCP layer device may store the values of the reception window variables and initialize (e.g., configured to 0) the window variables. In addition, when a cell group is resumed or activated, if the security configuration information is changed, or if the security configuration information is included in the message indicating the resumption or activation of the cell group, or if the security key change is indicated, the initialized window variables may be used. Alternatively, when a cell group is resumed or activated, if the security configuration information is not changed, or if the security configuration information is not included in the message indicating the resumption or activation of the cell group, or if the security key change is not indicated, the stored values of the reception window variables are again restored, or the values of the reception window variables are configured with the stored values of the reception window variables, or reconfigured, or initialized to be used.

In the above, when the UE receives configuration information or an indicator for releasing or deactivating or reconfiguring or suspending dual connectivity or a cell group (e.g., SCG) or a cell (e.g., via DCI of a PDCCH or MAC control information or an RRC message) and the UE performs the above UE operations, if data to be transmitted via a UL occurs or is generated, the UE may transmit a scheduling request (SR) or MAC control information (or indicator or the amount of buffer or a buffer state report) in a transmission resource of the PUCCH configured in an RRC message to a master BS or a secondary BS to request a UL transmission resource or to request to configure or add or activate or resume or modify or reconfigure dual connectivity or a cell group (e.g., SCG) or a cell in another method, when the UE receives configuration information or an indicator for releasing or deactivating or reconfiguring or suspending dual connectivity or a cell group (e.g., SCG) or a cell (e.g., via DCI of a PDCCH or MAC control information or an RRC message), and when the UE performs the above UE operations, if data to be transmitted via a UL occurs or is generated, the UE may generate an RRC message and may transmit the RRC message to a master BS or a secondary BS to request a UL transport resource or to request to configure or add or activate or resume or modify or reconfigure dual connectivity or a cell group (e.g., SCG) or a cell.

The procedures provided in the disclosure may be extended to a multiple access technology. For example, configuration information of a plurality of cell groups may be configured in a UE via an RRC message, and one or more cell groups (or cells) from among the configured plurality of cell groups may be activated or resumed via an indicator of a PDCCH or MAC control information or an RRC message, or one or more cell groups may be suspended or deactivated.

Hereinafter, the disclosure proposes UE operations of the UE to activate or resume a cell group or a cell, in response to generation or occurrence of UL data with respect to a SCG (or bearers that belong to the SCG) when the SCG or a PSCell of the SCG is deactivated or suspended due to a deactivation or suspend procedure of the cell group or the cell, which is provided in the disclosure.

As provided in the disclosure, when the SCG or the cell is deactivated or suspended, the UE cannot transmit or receive data, and thus, if UL data of the UE is generated in the SCG (or bearers that belong to the SCG), it is required to activate or resume the SCG or the cell again. In the above, a procedure, by the UE, of requesting a base station (a master BS or a secondary BS) to activate or resume the SCG or the cell again may be performed by one method or a method extended from a combination or application of methods below.

First method: The UE configures a message (e.g., an RRC message) of requesting to activate or resume a SCG or a cell again and transmits the message to a master BS. In the above, upon reception of the message, the master BS may request the secondary BS for a resume procedure as the first signaling procedure of FIG. 1O provided in the disclosure, may receive a response, and may constitute and transmit, to the UE, a message (e.g., an RRC message) of indicating activation or resumption of the SCG again. In another method, as in the second signaling procedure of FIG. 1P, the master BS may constitute and transmit, to the UE, a message (e.g., an RRC message) of indicating activation or resumption of the SCG again, and then, the UE may indicate the secondary BS with the activation or resumption. In another method, as in the third signaling procedure of FIG. 1Q, the UE may constitute and transmit, to the secondary BS via SRB3, a message (e.g., an RRC message) of requesting to activate or resume the SCG or the cell again, and the secondary BS may constitute and transmit, to the UE, a message (e.g., an RRC message) of indicating activation or resumption of the SCG again, and then may indicate the master BS with the activation or resumption.

Second method. The UE constitutes a message (e.g., MAC control information) of requesting to activate or resume the SCG or the cell again and transmits the message to the master BS In the above, upon reception of the message, the master BS may request the secondary BS for a resume procedure as the first signaling procedure of FIG. 1O provided in the disclosure, may receive a response, and may constitute and transmit, to the UE, a message (e.g., an RRC message or MAC control information) of indicating activation or resumption of the SCG again. In another method, as in the second signaling procedure of FIG. 1P, the master BS may configure and transmit, to the UE, a message (e.g., an RRC message or MAC control information) of indicating activation or resumption of the SCG again, and the UE may indicate the secondary BS with the activation or resumption.

In another method, as in the third signaling procedure of FIG. 1Q, the UE may constitute and transmit, to the secondary BS via SRB3, a message (e.g., MAC control information) of requesting to activate or resume the SCG or the cell again, and the secondary BS may constitute and transmit, to the UE, a message (e.g., an RRC message or MAC control information) of indicating activation or resumption of the SCG again, and then may indicate the master BS with the activation or resumption. In the above, when activation or resumption of a cell group is requested or indicated via MAC control information, the MAC control information may be newly defined and designed, and in another method, a new field (or indicator) or a new value (field value or identifier value) may be defined in legacy MAC control information (e.g., buffer state report) to indicate the new field or the new value.

Third method: The UE constitutes a message (e.g., a physical signal of a PHY layer device) of requesting to activate or resume the SCG or the cell again and transmits the message to the master BS. In the above, upon reception of the message, the master BS may request the secondary BS for a resume procedure as the first signaling procedure of FIG. 1O provided in the disclosure, may receive a response, and may constitute and transmit, to the UE, a message (e.g., an RRC message or a physical signal of a PHY layer device) of indicating the activation or resumption of the SCG again. In another method, as in the second signaling procedure of FIG. 1P, the master BS may constitute and transmit, to the UE, a message (e.g., an RRC message or a physical signal of a PHY layer device) of indicating activation or resumption of the SCG again, and the UE may indicate the secondary BS with the activation or resumption. In another method, as in the third signaling procedure of FIG. 1Q, the UE may constitute and transmit, to the secondary BS via SRB3, a message (e.g., a physical signal of a PHY layer device) of requesting to activate or resume the SCG or the cell again, and the secondary BS may constitute and transmit, to the UE, a message (e.g., an RRC message or a physical signal of a PHY layer device) of indicating the activation or resumption of the SCG again, and then may indicate the master BS with the activation or resumption.

In the above, when activation or resumption of the SCG is requested or indicated via a physical signal of a PHY layer device, the physical signal of the PHY layer device may be newly defined and designed as a new transmission resource (e.g., a new SR (scheduling request) transmission resource (e.g., a PUCCH transmission resource of a PCell or PSCell) or a new field of DCI of a PDCCH (a PDCCH transmission resource transmitted from a PSCell or a PCell)), and in another method, a new field (or indicator) may be defined or a new value (field value or identifier value) may be defined in a legacy physical signal of a PHY layer device (e.g., a SR (scheduling request) transmission resource (e.g., a PUCCH transmission resource of a PCell or PSCell) or a field of DCI of a PDCCH (a PDCCH transmission resource transmitted from a PSCell or a PCell)) to indicate the new field or the new value. In another method, when the UE performs PDCCH monitoring with respect to a PSCell of the SCG with a long cycle by applying second DRX configuration information, or when the SCG of the UE is in an inactive state or a suspended state, if the PSCell triggers a random access procedure to the UE via DCI of PDCCH, the UE may interpret the above indication as activation or resumption of the SCG.

In the above, the physical transmission resource may mean a transmission resource for random access, and the UE may perform a random access procedure when UL data for the SCG occurs while the SCG is suspended or deactivated as described above. In another method, when UL data for the SCG occurs while the SCG is suspended or deactivated in the above method, if the SR transmission resource is configured (or a TA timer is running), the SR transmission resource may be transmitted to the MCG or the SCG, and if SR transmission is not configured (or the TA timer expires), a random access procedure may be performed. In the above, the random access procedure may perform a contention based random access (CBRA) procedure. In another method, if the random access configuration information (dedicated RACH config or dedicated preamble) dedicated in the message indicating the suspension or deactivation of the cell group (or previously received message) is configured (or included), the contention free random access (CFRA) procedure may be performed, or if the random access configuration information (dedicated RACH config or dedicated preamble) dedicated in the message indicating the deactivation or suspension of the cell group (or previously received message) is not configured (or included), a contention based random access (CBRA) procedure may be performed.

In the above, the UE may include an indicator (e.g., a buffer state report (MAC control information (or MAC control element)) indicating that UL data has been generated after completing the random access procedure or during the random access procedure, and transmit the indicator to the base station, and when the base station receives the indicator or the random access procedure is completed, the base station (e.g., SCG or master BS) transmits to the UE a message indicating the resumption or activation of the SCG and the UE may resume or activate the SCG and may perform data transmission or data reception again.

As provided in the disclosure, when the UE activates or resumes the cell group (e.g., the SCG) or the cell (e.g., a PSCell), in response to an indicator of a PDCCH or MAC control information or an RRC message, the UE may complete activation or resumption of the cell group or the cell at a first point of time. The first point of time may be configured via an RRC message, as provided above in the disclosure. For example, the RRC message may include time information (e.g., information (e.g., X) to indicate timing, a time unit, a subframe or a time slot or a symbol unit) to indicate when to activate or resume or deactivate or suspend dual connectivity or a cell group (or a SCG) or a cell (a PSCell or a SCG SCell). For example, in the above, when the UE has received PDCCH or MAC control information or an RRC message to indicate to activate or resume or deactivate or suspend the cell group (e.g., the SCG) or the cell (e.g., the PSCell) at an nth time unit, time information to complete activation or resumption or deactivation or suspension of the cell group or the cell may be configured at an n+Xth time unit.

In another method, in the above, the time information (e.g., X) may not be configured by a base station but may be used as a value that is preset and defined and thus fixed. As another example, in the above, when a random access is started (a preamble is transmitted) or a random access is successfully completed at an nth time unit after the PDCCH or the MAC control information or the RRC message to indicate to activate or resume or deactivate or suspend the cell group (e.g., the SCG) or the cell (e.g., the PSCell) is received, time information to complete activation or resumption or deactivation or suspension of the cell group or the cell may be configured at an n+Xth time unit. In another method, in the above, the time information (e.g., X) may not be configured by the base station but may be used as a value that is preset and defined and thus fixed. In the above, when activation or suspension or deactivation or resumption of the cell group or the cell is completed, the UE may perform UE operations according to a state (e.g., activation or hibernation or deactivation) of each cell or BWP, which is provided in the disclosure. Also, in the above, when activation or resumption of the cell group or the cell is completed, a DRX operation of the UE may be started or restarted, or in the above, when deactivation or suspension of the cell group or the cell is completed, the DRX operation of the UE may be suspended or deactivated.

Also, as provided above in the disclosure, when the UE activates a cell (e.g., PSCell or SCell) of a cell group (e.g., MCG or SCG), in response to an indication of MAC control information, activation of the cell may be completed at a second point of time. The second point of time may be configured via an RRC message, as provided above in the disclosure. For example, the RRC message may include time information (e.g., information (e.g., X) to indicate timing, a time unit, a subframe or a time slot or a symbol unit) to indicate when to activate or deactivate carrier aggregation or dual connectivity or a cell group (or MCG or SCG) or a cell (an MCG SCell or a SCG SCell).

For example, in the above, when the UE has received MAC control information to indicate to activate or deactivate a cell (e.g., SCell) at an nth time unit, time information to complete activation or deactivation of the cell may be configured at an n+Xth time unit. In another method, in the above, the time information (e.g., X) may not be configured by the base station but may be used as a value that is preset and defined and thus fixed. As another example, in the above, when a random access is started (a preamble is transmitted) or a random access is successfully completed at an nth time unit after the MAC control information to indicate to activate or deactivate the cell (e.g., the SCell or the PSCell) is received, time information to complete activation or deactivation of the cell may be configured at an n+Xth time unit.

In another method, in the above, the time information (e.g., X) may not be configured by the base station but may be used as a value that is preset and defined and thus fixed. In the above, when activation or suspension or deactivation or resumption of the cell group or the cell is completed, the UE may perform UE operations according to a state (e.g., activation or hibernation or deactivation) of each cell or BWP, which is provided in the disclosure. Also, in the above, when activation or resumption of the cell group or the cell is completed, a DRX operation of the UE may be started or restarted, or in the above, when deactivation or suspension of the cell group or the cell is completed, the DRX operation of the UE may be suspended or deactivated.

Also, as provided above in the disclosure, when the UE activates a cell (e.g., PSCell or SCell) of a cell group (e.g., MCG or SCG), in response to an indication of an RRC message, activation of the cell may be completed at a third point of time. The third point of time may be configured via an RRC message, as provided above in the disclosure. For example, the RRC message may include time information (e.g., information (e.g., X) to indicate timing, a time unit, a subframe or a time slot or a symbol unit) to indicate when to activate or deactivate carrier aggregation or dual connectivity or a cell group (or MCG or SCG) or a cell (an MCG SCell or a SCG SCell or a PSCell).

For example, in the above, when the UE has received an RRC message to indicate to activate or deactivate a cell (e.g., SCell) at an nth time unit, time information to complete activation or deactivation of the cell may be configured at an n+Xth time unit. In another method, in the above, the time information (e.g., X) may not be configured by the base station but may be used as a value that is preset and defined and thus fixed. As another example, in the above, when a random access is started (a preamble is transmitted) or a random access is successfully completed at an nth time unit after the RRC message to indicate to activate or deactivate the cell (e.g., the SCell or the PSCell) is received, time information to complete activation or deactivation of the cell may be configured at an n+Xth time unit. In another method, in the above, the time information (e.g., X) may not be configured by the base station but may be used as a value that is preset and defined and thus fixed. In the above, X may be configured or preset, based on a slot number, or may be configured or preset, based on a shortest slot length from among preset PCells or PSCells or SCells.

In the above, when activation or suspension or deactivation or resumption of the cell group or the cell is completed, the UE may perform UE operations according to a state (e.g., activation or hibernation or deactivation) of each cell or BWP, which is provided in the disclosure. Also, in the above, when activation or resumption of the cell group or the cell is completed, a DRX operation of the UE may be started or restarted, or in the above, when deactivation or suspension of the cell group or the cell is completed, the DRX operation of the UE may be suspended or deactivated.

A concept of a cell group which is provided in the disclosure may be extended to a subcell group. For example, in the disclosure, in order to configure dual connectivity for a UE, a first cell group and a second cell group are configured and applied as an MCG and a SCG, such that the dual connectivity may be configured and thus the UE can perform data transmission or reception to or from two base stations. However, if the concept of the cell group is extended to a subcell group, a plurality of subcell groups of the cell group may be configured for a UE connected with one base station, or subcell group identifiers may be respectively configured for the subcell groups. Then, the UE performs data transmission or reception with respect to one base station, but the UE may extend and apply an activation or suspension or resumption or deactivation procedure to different frequencies or cells for each of subcell groups, in response to PDCCH or MAC control information or an RRC message, which is provided in the disclosure.

For example, when the UE performs communication with one base station and a plurality of frequencies or cells, the base station may configure the UE with a plurality of subcell groups with respect to a plurality of frequencies or cells of the base station, which correspond to the cell group (MCG), so as to allow the UE to apply carrier aggregation, and may define fields, which are respectively indicating the subcell groups, in PDCCH or MAC control information or an RRC message, to indicate activation or deactivation or suspension or resumption of each subcell group. Then, the UE may apply an activation or suspension or resumption or deactivation procedure to different frequencies or cells for each of the subcell groups, in response to PDCCH or MAC control information or an RRC message, which is provided in the disclosure. In another method, a subcell group provided above may be implemented by introducing DL or UL logical channel restriction with respect to each cell.

For example, an RRC message may include configuration information to restrict logical channels, which belong to one cell group, to transmit or receive data only for a particular frequency or cell and may be configured in the JE. As described above, logical channels (e.g., logical channel identifiers) may be configured by mapping them to each cell or frequency, and thus may be grouped to be regarded as a subcell group provided above, and fields to respectively indicate the cells may be defined in PDCCH or MAC control information or an RRC message, such that the fields may indicate activation or deactivation or suspension or resumption of the respective cells.

In the disclosure, when the UE for which dual connectivity is configured performs data transmission or reception to or from an MCG or a SCG or when the SCG is suspended or deactivated, if the MCG detects a radio link failure, the UE may report the radio link failure to the SCG or to the MCG via the SCG. For example, the UE may constitute an RRC message for reporting the radio link failure and may report the radio link failure by transmitting the RRC message via split SRB1 or SRB3. In the above, in case that split SRB1 is configured, the UE may report the radio link failure always via split SRB1. In another method, when the UE for which dual connectivity is configured performs data transmission or reception to or from an MCG or a SCG or when the SCG is suspended or deactivated, if the MCG detects a radio link failure, the UE may declare the radio link failure and may perform an RRC connection re-establishment procedure.

In the disclosure, when the UE for which dual connectivity is configured performs data transmission or reception to or from an MCG or a SCG or when the SCG is suspended or deactivated, if the SCG detects a radio link failure, the UE may report the radio link failure to the MCG or to the SCG via the MCG. For example, the UE may constitute an RRC message for reporting the radio link failure and may report the radio link failure by transmitting the RRC message via SRB1 or split SRB1 or SRB3. In the above, in case that SRB1 or split SRB1 is configured, the UE may report the radio link failure always via split SRB1.

In the disclosure, clearing the SCG when the dual access technology is configured for the UE means clearing the connection (data transmission or data reception) with the SCG, or discarding or clearing configuration information of SCG (or bearer configuration information or configuration information of protocol layer device (PHY layer device, MAC layer device, RLC layer device, PDCP layer device, or SDAP layer device)). On the other hand, in the above, suspending or deactivating the SCG means clearing or suspending the connection (data transmission or data reception) with the SCG, but maintaining or suspending or storing configuration information of the SCG (or bearer configuration information or configuration information of a protocol layer device (PHY layer device, MAC layer device, RLC layer device, PDCP layer device, or SDAP layer device)), or quickly resuming or activating the connection with the SCG later based on the stored configuration information of the SCG.

The cell group configuration information or cell (SpCell (Pcell or PSCell) or SCell) configuration information, or the previously configured cell group configuration information or cell (SpCell (Pcell or PSCell) or SCell) configuration information, or the message (e.g., RRC message or RRCReconfiguration or MAC control information or downlink control information (DCI) of PDCCH) indicating the activation or resumption of a cell group or a cell (SpCell (Pcell or PSCell) or SCell) may be configured by including the first cell measurement configuration information for quick activation of a cell group or a cell (SpCell (Pcell or PSCell) or SCell).

In order for the base station to temporary, many, or frequently transmit a channel measurement signal to allow the cell to quickly perform channel measurement to quickly activate the cell group, the first channel measurement configuration information may include, in the configuration information of the cell (e.g., PCell or PSCell or SCell) of the cell group, configuration information such as a cycle of a frequent channel measurement signal (e.g., radio resources, a temporary reference signal (TRS), a synchronization signal block (SSB), a channel state information reference signal (CSI-RS), or a reference signal (RS)), or transmission resource information for transmission (frequency or time transmission resource via which the frequent channel measurement signal is transmitted), an interval or number (the number of times the frequent channel measurement signal is transmitted), a timer value (time at which the frequent channel measurement signal is transmitted), or a time interval (interval in which the frequent channel measurement signal is transmitted (e.g., an offset of time unit (slot, subframe, symbol, or the like)), or a transmission resource, a cycle, an interval, a timing, or an offset for reporting the measurement result of the UE.

In the above, the first channel measurement configuration information may configure the transmission resource for channel measurement such that a reporting cycle (or transmission resource) via which the UE may report a channel measurement result can be configured short, or the base station can transmit many or frequently channel measurement signal (or transmission resources or for example, a radio resource or a temporary reference signal (TRS)) so as to support the UE to perform fast channel measurement or many signal measurements.

In addition, a message (e.g., an RRC message or RRCReconfiguration or MAC control information or downlink control information (DCI) of PDCCH) indicating activation or resumption of the cell group or cell (SpCell (Pcell or PSCell) or Scell) may include second channel measurement configuration information for measuring a signal of a cell (PSCell or PCell or Scell) of a cell group. The second channel measurement configuration information may include general channel measurement configuration information, such as a transmission resource, cycle, time interval, or number of times of channel measurement signal, or a transmission resource, a cycle, or a time interval for channel measurement report.

In the disclosure, the UE may measure a channel and may report a measurement result to the base station by applying the first channel measurement configuration information or the second channel measurement configuration information according to the following conditions.

In the disclosure, the UE may measure a channel and may report a measurement result to the base station by applying the first channel measurement configuration information or the second channel measurement configuration information according to the following conditions.

1> If the UE receives a message (e.g., PDCCH indicator or MAC control information or RRC message) indicating to activate (or to resume) a cell (PCell or PSCell or Scell) or a cell group.
  2> If the first channel measurement configuration information is configured for the UE.
    3> The UE may identify that the base station is to frequently transmit many channel measurement signals according to the first channel measurement configuration information, and may measure, according to the first channel measurement configuration information, many or frequent channel measurement signals temporarily (e.g., up to time interval (e.g., subframe or slot or symbol) configured for the first channel measurement configuration information or during predefined (or predetermined) time interval or during a certain period of time (e.g., while a timer is running) or until a first condition is satisfied. Also, according to a cycle or transmission resource configured in the first channel measurement configuration information, the UE may report a channel measurement result up to a time interval configured in the first channel measurement configuration information (e.g., subframe or slot or symbol), or during a predefined (or predetermined) time interval or during a certain period of time (e.g., while a timer is running) or until a first condition is satisfied. Accordingly, since the UE may quickly measure a frequent channel measurement signal and may quickly report a result, the UE may quickly activate (or resume) a cell (PCell, Scell, or PSCell) or a cell group, and may quickly receive an indication of scheduling information. If the second channel measurement configuration information is configured for the UE after a time interval configured in the first channel measurement configuration information (e.g., subframe or slot or symbol), or after a predefined (or predetermined) time interval or after a certain period of time (e.g., when a timer expires) or after a first condition is satisfied, the UE may suspend or clear application of the first channel measurement configuration information and may measure a channel measurement signal according to the second channel measurement configuration information. For example, the UE may fall back from the first channel measurement configuration information to the second channel measurement information or may apply the second channel information instead of the first channel measurement configuration information. Also, the UE may report the channel measurement result according to a cycle or transmission resource configured in the second channel measurement configuration information. If the second channel measurement configuration information is not configured, the UE may not perform channel measurement.
  2> Otherwise (if the first channel measurement configuration information is not configured for the UE).
    3> If the second channel measurement configuration information is configured for the UE, the UE may measure a channel measurement signal according to the second channel measurement configuration information. Also, the UE may report a channel measurement result according to a cycle or transmission resource configured in the second channel measurement configuration information. If the second channel measurement configuration information is not configured, the UE may not perform channel measurement.

In the disclosure, the first condition may be one of the following conditions. Hereinafter, in the disclosure, when a cell is activated, or a cell group is activated or is resumed, or an RRC inactive mode UE resumes connection in an RRC connection resume procedure, efficient conditions under which the base station does not need to transmit unnecessarily many transport resources or frequently transmission resources are provided as a first condition. For example, the UE or the base station may apply the first channel measurement configuration information, and may perform a channel measurement procedure or a channel measurement reporting procedure until one of the following conditions is satisfied.

When the UE successfully completes a random access procedure in a cell (e.g., PCell or Scell or PSCell) or the cell (e.g., PSCell or SCell) of a cell group, or the UE successfully completes a random access procedure and is allocated a first UL transmission resource, or a UL transmission resource is first indicated to the UE, the UE may determine that the first condition is satisfied.

For example, in more detail, if the UE performs a contention free random access (CFRA) procedure (e.g., if a pre-designated preamble or a UE cell identifier (e.g., C-RNTI is allocated), When the UE transmits a pre-designated preamble to the cell and receives a random access response (RAR) message, or the UE receives an indication of the PDCCH in response to the RAR, it may be determined that the random access procedure is successfully completed and thus the UE may determine that the first condition is satisfied. In another method, when a UL transport resource is first received after RAR reception, the UE may determine that the first condition is satisfied.

If the UE performs a contention-based random access (CBRA) procedure (e.g., if a pre-designated preamble or a UE cell identifier (e.g., C-RNTI) is not allocated), The UE transmits a preamble (e.g., arbitrary preamble) to the cell, receives a random access response (RAR) message, transmits a message 3 (e.g., handover completion message) by using an IL transmission resource allocated, included, or indicated in the RAR message. Then, if the UE receives a contention resolution MAC CE indicating that contention has been resolved via a message 4 from a target BS, or receives a UL transmission resource via the PDCCH corresponding to the C-RNTI of the UE, it may be determined that the random access procedure to the target BS is successfully completed and thus the UE may determine that the first condition is satisfied. In another method, in case that the size of the UL transmission resource allocated in the RAR message is sufficient and thus, the message 3 can be transmitted and the UE can additionally transmit UL data, the UE may determine that the UL transmission resource is first received and the first condition is satisfied. That is, when the UE receives the RAR, the UE may determine that the UL transmission resource is first received and the first condition is satisfied.

1> In case that a 2-step random access procedure is configured or indicated for the UE and thus, the UE performs the procedure.

1> Alternatively, in case that the 2-step random access procedure is not configured or indicated but the UE supports the 2-step random access procedure in UE capability, the 2-step random access procedure is supported in system information of the cell, and information for the 2-step random access procedure is broadcast in the system information (e.g., a threshold value for determining whether to or not to perform the random access resource or the 2-step random access resource, etc.), or the UE receives the system information, and when the strength of a signal is better or greater than the threshold value broadcast in the system information and thus the UE performs the 2-step random access procedure on the cell, 2> When the 2-step random access procedure is successfully completed, the UE may determine that the first condition is satisfied.

2> The 2-step random access procedure may be performed by using one of a CBRA (Contention Based Random Access) method or a CFRA (Contention-Free Random Access) method.

3> In case that the UE performs the CBRA-based 2-step random access procedure,

4> the UE may transmit a preamble in a transmission resource for 2-step random access (e.g., PRACH occasion, transmission resource configured via the RRC message by the base station, or transmission resource broadcast in the system information), and may transmit data (e.g., MsgA MAC PDU) in a transmission resource for data transmission (e.g., PUSCH occasion). The data may include the MAC control information (C-RNTI MAC CE) including the UE identifier (C-RNTI), or the RRC message (RRCReconfigurationComplete message or handover completion message), 4> The UE may monitor the PDCCH scrambled by the UE identifier (C-RNTI) or a first identifier (MsgB-RNTI) derived by a time or a frequency at which a preamble is transmitted 4> If the UE receives the PDCCH scrambled by the UE identifier or is allocated a DL transmission resource via the PDCCH or receives the MAC control information for timing adjustment (timing advance command MAC CE) in the DL transmission resource, 5> The UE may determine that the 2-step random access procedure is successfully completed and the first condition is satisfied.

4> If the UE receives the PDCCH scrambled by the first identifier (MsgB-RNTI) or is allocated a DL transmission resource via the PDCCH, or receives a fallback RAR to a preamble transmitted by the UE in the DL transmission resource (i.e., the fallback RAR indicating to transmit MsgA in another transmission resource in case that the base station receives the preamble but does not receive MsgA), 5> The UE may transmit data (MsgA MAC PDU) in a transmission resource indicated in the fallback RAR, 5> The UE may monitor the PDCCH scrambled by the UE identifier (C-RNTI), and 5> If the UE receives the PDCCH scrambled by the UE identifier or is allocated a UL transmission resource via the PDCCH, the UE may determine that the 2-step random access procedure is successfully completed and the first condition is satisfied.

3> In case that the UE performs the CFRA-based 2-step random access procedure,

4> the UE may transmit a preamble in a transmission resource for 2-step random access (e.g., PRACH occasion or transmission resource designated via the RRC message by the BS), and may transmit data (e.g., MsgA MAC PDU) in a transmission resource for data transmission (e.g., PUSCH occasion). The data may include the MAC control information (C-RNTI MAC CE) including the UE identifier (C-RNTI) or the RRC message (RRCReconfigurationComplete message or handover completion message).

4> The UE may monitor the PDCCH scrambled by the UE identifier (C-RNTI) or the first identifier (MsgB-RNTI) derived by a time or a frequency at which a preamble is transmitted.

4> If the UE receives the PDCCH scrambled by the UE identifier or is allocated a DL transmission resource via the PDCCH or receives the MAC control information for timing adjustment (timing advance command MAC CE) in the DL transport resource, 5> the UE may determine that the 2-step random access procedure is successfully completed and the first condition is satisfied.

4> If the UE receives the PDCCH scrambled by the first identifier (MsgB-RNTI) or is allocated a DL transport resource via the PDCCH or receives a fallback RAR to a preamble transmitted by the UE in the DL transport resource (i.e., the fallback RAR indicating to transmit MsgA in another transport resource in case that the base station receives the preamble but does not receive MsgA), 5> the UE may determine that the 2-step random access procedure is successfully completed and the first condition is satisfied.

5> The UE may transmit data (MsgA MAC PDU) in a transmission resource indicated in the fallback RAR 1> The UE may determine that the first condition is satisfied when the random access procedure starts or a preamble for the random access procedure is transmitted.

1> In another method, in case that the 2-step random access procedure is configured or is indicated for the UE via the message, the UE may determine that the first condition is satisfied. For example, the UE may determine that the first condition is satisfied before the 2-step random access procedure starts.

1> In another method, when the 2-step random access procedure is configured or is indicated for the UE via the message and a transmission resource (PUSCH) configured for data transmission in the 2-step random access procedure is greater than a first threshold value, or when a configuration value for timing adjustment (timing advance value) is included in the RRC message, the UE may determine that the first condition is satisfied. In the above, the first threshold value may be configured in the RRC message (e.g., RRCReconfiguration) by the base station, may be broadcast in the system information, or may be configured in a size of data which the UE has to transmit. For example, in the above, the UE may determine that the first condition is satisfied before the 2-step random access procedure starts.

In another method, when the configuration value for timing adjustment (timing advance value) is included or the 2-step random access procedure is configured in the RRC message, the UE may not transmit a preamble and may directly transmit data in a configured transmission resource (e.g., transmission resource configured via the RRC message or transmission resource indicated via the PDCCH of a target BS monitored by the UE). Accordingly, in the above, before the 2-step random access procedure starts or when the data is transmitted or before the data is transmitted, the UE may determine that the first condition is satisfied. In another method, when the configuration value for timing adjustment (timing advance value) is included or the 2-step random access procedure is configured in the RRC message, the UE may not transmit a preamble, and may directly transmit data in a configured transmission resource (PUSCH) (e.g., transmission resource configured via the RRC message or transmission resource indicated via the PDCCH of the target BS monitored by the UE). In this above, when the configured transmission resource (PUSCH) (e.g., transmission resource configured in the RRC message or transmission resource indicated via the PDCCH of the target BS monitored by the UE) is greater than the first threshold value, or when the configuration value for timing adjustment (timing advance value) is included in the RRC message, before the 2-step random access procedure starts or when the data is transmitted or before the data is transmitted, the base station may determine that the first condition is satisfied.

1> In case that the RRC inactive mode UE transmits an RRCResumeRequest message and receives an RRCResume message (or RRCSetup message) as a response thereto, the UE may determine that the first condition is satisfied.

1> In case that a timer indicating a period for channel measurement expires when the UE performs channel measurement based on the first channel measurement configuration information configured in the RRC message.

1> In case that a time interval indicating a period for channel measurement has passed (or has expired) or all of the time intervals are used (or applied) when the UE performs channel measurement based on the first channel measurement configuration information configured in the RRC message.

1> In case that all signals for channel measurement are measured (or completed) a configured number of times or a signal is received for the configured number of times when the UE performs channel measurement based on the first channel measurement configuration information configured in the RRC message 1> In case that the channel measurement is completed based on the configuration information (in case of the expiration of the channel measurement) or the channel measurement reporting is completed (or in case of the expiration of channel measurement reporting) when the UE performs channel measurement based on the first channel measurement configuration information configured in the RRC message.

In the above, if the first condition is satisfied, a higher layer device (e.g., RRC layer device) may indicate by using an indicator to a lower layer device (e.g., PDCP layer device or RLC layer device or MAC layer device or PHY layer device), or a lower layer device (e.g., PDCP layer device or RLC layer device or MAC layer device or PHY layer device) may indicate by using an indicator to a higher layer device (e.g., RRC layer device). The methods for configuring or applying the first channel measurement configuration information provided in the disclosure may be extended, configured, and used when activating or resuming a cell group (e.g., PSCell), or activating SCell, or resuming an RRC connection in RRC deactivation mode.

FIG. 1R illustrates an operation of a terminal according to various embodiments of the present disclosure.

With reference to FIG. 1R, a UE 1r-01 may receive a message (e.g., DCI of PDCCH, MAC control information, or RRC message) from a base station 1r-05. In case that the message includes cell group configuration information, a cell group state, or a cell group indicator, the UE may determine whether configuration, addition, activation, or resumption of a cell group is indicated, or whether clearing, deactivation, or suspension of the cell group is indicated 1r-10. If the configuration, addition, activation, or resumption of the cell group is indicated, the configuration, addition, activation, or resumption of the cell group, provided in the disclosure, may be performed 1r-20, and if the releasing, deactivation, or suspension of the cell group is indicated, the clearing, deactivation, or suspension of the cell group, provided in the disclosure, may be performed 1r-30.

FIG. 1S illustrates a structure of a terminal according to various embodiments of the present disclosure.

With reference to the above drawing, the UE includes a radio frequency (RF) processor 1s-10, a baseband processor 1s-20, a storage 1s-30, and a controller 1s-40.

The RF processor 1s-10 performs a function for transmitting or receiving a signal via a radio channel, such as signal band transform and signal amplification. That is, the RF processor 1s-10 up-converts a baseband signal provided from the baseband processor 1s-20 into an RF band signal, transmits the converted RF band signal via an antenna, and then down-converts the RF band signal received via the antenna into a baseband signal. For example, the RF processor 1s-10 may include a transmission filter, a reception filter, an amplifier, a mixer, an oscillator, a digital-to-analog convertor (DAC), an analog-to-digital convertor (ADC), and the like. In the drawing, only one antenna is illustrated, but the UE may have multiple antennas. The RF processor 1s-10 may include multiple RF chains. The RF processor 1s-10 may perform beamforming. For the beamforming, the RF processor 1s-10 may adjust a phase and a magnitude of each of signals transmitted or received via multiple antennas or antenna elements. In addition, the RF processor may perform MIMO, and may receive multiple layers when performing MIMO operations. The RF processor 1s-10 may perform reception beam sweeping by appropriately configuring the multiple antennas or antenna elements under the control of the controller, or may adjust the direction and beam width of a reception beam so that the reception beam is coordinated with a transmission beam.

The baseband processor 1s-20 performs conversion between a baseband signal and a bitstream according to a physical layer specification of a system. For example, during data transmission, the baseband processor 1s-20 generates complex symbols by encoding and modulating a transmission bitstream. When data is received, the baseband processor 1s-20 reconstructs a reception bitstream via demodulation and decoding of the baseband signal provided from the RF processor 1s-10. For example, in a case of conforming to an orthogonal frequency division multiplexing (OFDM) scheme, during data transmission, the baseband processor 1s-20 generates complex symbols by encoding and modulating a transmission bitstream, maps the complex symbols to sub-carriers, and then constitutes OFDM symbols by performing an inverse fast Fourier transform (IFFT) operation and cyclic prefix (CP) insertion. Further, during data reception, the baseband processor 1s-20 divides the baseband signal provided from the RF processor 1s-10 in units of OFDM symbols, reconstructs the signals mapped to the sub-carriers via a fast Fourier transform (FFT) operation, and then reconstructs the reception bitstream via demodulation and decoding.

The baseband processor 1s-20 and the RF processor 1s-10 transmit and receive signals as described above. Accordingly, the baseband processor 1s-20 and the RF processor 1s-10 may be referred to as a transmitter, a receiver, a transceiver, or a communication circuit. Moreover, at least one of the baseband processor 1s-20 and the RF processor 1s-10 may include multiple communication modules to support multiple different radio access technologies. In addition, at least one of the baseband processor 1s-20 and the RF processor 1s-10 may include different communication modules to process signals in different frequency bands. For example, the different radio access technologies may include an LTE network, an NR network, and the like. The different frequency bands may include a super high frequency (SHF) (e.g., 2.5 GHz, 5 GHz) band and a millimeter wave (e.g., 60 GHz) band.

The storage 1s-30 stores data, such as a default program, an application program, and configuration information, for operation of the UE. The storage 1s-30 provides stored data in response to a request of the controller 1s-40.

The controller 1s-40 controls overall operations of the UE. For example, the controller 1s-40 transmits or receives a signal via the baseband processor 1s-20 and the RF processor 1s-10. In addition, the controller 1s-40 records and reads data in the storage 1s-30. To this end, the controller 1s-40 may include at least one processor. For example, the controller 1s-40 may include a communication processor (CP) configured to perform control for communication and an application processor (AP) configured to control an upper layer, such as an application program. The controller 1s-40 may further include a multi-connection processor 1s-42 for supporting multi-connection.

FIG. 1T illustrates a block structure of a base station or TRP in a wireless communication system according to various embodiments of the present disclosure.

As illustrated in the above drawing, the base station includes an RF processor 1t-10, a baseband processor 1t-20, a backhaul communication circuit 1t-30, a storage 1t-40, and a controller 1t-50.

The RF processor 1t-10 performs a function for transmitting or receiving a signal via a radio channel, such as signal band transform and signal amplification. That is, the RF processor 1t-10 up-converts a baseband signal provided from the baseband processor 1t-20 into an RF band signal, transmits the up-converted RF band signal via an antenna, and then down-converts the RF band signal received via the antenna into a baseband signal. For example, the RF processor 1t-10 may include a transmission filter, a reception filter, an amplifier, a mixer, an oscillator, a DAC, an ADC, and the like. In the drawing, only one antenna is illustrated, but a first access node may include multiple antennas. Also, the RF processor 1t-10 may include multiple RF chains. Moreover, the RF processor 1t-10 may perform beamforming. For the beamforming, the RF processor 1t-10 may adjust a phase and a magnitude of each of signals transmitted or received via the multiple antennas or antenna elements. The RF processor may perform downlink MIMO by transmitting one or more layers.

The baseband processor 1t-20 performs a function of conversion between a baseband signal and a bitstream according to a physical layer specification of a first radio access technology. For example, during data transmission, the baseband processor 1t-20 generates complex symbols by encoding and modulating a transmission bitstream. Also, during data is received, the baseband processor 1t-20 reconstructs a reception bitstream via demodulation and decoding of the baseband signal provided from the RF processor 1t-10. For example, in a case of conforming to an OFDM scheme, during data transmission, the baseband processor 1t-20 generates complex symbols by encoding and modulating a transmission bitstream, maps the complex symbols to sub-carriers, and then configures OFDM symbols by performing IFFT operation and CP insertion. Further, during data reception, the baseband processor 1t-20 divides the baseband signal provided from the RF processor 1t-10 in units of OFDM symbols, reconstructs the signals mapped to the sub-carriers via an FFT operation, and then reconstructs the reception bitstream via demodulation and decoding. The baseband processor 1t-20 and the RF processor 1t-10 transmit and receive signals as described above. Accordingly, the baseband processor 1t-20 and the RF processor 1t-10 may be referred to as a transmitter, a receiver, a transceiver, a communication circuit, or a wireless communication circuit.

The communication circuit 1t-30 provides an interface configured to perform communication with other nodes within a network.

The storage 1t-40 stores data, such as a default program, an application program, configuration information, for operation of the main base station. Particularly, the storage 1t-40 may store information on a bearer assigned to a connected UE, a measurement result reported from the connected UE, and the like. The storage 1t-40 may store information serving as a criterion for determining whether to provide the UE with multi-connectivity or to suspend multi-connectivity. The storage 1t-40 provides stored data in response to a request of the controller 1t-50.

The controller 1t-50 controls overall operations of the main base station. For example, the controller 1t-50 transmits or receives a signal via the baseband processor 1t-20 and the RF processor 1t-10 or via the backhaul communication circuit 1t-30. The controller 1t-50 records and reads data in the storage 1t-40. To this end, the controller 1t-50 may include at least one processor. The controller 1t-50 may further include a multi-connection processor 1t-52 for supporting multi-connection.

The embodiments disclosed in the specification and drawings above are only provided as specific examples to easily explain and understand the contents of the disclosure, and are not intended to limit the scope of the disclosure. Therefore, the scope of the disclosure should be construed as including all changes or modifications derived based on the disclosure in addition to the embodiments disclosed herein as being included in the scope of the disclosure.

In addition, all or a part of one of the various embodiments described in the disclosure may be implemented in combination with all or a part of one or more other embodiments, and it will be apparent that such a combination is also included in the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
    receiving, from a base station, a media access control (MAC) control element (CE) for activating a secondary cell (SCell); and
    in case that the SCell is deactivated before receiving the MAC CE, activating the SCell based on the MAC CE, wherein the MAC CE includes:
        at least one $C_i$ field, wherein each $C_i$ field indicates an activation or a deactivation of an SCell with index i, and
        at least one reference signal (RS) related octet respectively corresponding to at least one SCell indicated by the at least one $C_i$ field to be activated, wherein, in case that an RS related octet is set to a non-zero value, the RS related octet indicates information associated with an RS for an SCell indicated by a $C_i$ field to be activated, and wherein, in case that the RS related octet is set to zero, the RS related octet indicates that no RS is used for the SCell indicated by the $C_i$ field to be activated.

2. The method of claim 1, wherein the at least one RS related octet is included in the MAC CE in ascending order based on index information for SCells indicated by $C_i$ fields to be activated.

3. The method of claim 1, wherein each $C_i$ field is set to 1 to indicate that the SCell with index i is to be activated and that an RS related octet is included for the SCell with index i.

4. The method of claim 1, wherein each $C_i$ field is set to 0 to indicate that the SCell with index i is to be deactivated and that no RS related octet is included for the SCell with index i.

5. The method of claim 1, wherein the information associated with the RS includes resource information for the RS and quasi co-location (QCL) information for the RS.

6. A method performed by a base station in a wireless communication system, the method comprising:
    transmitting, to a terminal, a media access control (MAC) control element (CE) for activating a secondary cell (SCell); and
    in case that the SCell is deactivated before transmitting the MAC CE, performing at least one operation for the SCell activated based on the MAC CE, wherein the MAC CE includes:
        at least one $C_i$ field, wherein each $C_i$ field indicates an activation or a deactivation of an SCell with index i, and
        at least one reference signal (RS) related octet respectively corresponding to at least one SCell indicated by the at least one $C_i$ field to be activated, wherein, in case that an RS related octet is set to a non-zero value, the RS related octet indicates information associated with an RS for an SCell indicated by a $C_i$ field to be activated, and wherein, in case that the RS related octet is set to zero, the RS related octet indicates that no RS is used for the SCell indicated by the $C_i$ field to be activated.

7. The method of claim 6, wherein the at least one RS related octet is included in the MAC CE in ascending order based on index information for SCells indicated by $C_i$ fields to be activated.

8. The method of claim 6, wherein each $C_i$ field is set to 1 to indicate that the SCell with index i is to be activated and that an RS related octet is included for the SCell with index i.

9. The method of claim 6, wherein each $C_i$ field is set to 0 to indicate that the SCell with index i is to be deactivated and that no RS related octet is included for the SCell with index i.

10. The method of claim 6, wherein the information associated with the RS includes resource information for the RS and quasi co-location (QCL) information for the RS.

11. A terminal in a wireless communication system, the terminal comprising:
    a transceiver; and
    a controller configured to:
        receive, from a base station via the transceiver, a media access control (MAC) control element (CE) for activating a secondary cell (SCell), and
        in case that the SCell is deactivated before receiving the MAC CE, activate the SCell based on the MAC CE, wherein the MAC CE includes:
            at least one $C_i$ field, wherein each $C_i$ field indicates an activation or a deactivation of an SCell with index i, and
            at least one reference signal (RS) related octet respectively corresponding to at least one SCell indicated by the at least one $C_i$ field to be activated, wherein, in case that an RS related octet is set to a non-zero value, the RS related octet indicates information associated with an RS for an SCell indicated by a $C_i$ field to be activated, and wherein, in case that the RS related octet is set to zero, the RS related octet indicates that no RS is used for the SCell indicated by the $C_i$ field to be activated.

12. The terminal of claim 11, wherein the at least one RS related octet is included in the MAC CE in ascending order based on index information for SCells indicated by $C_i$ fields to be activated.

13. The terminal of claim 11, wherein each $C_i$ field is set to 1 to indicate that the SCell with index i is to be activated and that an RS related octet is included for the SCell with index i.

14. The terminal of claim 11, wherein each $C_i$ field is set to 0 to indicate that the SCell with index i is to be deactivated and that no RS related octet is included for the SCell with index i.

15. The terminal of claim 11, wherein the information associated with the RS includes resource information for the RS and quasi co-location (QCL) information for the RS.

16. A base station in a wireless communication system, the base station comprising:
   a transceiver; and
   a controller configured to:
      transmit, to a terminal via the transceiver, a media access control (MAC) control element (CE) for activating a secondary cell (SCell), and
      in case that the SCell is deactivated before transmitting the MAC CE, perform at least one operation for the SCell activated based on the MAC CE,
   wherein the MAC CE includes:
      at least one $C_i$ field, wherein each $C_i$ field indicates an activation or a deactivation of an SCell with index i, and
      at least one reference signal (RS) related octet respectively corresponding to at least one SCell indicated by the at least one $C_i$ field to be activated, wherein, in case that an RS related octet is set to a non-zero value, the RS related octet indicates information associated with an RS for an SCell indicated by a $C_i$ field to be activated, and wherein, in case that the RS related octet is set to zero, the RS related octet indicates that no RS is used for the SCell indicated by the $C_i$ field to be activated.

17. The base station of claim 16, wherein the at least one RS related octet is included in the MAC CE in ascending order based on index information for SCells indicated by $C_i$ fields to be activated.

18. The base station of claim 16, wherein each $C_i$ field is set to 1 to indicate that the SCell with index i is to be activated and that an RS related octet is included for the SCell with index i.

19. The base station of claim 16, wherein each $C_i$ field is set to 0 to indicate that the SCell with index i is to be deactivated and that no RS related octet is included for the SCell with index i.

20. The base station of claim 16, wherein the information associated with the RS includes resource information for the RS and quasi co-location (QCL) information for the RS.

* * * * *